United States Patent
Tanaka et al.

(10) Patent No.: US 6,289,507 B1
(45) Date of Patent: Sep. 11, 2001

(54) OPTIMIZATION APPARATUS AND COMPUTER-READABLE STORAGE MEDIUM STORING OPTIMIZATION PROGRAM

(75) Inventors: Akira Tanaka, Yawata; Kensuke Odani, Kyoto; Hirohisa Tanaka, Higashiosaka; Junko Sayama, Kusatsu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/165,587

(22) Filed: Sep. 30, 1998

(30) Foreign Application Priority Data

Sep. 30, 1997 (JP) .................................................. 9-265655

(51) Int. Cl.⁷ ....................................................... G06F 9/445
(52) U.S. Cl. ......................... 717/9; 717/2; 717/3; 717/5; 717/6; 717/7
(58) Field of Search ................................. 717/9, 2, 3, 5, 717/6, 7

(56) References Cited

U.S. PATENT DOCUMENTS 5,828,886 * 10/1998 Hayashi ................................... 717/9
5,920,716 * 10/1998 Johnson et al. ......................... 717/1

OTHER PUBLICATIONS

"Compilers, Principle, Techniques, and Tool," by A.V. Aho et al., Addison Publishing Co., Ltd. 1986.
"Supercompilers for Parallel and Vector Computers," by H. Zima, Addison Publishing Co., Inc., 1991 pp. 80–89.

* cited by examiner

Primary Examiner—Kakali Chaki
Assistant Examiner—Ted T. Vo
(74) Attorney, Agent, or Firm—Price and Gess

(57) ABSTRACT

In an optimization apparatus embedded in a compiler apparatus that compiles a high-level language program to a machine language program, equivalence relations among a plurality of expressions are analyzed in a short time period by calculating an equivalent expression set group of each basic block, the equivalent expression set group being composed of equivalent expression sets with equivalence relations. Specifically, an equivalent expression set group at the entry point of a basic block is calculated from equivalent expression set groups at the exit points of basic blocks that precede the basic block, and then an equivalent expression set group at the exit point of the basic block is calculated from the equivalent expression set group at the entry point of the basic block. These calculations are repeated until there are no more changes to the equivalent expression set group at the exit point of any of the basic blocks.

24 Claims, 43 Drawing Sheets

FIG. 3 BACKGROUND ART

[ITERATIVE ALGORITHM FOR REACHING DEFINITIONS]

INPUT:CONTROL FLOW INFORMATION, AND GEN GROUP AND KILL GROUP FOR EACH BASIC BLOCK B
OUTPUT:IN GROUP, OUT GROUP FOR REACHING DEFINITIONS
METHOD:
for (REPEATED FOR ALL BASIC BLOCKS B) do OUT[B] =GEN[B] ;
repeat {
    changed=false;
    for (REPEATED FOR ALL BASIC BLOCKS B) {
        IN[B] =∪ OUT[B'] ;
          B' ∈pred(B)
        old_OUT=OUT[B] ;
        OUT[B] =GEN[B] ∪ (IN[B] −KILL[B])
        if (old_OUT!=OUT[B]) changed=true;
    }
} until changed==false;

FIG. 4 BACKGROUND ART
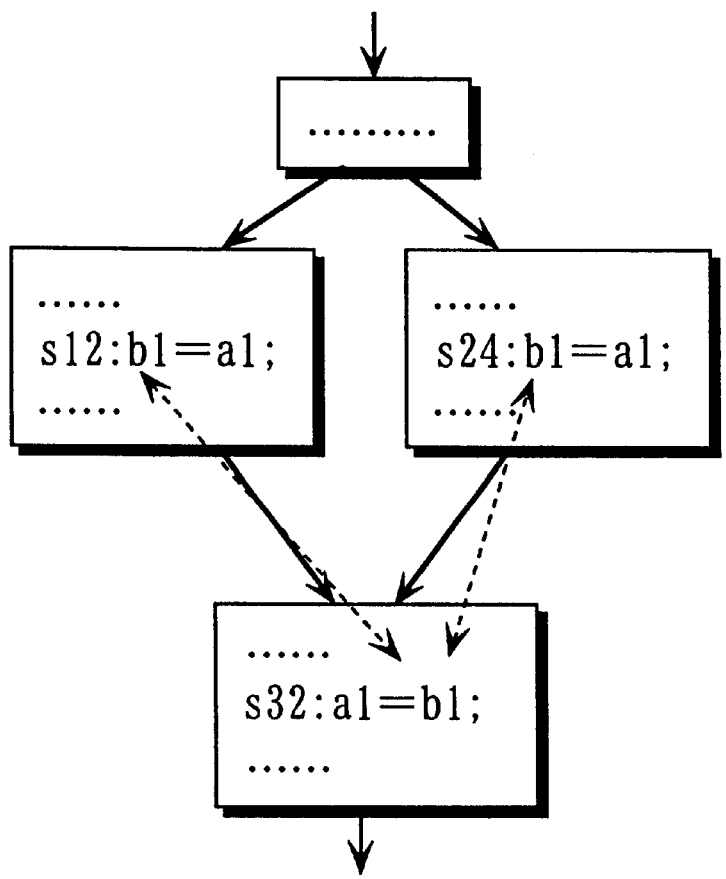
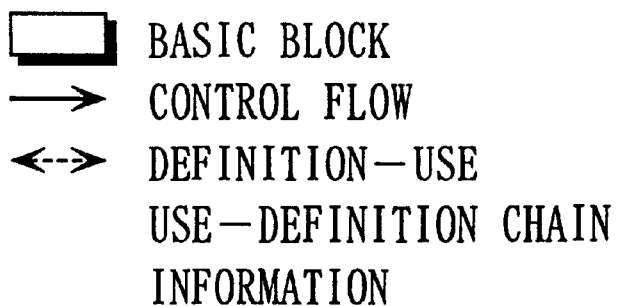
BASIC BLOCK
CONTROL FLOW
DEFINITION—USE
USE—DEFINITION CHAIN
INFORMATION

FIG. 12A

| VARIABLE | INTERMEDIATE INSTRUCTION | INDICATED VARIABLE SET |
|---|---|---|
| p5 | s5 | (a7) |
| p5 | s6 | (a7) |
| p5 | s7 | (a7) |
| p5 | s9 | (a7) |
| p5 | s10 | (a7) |
| p5 | s17 | (a7) |
| p5 | s18 | (a7) |
| p5 | s19 | (a7) |
| p5 | s20 | (a7) |
| p5 | s21 | (a7) |
| p5 | s22 | (a7) |
| p5 | s23 | (a7) |

(A) POINT SET

FIG. 12B

| FUNCTION | INTERMEDIATE INSTRUCTION | CHANGED VARIABLE SET |
|---|---|---|
| f | s20 | (b6, z6) |

(B) CHANGE SET

FIG. 13A (x5, b5, p5, &a7, p41, 10, p42, 20, x4, t32, x3, y4, b6, a5+10, z6, p6, a7, p7+b2, b1, a1, t21, a2, z7, y5, b5, t31, a3, t41, x4+y4, b2, b3, &b6, a4, *p5, 30, t43, t22, t42)

(A) UNIVERSAL EXPRESSION STORAGE UNIT

FIG. 13B

| BASIC BLOCK | E_GEN GROUP |
|---|---|
| BLK1 | {(x5, b5), (p5, &a7), (p41, 10), (p42, 20)} |
| BLK2 | {(x4, p41), (t32, x3), (y4, p42)} |
| BLK3 | {(a5+10), (p6), (b1, a1), (t21, a2, b2), (z7), (y5, b5), (t31, a3, b3), (t41, x4+y4, a4, t43), (*p5, 30)} |
| BLK4 | {(b1, a1), (t22, a2, b2), (a3, t32, b3), (t42, x4+y4, a4), (y5, x5)} |
| BLK5 | {(a1, b1), (a2, b2), (a3, b3), (a4, x4+y4), (b5, y5), (t42, t43)} |
| BLK6 | {(b3, x3)} |

(B) E_GEN GROUP STORAGE UNIT

FIG. 13C

| BASIC BLOCK | E_PRE GROUP |
|---|---|
| BLK1 | (b5, &a7, 10, 20, x4, t32, x3, y4, b6, a5+10, z6, p6, a7, p7+b2, b1, a1, t21, a2, z7, y5, b5, t31, a3, t41, x4+y4, b2, b3, &b6, a4, 30, t43, t22, t42) |
| BLK2 | (x5, b5, p5, &a7, p41, 10, p42, 20, x3, b6, a5+10, z6, p6, a7, p7+b2, b1, a1, t21, a2, z7, y5, b5, t31, a3, t41, b2, b3, &b6, a4, *p5, 30, t43, t22, t42) |
| BLK3 | (x5, b5, p5, &a7, p41, 10, p42, 20, x4, t32, x3, y4, a5+10, p6, p7+b2, a1, a2, b5, a3, x4+y4, &b6, *p5, 30, t22, t42) |
| BLK4 | (x5, b5, p5, &a7, p41, 10, p42, 20, x4, t32, x3, y4, b6, a5+10, z6, p6, a7, p7+b2, a1, t21, a2, z7, b5, t31, t41, x4+y4, &b6, *p5, 30, t43) |
| BLK5 | (x5, p5, &a7, p41, 10, p42, 20, x4, t32, x3, y4, b6, a5+10, z6, p6, a7, p7+b2, b1, t21, z7, y5, b5, t31, t41, x4+y4, b2, b3, &b6, *p5, 30, t43, t22) |
| BLK6 | (x5, b5, p5, &a7, p41, 10, p42, 20, x4, t32, x3, y4, b6, a5+10, z6, p6, a7, p7+b2, b1, a1, t21, a2, z7, y5, b5, t31, a3, t41, x4+y4, b2, &b6, a4, *p5, 30, t43, t22, t42) |

(C) E_PRE GROUP STORAGE UNIT

FIG. 14A

| INTERMEDIATE INSTRUCTION | CONTENT OF E_GEN PROCESSING EXPRESSION SET STORAGE UNIT |
|---|---|
| — | EMPTY SET |
| s9 | (b6, a5+10) |
| s10 | (b6, a5+10), (z6, p6) |
| --- | -------------------- |
| s17 | (b6, a5+10), (z6, p6), (a7, p7+b2), (b1, a1), (t21, a2), (z7, a7), (y5, b5), (t31, a3), (t41, x4+y4) |
| s18 | (b6, a5+10), (z6, p6), (a7), (b1, a1), (t21, a2, b2), (z7, a7), (y5, b5), (t31, a3), (t41, x4+y4) |
| s19 | (b6, a5+10), (z6, p6), (a7), (b1, a1), (t21, a2, b2), (z7, a7), (y5, b5), (t31, a3, b3), (t41, x4+y4) |
| s20 | (a5+10), (p6), (a7), (b1, a1), (t21, a2, b2), (z7, a7), (y5, b5), (t31, a3, b3), (t41, x4+y4) |
| s21 | (a5+10), (p6), (a7), (b1, a1), (t21, a2, b2), (z7, a7), (y5, b5), (t31, a3, b3), (t41, x4+y4, a4) |
| s22 | (a5+10), (p6), (b1, a1), (t21, a2, b2), (z7), (y5, b5), (t31, a3, b3), (t41, x4+y4, a4), (a4, t41), (*p5, 30) |
| s23 | (a5+10), (p6), (b1, a1), (t21, a2, b2), (z7), (y5, b5), (t31, a3, b3), (t41, x4+y4, a4, t43), (*p5, 30) |
| s24 | (a5+10), (p6), (b1, a1), (t21, a2, b2), (z7), (y5, b5), (t31, a3, b3), (t41, x4+y4, a4, t43), (*p5, 30) |

FIG. 14B

| INTERMEDIATE INSTRUCTION | CONTENT OF E_PRE PROCESSING EXPRESSION STORAGE UNIT |
|---|---|
| — | (x5, b5, p5, &a7, p41, 10, p42, 20, x4, t32, x3, y4, b6, a5+10, z6, p6, a7, p7+b2, b1, a1, t21, a2, z7, y5, b5, t31, a3, t41, x4+y4, b2, b3, &b6, a4, *p5, t43, t22, t42) |
| s9 | (x5, b5, p5, &a7, p41, 10, p42, 20, x4, t32, x3, y4, a5+10, z6, p6, a7, p7+b2, b1, a1, t21, a2, z7, y5, b5, t31, a3, t41, x4+y4, b2, b3, &b6, a4, *p5, t43, t22, t42) |
| --- | -------------------- |
| s19 | (x5, b5, p5, &a7, p41, 10, p42, 20, x4, t32, x3, y4, a5+10, p6, p7+b2, a1, a2, b5, a3, x4+y4, &b6, a4, *p5, t43, t22, t42) |
| s20 | (x5, b5, p5, &a7, p41, 10, p42, 20, x4, t32, x3, y4, a5+10, p6, p7+b2, a1, a2, b5, a3, x4+y4, &b6, a4, *p5, t43, t22, t42) |
| s21 | (x5, b5, p5, &a7, p41, 10, p42, 20, x4, t32, x3, y4, a5+10, p6, p7+b2, a1, a2, b5, a3, x4+y4, &b6, *p5, t43, t22, t42) |
| s22 | (x5, b5, p5, &a7, p41, 10, p42, 20, x4, t32, x3, y4, a5+10, p6, p7+b2, a1, a2, b5, a3, x4+y4, &b6, *p5, t43, t22, t42) |
| s23 | (x5, b5, p5, &a7, p41, 10, p42, 20, x4, t32, x3, y4, a5+10, p6, p7+b2, a1, a2, b5, a3, x4+y4, &b6, *p5, t22, t42) |
| s24 | (x5, b5, p5, &a7, p41, 10, p42, 20, x4, t32, x3, y4, a5+10, p6, p7+b2, a1, a2, b5, a3, x4+y4, &b6, *p5, t22, t42) |

| BASIC BLOCK | E_IN GROUP |
|---|---|
| BLK1 | {} |
| BLK2 | UNKNOWN |
| BLK3 | UNKNOWN |
| BLK4 | UNKNOWN |
| BLK5 | UNKNOWN |
| BLK6 | UNKNOWN |

FIG. 15B

| BASIC BLOCK | E_OUT GROUP |
|---|---|
| BLK1 | {(x5, b5), (p5, &a7), (p41, 10), (p42, 20)} |
| BLK2 | {(x5, b5, p5, &a7, p41, 10, p42, 20, x3, b6, a5+10, z6, p6, a7, p7+b2, b1, a1, t21, a2, z7, y5, b5, t31, a3, t41, b2, b3, &b6, a4, *p5, 30, t43, t22, t42, x4, t32, y4)} |
| BLK3 | {(x5, b5, p5, &a7, p41, 10, p42, 20, x4, t32, x3, y4, a5+10, p6, p7+b2, a1, a2, b5, a3, x4+y4, &b6, *p5, 30, t22, t42, b1, t21, y5, t31, b3, t41, a4, t43), (z7)}  ← E_GEN[BLK3] UeE_PRE[BLK3] |
| BLK4 | {(x5, b5, p5, &a7, p41, 10, p42, 20, x4, t32, x3, y4, b6, a5+10, z6, p6, a7, p7+b2, a1, t21, a2, z7, b5, t31, t41, x4+y4, &b6, *p5, 30, t43, b1, t22, b2, a3, t42, a4, y5)} |
| BLK5 | {(x5, b5, &a7, p41, 10, p42, 20, x4, t32, x3, y4, b6, a5+10, z6, p6, a7, p7+b2, b1, t21, z7, y5, b5, t31, t41, x4+y4, b2, b3, &b6, *p5, 30, t43, t22, a1, a2, a3, a4, t42)} |
| BLK6 | {(x5, b5, p5, &a7, p41, 10, p42, 20, x4, t32, x3, y4, b6, a5+10, z6, p6, a7, p7+b2, a1, t21, a2, z7, y5, b5, t31, a3, t41, x4+y4, b2, &b6, a4, *p5, 30, t43, t22, t42, b3)} |

FIG. 16A

| BASIC BLOCK | E_IN GROUP |
|---|---|
| BLK1 | { }    BRANCH DESTINATION E_OUT[BLK1] ∩e E_OUT[BLK5] |
| BLK2 | {(x5, b5), (p5, &a7), (p41, 10), (p42, 20)} ← BRANCH ORIGIN   BRANCH ORIGIN |
| BLK3 | {(x4, p41, 10), (t32, x3), (y4, p42, 20), (x5, b5), (p5, &a7)} |
| BLK4 | {(x4, p41, 10), (t32, x3), (y4, p42, 20), (x5, b5), (p5, &a7)} |
| BLK5 | {(b1, a1), (a2, b2), (y5, b5), (a3, b3), (x4+y4, a4), (x4, p41, 10), (t32, x3), (y4, p42, 20), (x5, b5, y5), (p5, &a7)} |
| BLK6 | {(a1, b1), (a2, b2), (a3, b3), (a4, x4+y4), (b5, y5, x5), (t42, t43), (x4, p41, 10), (t32, x3), (y4, p42, 20), (p5, &a7)} |

FIG. 16B

| BASIC BLOCK | E_IN[B] ∩e E_PRE[B] |
|---|---|
| BLK2 | {(x5, b5), (p5, &a7), (p41, 10), (p42, 20)} ← E_IN[BLK2] ∩e E_PRE[BLK2] |
| BLK3 | {(x4, p41, 10), (t32, x3), (y4, p42, 20), (x5, b5), (p5, &a7)} |
| BLK4 | {(x4, p41, 10), (t32, x3), (y4, p42, 20), (x5, b5), (p5, &a7)} |
| BLK5 | {(b1), (x5, y5), (b3), (x4+y4), (b2), (x4, p41, 10), (t32, x3), (y4, p42, 20), (x5), (p5, &a7)} |
| BLK6 | {(a1, b1), (a2, b2), (a3), (a4, x4+y4), (b5, y5, x5), (t42, t43), (x4, p41, 10), (t32, x3), (y4, p42, 20), (p5, &a7)} |

FIG. 16C

| BASIC BLOCK | E_OUT GROUP    E_GEN[BLK2] ∪e (E_IN[BLK2] ∩e E_PRE[BLK2]) |
|---|---|
| BLK1 | {(x5, b5), (p5, &a7), (p41, 10), (p42, 20)} |
| BLK2 | {(x4, p41, 10), (t32, x3), (y4, p42, 20), (x5, b5), (p5, &a7)} |
| BLK3 | {(a5+10), (p6), (b1, a1), (t21, a2, b2), (z7), (y5, b5, x5), (t31, a3, b3), (t41, x4+y4, a4, t43), (*p5, 30), (x4, p41, 10), (t32, x3), (y4, p42, 20), (p5, &a7)} |
| BLK4 | {(b1, a1), (t22, a2, b2), (a3, t32, b3, x3), (t42, x4+y4, a4), (y5, x5, b5), (x4, p41, 10), (y4, p42, 20), (p5, &a7)} |
| BLK5 | {(a1, b1), (a2, b2), (a3, b3), (a4, x4+y4), (b5, y5, x5), (t42, t43), (x4, p41, 10), (t32, x3), (y4, p42, 20), (p5, &a7)} |
| BLK6 | {(a1, b1), (a2, b2), (a3), (a4, x4+y4), (b5, y5, x5), (t42, t43), (x4, p41, 10), (t32, x3, b3), (y4, p42, 20), (p5, &a7)} |

FIG. 17A

| BASIC BLOCK | E_IN GROUP |
|---|---|
| BLK1 | { }                                                         E_OUT[BLK1] ∩e E_OUT[BLK5] |
| BLK2 | {(x5, b5), (p5, &a7), (p41, 10), (p42, 20)}   BRANCH ORIGIN  BRANCH ORIGIN |
| BLK3 | {(x4, p41, 10), (t32, x3), (y4, p42, 20), (x5, b5), (p5, &a7)} |
| BLK4 | {(x4, p41, 10), (t32, x3), (y4, p42, 20), (x5, b5), (p5, &a7)} |
| BLK5 | {(b1, a1), (a2, b2), (y5, b5), (a3, b3), (x4+y4, a4), (x4, p41, 10), (t32, x3), (y4, p42, 20), (x5, b5, y5), (p5, &a7)} |
| BLK6 | {(a1, b1), (a2, b2), (a3, b3), (a4, x4+y4), (b5, y5, x5), (t42, t43), (x4, p41, 10), (t32, x3), (y4, p42, 20), (p5, &a7)} |

FIG. 17B

| BASIC BLOCK | E_OUT GROUP    E_GEN[BLK2] ∪e (E_IN[BLK2] ∩e E_PRE[BLK2]) |
|---|---|
| BLK1 | {(x5, b5), (p5, &a7), (p41, 10), (p42, 20)} |
| BLK2 | {(x4, p41, 10), (t32, x3), (y4, p42, 20), (x5, b5), (p5, &a7)} |
| BLK3 | {(a5+10), (p6), (b1, a1), (t21, a2, b2), (z7), (y5, b5, x5), (t31, a3, b3), (t41, x4+y4, a4, t43), (*p5, 30), (x4, p41, 10), (t32, x3), (y4, p42, 20), (p5, &a7)} |
| BLK4 | {(b1, a1), (t22, a2, b2), (a3, t32, b3, x3), (t42, x4+y4, a4), (y5, x5, b5), (x4, p41, 10), (y4, p42, 20), (p5, &a7)} |
| BLK5 | {(a1, b1), (a2, b2), (a3, b3), (a4, x4+y4), (b5, y5, x5), (t42, t43), (x4, p41, 10), (t32, x3), (y4, p42, 20), (p5, &a7)} |
| BLK6 | {(a1, b1), (a2, b2), (a3), (a4, x4+y4), (b5, y5, x5), (t42, t43), (x4, p41, 10), (t32, x3, b3), (y4, p42, 20), (p5, &a7)} |

FIG. 18A

| INTERMEDIATE INSTRUCTION | CONTENT OF PROCESSING EXPRESSION SET STORAGE UNIT |
|---|---|
| — | (x5, b5), (p5, &a7), (p41, 10), (p42, 20) |
| s5 | (x5, b5), (p5, &a7), (p41, 10, x4), (p42, 20) |
| s6 | (x5, b5), (p5, &a7), (p41, 10, x4), (p42, 20), (t32, x3) |
| s7 | (x5, b5), (p5, &a7), (p41, 10, x4), (p42, 20, y4), (t32, x3) |
| s8 | (x5, b5), (p5, &a7), (p41, 10, x4), (p42, 20, y4), (t32, x3) |

FIG. 18B

| INTERMEDIATE INSTRUCTION | CONTENT OF PROCESSING EXPRESSION SET STORAGE UNIT |
|---|---|
| — | (x4, p41, 10), (t32, x3), (y4, p42, 20), (x5, b5), (p5, &a7) |
| s25 | (x4, p41, 10), (t32, x3), (y4, p42, 20), (x5, b5), (p5, &a7), <u>(b1, a1)</u> |
| s26 | (x4, p41, 10), (t32, x3), (y4, p42, 20), (x5, b5), (p5, &a7), (b1, a1), <u>(t22, a2)</u> |
| s27 | (x4, p41, 10), (t32, x3, <u>a3</u>), (y4, p42, 20), (x5, b5), (p5, &a7), (b1, a1), (t22, a2) |
| s28 | (x4, p41, 10), (t32, x3, a3), (y4, p42, 20), (x5, b5), (p5, &a7), (b1, a1), (t22, a2), <u>(t42, 30)</u> |
| ---- | ---------------------- |

FIG. 18C

| INTERMEDIATE INSTRUCTION | CONTENT OF PROCESSING EXPRESSION SET STORAGE UNIT |
|---|---|
| — | (b1, a1), (a2, b2), (y5, b5), (a3, b3), (x4+y4, a4), (x4, p41, 10), (t32, x3), (y4, p42, 20), (x5, b5, y5), (p5, &a7) |
| s33 | (b1, a1), (a2, b2), (y5, b5), (a3, b3), (x4+y4, a4), (x4, p41, 10), (t32, x3), (y4, p42, 20), (x5, b5, y5), (p5, &a7) |
| s34 | (b1, a1), (a2, b2), (y5, b5), (a3, b3), (x4+y4, a4), (x4, p41, 10), (t32, x3), (y4, p42, 20), (x5, b5, y5), (p5, &a7) |
| ---- | ---------------------- |

```
int a;

f2(int*p)
{
    .........
    *p=10;      ← y1
    a=100;      ← y2
    .........
} f1()
{
    int b1, b2;
    .........
    s1:f2(&b1);
    .........
    s2:f2(&b2);
    .........
}
```

FIG. 22

[CALCULATION ALGORITHM FOR E_GEN[B]]

INPUT:BASIC BLOCK B
OUTPUT:E_GEN[B]
METHOD:
WSET=$\phi$;
for(FOLLOWING PROCESSING REPEATED FOR EACH INTERMEDIATE INSTRUCTION s EXTRACTED
    ONE AT A TIME IN ORDER FROM THE FIRST INTERMEDIATE INSTRUCTION IN B TO THE
    LAST INTERMEDIATE INSTRUCTION) {
        if(WHEN INTERMEDIATE INSTRUCTION s IS "a=b") {
            if(WHEN a IS VARIABLE v1) {
                for(REPEATED FOR ALL EXPRESSION SETS X∈WSET)
                {X=X−VEXP[s,v1];}       ... (1)
            }
            else
            if(WHEN a IS INDIRECT CALCULATION EXPRESSION *p) {
                for(REPEATED FOR ALL VARIABLES v2∈POINT[s,p]) {
                      for(REPEATED FOR ALL EXPRESSION SETS X∈WSET) {
                          X=X−VEXP[s,v2];
                    }
                }                    ... (2)
            }
            if(WHEN THERE IS A VALUE Y SUCH THAT Y∈WSET,a∈Y)Y=Y∪{b}; ... (3)
            else
            if(WHEN THERE IS A VALUE Y SUCH THAT Y∈WSET,b∈Y)Y=Y∪{a}; ... (4)
            else WSET=WSET∪{(a,b)};       ... (5)
        }
        else if(WHEN INTERMEDIATE INSTRUCTION s CALLS FUNCTION f) {
            for(REPEATED FOR ALL VARIABLES v3∈CHANGE[s,f]) {
                for(REPEATED FOR ALL EXPRESSION SETS X∈WSET) {
                    X=X−VEXP[s,v3];
                }
            }                  ... (6)
        }
}
return WSET;

FIG. 23

[CALCULATION ALGORITHM FOR E_PRE[B]]

```
INPUT:BASIC BLOCK B
OUTPUT:E_PRE[B]
METHOD:
WSET=E;
for (REPEATED FOR ALL INTERMEDIATE INSTRUCTIONS s IN B) {
      if (WHEN INTERMEDIATE INSTRUCTION s IS 'a=b') {
            if (WHEN a IS VARIABLE v1) {
                  WSET=WEST−VEXP[s, v1];                    ... (1)
            }
            else
            if (WHEN a IS INDIRECT CALCULATION EXPRESSION *p) {
                  for (REPEATED FOR ALL VARIABLES v2∈POINT[s, p])
                  {WEST=WEST−VEXP[s, v2];}                  ... (2)
            }
      }
      else if (WHEN INTERMEDIATE INSTRUCTION s CALLS FUNCTION f) {
            for (REPEATED FOR ALL VARIABLES v3∈CHANGE[s, f])
            {WEST=WEST−VEXP[s, v3];}                        ... (3)
      }
}
return WSET;
```

FIG. 24

[CALCULATION ALGORITHM FOR THE EQUIVALENT EXPRESSION SET GROUPS]

```
INPUT:CONTROL FLOW INFORMATION, AND E_GEN[B] and E_PRE[B] FOR EACH BLOCK B
OUTPUT:E_OUT[B], E_IN[B]
METHOD:
for(REPEATED FOR ALL INTERMEDIATE INSTRUCTIONS IN B) {
          E_GEN CALCULATED
          E_PRE CALCULATED
}

E_IN[B1] = φ;            /*B1:INITIAL BLOCK*/
E_OUT[B1] = E_GEN[B1];

for(REPEATED FOR ALL BASIC BLOCKS B ASIDE FROM B1) {
          E_OUT[B] = E_GEN[B] ∪e (E_PRE[B]);                    ... (1)
} repeat
          changed=false;
          for(REPEATED FOR ALL BASIC BLOCKS B ASIDE FROM B1) {
                    E_IN[B] = ∩e E_OUT[B'];
                         B' ∈pred[B]
                    old_E_OUT=E_OUT[B];
                    E_OUT[B] = E_GEN[B] ∪e (E_IN[B] ∩e (E_PRE[B]));
                    if(old_E_OUT!=E_OUT[B])      changed=true;
          }
until changed==false;
```

FIG. 25

[EQUIVALENCE REPLACEMENT ALGORITHM]

```
INPUT:BASIC BLOCK B
OUTPUT:BASIC BLOCK B AFTER EQUIVALENCE REPLACEMENT
METHOD:
WSET=E_IN[B];
for (FOLLOWING PROCESSING REPEATED FOR EACH INTERMEDIATE INSTRUCTION s EXTRACTED ONE AT A TIME IN ORDER FROM THE FIRST
    INTERMEDIATE INSTRUCTION IN B TO THE LAST INTERMEDIATE INSTRUCTION) {
        if (WHEN INTERMEDIATE INSTRUCTION s IS "a=b") {
            if (WHEN X∈WSET WHERE a∈X, b∈X IS PRESENT) {INTERMEDIATE INSTRUCTION s DELETE}
            else
            if (WHEN b IS A BINARY OPERATION, THAT IS, WHEN b IS "b1 op b2") {
                if (WHEN "b1 op b2" CAN BE REPLACED WITH "CONSTANT c1 op CONSTANT c2", WHICH
                    IS, WHEN c1 IS b1 ITSELF OR c1∈X1 WITH X1∈WSET AND b1∈X1,
                    AT THE SAME TIME, c2 IS b2 ITSELF OR c2∈X2 WITH X2∈WSET AND b2∈X2.
                ) {
                    CALCULATION RESULT OF "CONSTANT c1 op CONSTANT c2" SET AS EXPRESSION b IN INTERMEDIATE INSTRUCTION s
                }
            }
            else
            if (WHEN b IS A MONADIC OPERATION, THAT IS, WHEN b IS "op b1") {
                if (WHEN "op b1" CAN BE REPLACED WITH "op CONSTANT c1", WHICH IS,
                    WHEN c1 IS b1 ITSELF OR c1∈X1 WITH X1∈WSET AND b1∈X1.
                ) {
                    CALCULATION RESULT OF "op CONSTANT c1" SET AS EXPRESSION b IN INTERMEDIATE INSTRUCTION s
                }
            }
            if (WHEN a IS VARIABLE v1) {
                for (REPEATED FOR ALL SETS X∈WSET) {X=X-VEXP[s,v1];}
            }
            else
            if (WHEN a IS INDIRECT CALCULATION EXPRESSION *p) {
                for (REPEATED FOR ALL VARIABLE v2∈POINT[s,p]) {
                    for (REPEATED FOR ALL SETS X∈WSET) {X=X-VEXP[s,v2];}
                }
            }
            if (WHEN Y WHERE Y∈WSET, a∈Y IS PRESENT) Y=Y∪{b};
            else
            if (WHEN Y WHERE Y∈WSET, b∈Y IS PRESENT) Y=Y∪{a};
            else WSET=WSET∪{{a,b}};
        }
        else if (WHEN INTERMEDIATE INSTRUCTION s CALLS THE FUNCTION f) {
            for (REPEATED FOR ALL VARIABLES v3∈CHANGE[s,f]) {
                for (REPEATED FOR ALL SETS X∈WSET) {X=X-VEXP[s,v3];}
            }
        }
        else if (WHEN INTERMEDIATE INSTRUCTION s IS A CONDITIONAL BRANCH "if a cmp b goto label" WHERE
            cmp:COMPARING OPERATOR, label:BRANCH DESTINATION LABEL) {
            if (WHEN THERE ARE a1,b1 SUCH THAT "a1 cmp b1" IS TRUE OR FALSE, BUT a1
                IS a ITSELF OR a∈X1 WHERE X1∈WSET AND a1∈X1 AND b1 IS b ITSELF OR
                b1∈Y1 WHERE Y1∈WSET AND b1∈Y1) {
                WHEN "a1 cmp b1" IS TRUE, "a1 cmp b1" REPLACED WITH "(1)",
                WHEN "a1 cmp b1" IS FALSE "a1 cmp b1" REPLACED WITH "(0)",
            }
        }
}
```

FIG. 43A
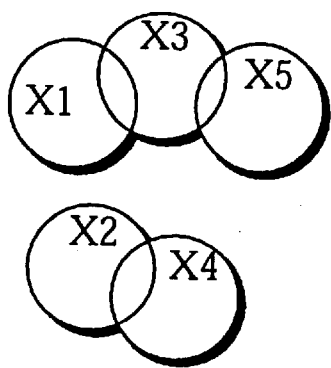
X = {X1, X2, X3, X4, X5}
FIG. 43B
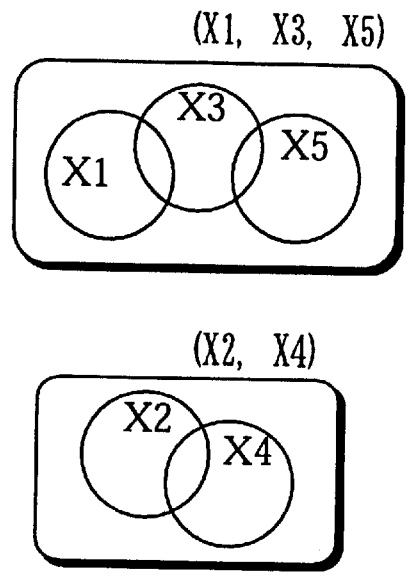
CM_PT [X] = { (X1, X3, X5), (X2, X4) }
 CM_PT
FIG. 43C
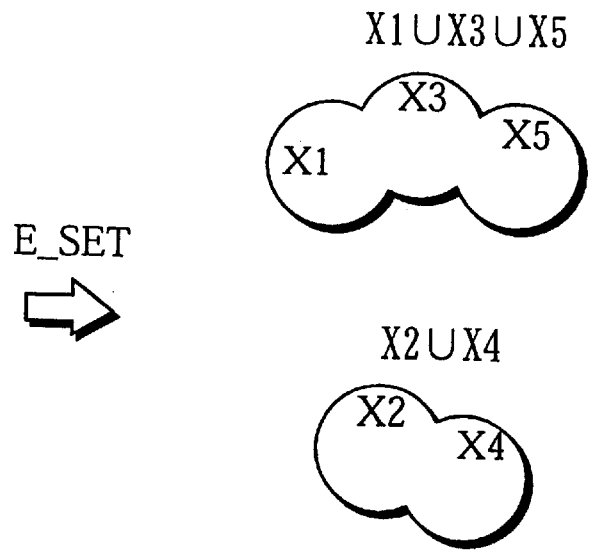
E_SET [CM_PT [X]] = {X1∪X3∪X5, X2∪X4}

OPTIMIZATION APPARATUS AND COMPUTER-READABLE STORAGE MEDIUM STORING OPTIMIZATION PROGRAM

This application is based on an application No. 9-265655 filed in Japan, the content of which is hereby incorporated by reference.

BACKGROUND OF THE INVENTION

1. Field of the Invention

The present invention relates to an optimization apparatus equipped in a compiler apparatus, and to a computer-readable storage medium storing an optimization program.

2. Description of the Background Art

In recent years, electronics engineers have found it very difficult to develop embedded microcomputer systems that realize high-level and complex control. In general, an embedded microcomputer system refers to a computer system in which a mask ROM that stores all control programs from the firmware to application programs is integrated with a microprocessor. Such embedded microcomputer systems have increasingly been used in household electrical appliances, machine tools, information apparatuses, and communication apparatuses.

Nowadays it is common to develop programs embedded in such microcomputer systems using high-level programming language, such as C, since in view of recent rapid increases in scale of embedded-type application software, it is no longer possible to realize the high-level processing required for these embedded programs in the old software development environment based on assembly language. Also, to develop the embedded programs that realize high-level processing using assembly language puts a considerable burden on engineers.

However, when compared with application software developed using assembly language, machine-language software developed using high-level language has a problem of high redundancy. Accordingly, manufacturers who intend to suppress the cost of their products are reluctant to use high-level programming language to develop embedded programs.

For embedded processors, programs have to be stored in ROM, so that increases in program size can greatly affect manufacturing cost. Also, when specific performance (execution speed) is required for products, more expensive microprocessors have to be used or microprocessors have to operate at higher clock speeds, due to an increase in the execution time of embedded programs.

Thus, there are the notable disadvantages in using high-level programming language to develop embedded programs. To allow greater use of high-level programming language when developing embedded software, it is necessary to establish a high-level optimization algorithm that can eliminate redundancy of the resulting software.

While there are many definitions of program redundancy, in the present specification program redundancy indicates all factors, that are present in a program written in high-level language or intermediate language, which cause increases in code size and execution time of a machine language program after compiling.

Before explaining conventional optimization apparatuses, the construction of conventional compiler apparatuses is explained below, with reference to the following publications.

(1) A. V. Aho, R. Sethi, J. D. Ullman (1986): Compilers: *Principles, Techniques, and Tools*, Addison-Wesley Publishing Company Inc. (translated in Japanese by Kenichi Harada (1990): *Compilers I, II*, Science company Inc.)

(2) Hans Zima (1991): *Supercompilers for Parallel and Vector Computers*, Addison-Wesley Publishing Company Inc. (translated in Japanese by Yoichi Muraoka (1995): *Supercompilers*, Oum Company Inc.)

(3) Masataka Sasa (1989): *Programming Language Processing System*, Iwanami

FIG. 1 shows the construction of a conventional compiler apparatus. In the figure, the compiler apparatus includes a syntax analysis apparatus 41, an optimization apparatus 42, and a code generation apparatus 49.

The syntax analysis apparatus 41 performs lexical analysis, syntax analysis, and semantic analysis on a source program which is stored as a file in a storage device (not illustrated) and converts the source program to an intermediate program to simplify the processing by the compiler apparatus. Here, each step (construct) in the intermediate program is called an intermediate instruction. Types of intermediate instructions include a quadruple, a triple, and an abstract syntax tree (reference (1): p.464). Such intermediate instructions are further converted to object code by the code generation apparatus 49. In this specification, the syntax analysis apparatus 41 is not explained in detail, since it is not especially related to optimization processing which is the main focus of the present invention.

The optimization apparatus 42 optimizes the intermediate program to reduce the program size and the execution time of the resulting machine language program. The optimization apparatus 42 includes an optimization control unit 43, a control flow information analysis unit 44, a data flow information analysis unit 45, an intermediate code optimization unit 46, a control flow information storage unit 47, and a data flow information storage unit 48.

The control flow information analysis unit 44 divides the intermediate program into basic blocks where the control flow is unidirectional, and obtains control flow information that shows the control flow between basic blocks (reference (1): p.528). The basic blocks are explained in detail later.

The data flow information analysis unit 45 analyzes the intermediate code using the control flow information and obtains data flow information showing reaching definitions, available expressions, and live variables (for more details, see reference (1): pp.608–722). This data flow information is obtained by finding information that is to be used as data flow information, setting data flow equations for the entry and exit points of the basic blocks, and calculating the data flow equations according to an iterative algorithm.

The intermediate code optimization unit 46 uses the control flow information and the data flow information to optimize the intermediate code. Examples of such optimization processing are deletion of basic blocks that are beyond control using the control flow information, optimization of common subexpressions using the information on available expressions (reference (1): p.592), copy propagation using the information on reaching definitions (reference (1): p.594), and deletion of unnecessary code using the information on live variables (reference (3): p.482). The optimization processing is explained in greater detail later.

The control flow information storage unit 47 stores the control flow information generated by the control flow information analysis unit 44.

The data flow information storage unit 48 stores the data flow information generated by the data flow information analysis unit 45.

The code generation apparatus 49 allocates registers or memory to variables written in the intermediate program and converts each intermediate instruction to a machine language instruction. This code generation apparatus 49 is not the main focus of the present invention and so is not explained in detail here.

The following is a more detailed explanation of the optimization apparatus 42, focusing on features related to the present invention, namely, the copy propagation using the information on reaching definitions and the optimization of common subexpressions using the information on available expressions.

First, the terms used in the explanation are introduced.

<Program Point>

Any point located between two adjacent intermediate instructions (reference (3):p.461).

<Basic Block> (reference (1): p.528)

When optimizing the program, there is a danger that the algorithm will be destroyed by rewriting instructions which include jump instructions or jump destinations. Accordingly, in the optimization processing, the execution order has to be unidirectional from the start to the end. Hence, in the intermediate program, each part (block) that includes neither a jump nor a jump destination is called a basic block, which is the minimum unit of the optimization processing. A point immediately before a first intermediate instruction in a basic block is called the entry point of the basic block, while a point immediately after a last intermediate instruction in the basic block is called the exit point of the basic block. A basic block is not divided when it includes a subroutine (function) call intermediate instruction, since optimization information can be analyzed more extensively if the program is divided into larger blocks.

In the following explanation, each basic block is a set of intermediate instructions, whereby "s∈B" expresses that intermediate instruction s belongs to basic block B. Basic blocks executed immediately before basic block B are called "preceding blocks", a set of preceding blocks of basic block B being expressed as "pred(B)" (reference (1): p.532). Also, basic blocks executed immediately after basic block B are called "succeeding blocks", a set of succeeding blocks of basic block B being expressed as "succ(B)". An example of basic blocks is shown in FIG. 2. Preceding blocks of basic block BLK2 are basic blocks BLK1 and BLK5, while succeeding blocks of basic block BLK2 are basic blocks BLK3 and BLK4. A basic block which is executed first and which does not have preceding blocks is called an "initial block".

<Definitions and Uses of Variables>

"to define" means to set a certain value in a variable, and "to use" or "to refer" means to use the set value (reference (3): p.419). In an intermediate instruction "s1: a=b op c" (a, b, c=variables, op=operator), intermediate instruction s1 is both a definition of variable a and a use (reference) of variables b and c. For simplicity's sake, hereinafter "s1(a=)" expresses that intermediate instruction s1 is a definition of variable a, and "s1(=b)" expresses that intermediate instruction s1 is a use (reference) of variable b.

<Reaching Definition>

A reaching definition is one of the fundamental elements in data flow information. If variable x is used in intermediate instruction s, definition d that sets the value of variable x is called a reaching definition that reaches, which is to say, is unbroken until, intermediate instruction s. While the word "reaching" is used in reference (3), the present specification also uses the word "unbroken" to express this concept.

If, in a route from definition d that defines variable x to intermediate instruction s, a different definition of variable x exists, definition d does not reach intermediate instruction s. If, on the other hand, no other definitions exist, definition d reaches intermediate instruction s. Such definitions d that reach intermediate instruction s are called reaching definitions.

Note here that variable x is not necessarily used in intermediate instruction s. Also, in the above explanation, "intermediate instruction s" can be replaced with "point p immediately before intermediate instruction s".

When a basic block has a plurality of preceding blocks, a plurality of definitions included in the plurality of preceding blocks may reach the same intermediate instruction in the basic block. An example of this case is shown in FIG. 5. In a route from intermediate instruction s17 that defines variable b2 in basic block B1 to intermediate instruction s33 that uses variable b2, intermediate instruction s17 is a definition that reaches intermediate instruction s33. In the same way, intermediate instruction s29 that defines variable b2 in basic block B2 is also a definition that reaches intermediate instruction s33. Thus, variable b2 in intermediate instruction s33 has the two reaching definitions located in the two preceding blocks. Also, though intermediate instruction s33 does not use variable t21, intermediate instruction s13 which defines variable t21 is a definition that is unbroken until intermediate instruction s33, when no other definitions that define variable t21 exist between intermediate instruction s13 and intermediate instruction s33.

<Data Flow Equations>

In order to obtain data flow information showing which definition(s) reaches each intermediate instruction, it is necessary to set data flow equations and solve the data flow equations using an iterative method (reference (3): pp.471–472). This data flow equations are explained below.

Here, a group of definitions that are generated in basic block B and that are unbroken until the exit point of basic block B is expressed as "GEN[B]". This group is expressed by Equation 2.

{Equation 2}

GEN[B]={s|s(x=)∈B, where s'(x=) does not exist between s and exit point B}

Next, when there are a group of definitions that define variable x in basic blocks other than basic block B, and when intermediate instruction "s'(x=)" exists in basic block B, the group of definitions of variable x is expressed as "KILL[B]". This group is expressed by Equation 3.

{Equation 3}

KILL[B]={s|s(x=)δ(basic blocks other than B), where s'(x=)∈B exists}

Next, a group of definitions that potentially reach the entry point or basic block B is expressed as "IN[B]", while a group of definitions that potentially reach the exit point of basic block B is expressed as "OUT[B]". These groups are expressed by Equation 4.

{Equation 4}

IN[B]={s|where s'(x=) does not exist between intermediate instruction s(x=) and entry point B}

OUT[B]={s|where s'(x=) does not exist between intermediate instruction s(x=) and exit point B}

From the above equations, data flow equations are expressed by Equation 5.

{Equation 5}

$$IN[B] = \bigcup_{B' \in pred(B)} OUT[B'] \quad (1)$$

$$OUT[B] = GEN[B] \cup (IN[B] - KILL[B]) \quad (2)$$

Here, "∪" indicates a set total, while "−" indicates a set difference. Equation 5(1) shows that definitions which are unbroken until the entry point of basic block B are a set total of definitions which are unbroken until the exit points of preceding blocks of basic block B. Equation 5(2) shows that definitions which are unbroken until the exit point of basic block B are a set total of definitions GEN[B] generated in basic block B and definitions which are unbroken until the entry point of basic block B and which define variables that are not defined in basic block B.

Equation 5 is a simultaneous equation in which IN[B] and OUT[B] are variables. By solving this equation, IN[B] that reaches basic block B is obtained. As a result, a reaching definition for each intermediate instruction in basic block B can be easily obtained in the execution order by changing the content of IN[B] as necessary (see reference (3): p.475).

<Iterative Algorithm for the Data Flow Equations>

An iterative algorithm is commonly used to solve the data flow equations as in the case of reaching definitions (reference (3): pp.473–474). FIG. 3 shows such an iterative algorithm.

Here, each sentence, such as "repeat", "for", and "if", and each operator, such as "=", "!=", and "==", are written in C, while "false" and "true" are respectively given values 0 and 1. Other algorithms described in this specification are written in the same way.

In the above algorithm, the calculations of IN[B] and OUT[B] are repeated until the value of OUT[B] of each basic block B no longer changes, that is, until the value converges, IN[B] and OUT[B] obtained as such are the solutions of the data flow equations. For the convergency of the iterative algorithm, it is usually necessary for the sets of data flow information to be a semi-lattice to a confluent calculation (reference (2): pp.79–88). For instance, in the case of reaching definitions, it is necessary to show that a group of reaching definitions is a semi-lattice to the confluence calculation "∪" for preceding blocks.

Also, it is necessary to show that function f which shows the effect of each basic block is a monotonic function. For example, in the case of reaching definitions, it is necessary to show a function "f(X)=GEN[B]∪(X−KILL[B])" is a monotonic function, where X is IN[B] in the equation for OUT[B].

<Use–Definition Chain Information, Definition–Use Chain Information> (reference (3): p.476)

Use-definition chain information is information, produced from the reaching definition information, that shows a list of definitions which are unbroken until each use of a variable. In FIG. 4, when intermediate instructions s12 and s24 that define variable b1 are reaching definitions for intermediate instruction s32 that uses variable b1, the use-definition chain information for variable b1 in intermediate instruction s32 is given as a list (s12,s24).

On the other hand, definition-use chain information shows a list of uses of a variable until which each definition is unbroken. In FIG. 4, when intermediate instruction s12 which defines variable b1 reaches intermediate instruction s32, definition-use chain information for variable b1 in intermediate instruction s12 is given as a list (s32). The same can be applied to intermediate instruction s24. Also, in FIG. 7, when intermediate instruction s5 which defines variable x4 is unbroken until intermediate instructions s16, s27, and s35 that each use variables x4, definition-use chain information for variable x4 in intermediate instruction s5 shows a list (s16,s27,s35).

In FIGS. 4–8, use-definition chain information and definition-use chain information are illustrated by dashed arrows. For example, in FIG. 4, the dashed arrow from s32 to s12 shows use-definition chain information for variable b1, while the dashed arrow from s12 to s32 shows definition-use chain information for variable b1.

<Available Expressions>

An available expression is also a fundamental element in data flow information. In each route from the start point of the program to intermediate instruction s, an expression "E: x op y" (op=operator) is evaluation of expression E and intermediate instruction s, expression E is available in intermediate instruction s. In the above explanation, "intermediate instruction s" can be replaced with "point p immediately before intermediate instruction s".

An example is given in FIG. 7. In the route from intermediate instruction s16 to intermediate instruction s35, when intermediate instruction s16 is the last evaluation of expression x4+y4 (that is to say, there is no intermediate instruction, other than s16, that executes expression x4+y4 between s16 and s35), when there are no definitions of variables x4 and y4, and when the same applies to s27, expression x4+y4 is an available expression in intermediate instruction s35.

The information on available expressions is obtained by defining data flow equations relating to the available expressions and by calculating the equations according to an iterative algorithm, in the same way as the information on reaching definitions (reference (3): pp476–479).

The following is an explanation of the copy propagation and the common subexpression optimization using the data flow information on reaching definitions and available expressions.

<Copy Propagation>

When there is an intermediate instruction "s: x=y" (hereinafter referred to as "copy"), and intermediate instruction s is the only definition that is unbroken until intermediate instruction s' which uses variable x, variable x in intermediate instruction s' is replaced with y (this replacement is called copy propagation). Also, if there is no intermediate instruction, aside from intermediate instruction s', that uses x, intermediate instruction s is deleted. In FIG. 6, intermediate instruction s6 is the only definition of variable t32 that reaches intermediate instructions s26 and s30, while intermediate instructions s26 and s30 are the only uses of variable t32 defined in intermediate instruction s6. Accordingly, variable t32 in each intermediate instruction s26 and s30 is replaced with x3, and intermediate instruction s6 is deleted (reference (3): p.445).

<Common Subexpression Optimization>

The common subexpression optimization is performed in order to avoid the evaluation (execution) of an expression that has already been evaluated.

In FIG. 7, for instance, expression x4+y4 is an available expression in intermediate instruction s35. Here, since expression x4+y4 has already been evaluated in intermediate instructions s16 and s27, it is unnecessary to evaluate expression x4+y4 in intermediate instruction s35. Accordingly, the common subexpression optimization is performed by introducing new variable w, rewriting intermediate instructions s16, s27, and s35, and writing new intermediate instructions s50 and s51 as copies, as shown in FIG. 8. This type of optimization is used when, despite the inclusion of new intermediate instructions s50 and s51, an overall reduction of cost (program size and execution time) is possible by canceling the evaluation of expression x4+y4 in intermediate instruction s35 (reference (3): p.446).

However, to perform optimization based on global dependency between a plurality of basic blocks using the data flow information, much analysis time is required to confirm that the copy propagation or the deletion of instructions is possible. Since a plurality of execution orders and a plurality of dependence relations exist when a plurality of basic blocks are activated by conditional branch instructions, the analysis of the global dependency has to be performed thoroughly. Also, thorough analysis has to be performed on the assumption of feedback-type dependency, in which the control flow of a branch origin basic block depends on the control flow of a branch destination basic block. Even when considerable time is spent in analyzing the global dependency which crosses over between basic blocks, it is still uncertain whether it is safe to perform the optimization on the basic blocks. For these reasons, the above types of optimization are problematic.

The following is a description on how analysis to confirm the safety of optimization is executed, with reference to FIGS. 4–7.

In FIG. 4, since variable a1 is equal to variable b1 in intermediate instruction s32, it appears that intermediate instruction s32 can be deleted. However, there are two definitions of variable b1, namely, intermediate instructions s12 and s24, that are unbroken until intermediate instruction s32. Accordingly, copy propagation cannot be performed on intermediate instructions s12 and s24, so that a different type of optimization needs to be executed. To execute the different type of optimization, it is necessary to check which intermediate instruction is a reaching definition for variable b1 in intermediate instruction s32, and how variable b1 is defined in that intermediate instruction. In the example shown in FIG. 4, it is necessary to check that intermediate instructions s12 and s24 are copies that each have variable a1 on the right side. Here, use-definition dependency for variable b1 in intermediate instruction s32 is relatively simple, so that the need for optimization can be determined by referring to use-definition chain information for variable b1.

In FIG. 5, on the other hand, there are more complex dependency relations among the basic blocks and accordingly use-definition chain information needs to be analyzed in more detail. In the figure, it appears that intermediate instruction s33 can be deleted according to the use-definition chain information and definition-use chain information.

However, in order to confirm the safety in deleting intermediate instruction s33, first it is necessary to check intermediate instruction s17 shown in the use-definition chain information for variable b2 in intermediate instruction s33 and detect the right side member (variable t21) in intermediate instruction s17. Then, by referring to the use-definition chain information for variable t21 in intermediate instruction s17, intermediate instruction s13 that defines variable t21 is obtained and its right side member (variable a2) is detected. The same processing has to be performed on intermediate instruction s29 shown in the use-definition chain information for variable b2 in intermediate instruction s33 and intermediate instruction s25 shown in the use-definition chain information for variable t22 in intermediate instruction s29. Thus, it is necessary to thoroughly check that variable b2 is equal to variable a2 in every case by tracing use-definition chain information step by step. As a result, it is confirmed that intermediate instruction s33 can be deleted.

In FIG. 6, dependency relations are further complex, so that it is necessary to analyze not only use-definition chain information but definition-use chain information. Though it appears that intermediate instruction s34 can be deleted, both use-definition chain information and definition-use chain information have to be analyzed in order to confirm the safety in deleting intermediate instruction s34. First, as in FIG. 5, intermediate instructions s18 and s15 are traced respectively from the use-definition chain information for variable b3 in intermediate instruction s34 and the use-definition chain information for variable t31 in intermediate instruction s18, in order to confirm that variable b3 is equal to variable a3. Next, intermediate instruction s30 is traced from the use-definition chain information for variable b3 in intermediate instruction s34, and intermediate instruction s6 is traced from the use-definition chain information for variable t32 in intermediate instruction s30. Then, intermediate instruction s26 is traced from the definition-use chain information for variable t32 in intermediate instruction s6. Finally, by checking the left side member (variable a3) in intermediate instruction s26, it is confirmed that variable a3 is equal to variable b3 in intermediate instruction s34. If the left side member in intermediate instruction s26 is not variable a3, it is necessary to trace other intermediate instructions shown in the definition-use chain information for variable t32 in intermediate instruction s6.

Thus, considerable analysis time is spent in judging that variable x is equal to variable y in an intermediate instruction "s: x=y" in order to confirm the safety in optimization, since use-definition chain information and definition-use chain information have to be traced step by step.

In FIG. 7, it appears that intermediate instruction s35 can be deleted, since in the preceding blocks variable a4 has the same value as expression x4+y4 as shown in the use-definition chain information and the definition-use chain information in intermediate instructions s16, s20, s27, and s31. However, in the common subexpression optimization described above, intermediate instruction s35 can be changed to a copy but cannot be deleted. Accordingly, optimization different from the common subexpression optimization is required. To confirm that variable a4 is equal to the value of expression x4+y4 in intermediate instruction s35, not only the use-definition chain information and definition-use chain information (as in FIGS. 4–6) but expression x4+y4 needs to be analyzed, so that the analysis time is further prolonged.

The above analysis is necessary to eliminate the dangers associated with optimizing the program. However, since it requires considerable analysis time, such optimization processing is far from practical. Besides, there is no guarantee that the analysis time can be completed within a specified period. Thus, the conventional optimization methods are not effective in optimizing the program over a plurality of basic blocks, as it cannot sufficiently reduce the redundancy between the plurality of basic blocks.

SUMMARY OF THE INVENTION

In view of the above problems, the first object of the present invention is to provide an optimization apparatus that can eliminate the dangers associated with program rewriting within a short analysis time and that can efficiently eliminate program redundancy.

The second object of the present invention is to provide an optimization apparatus that has a high-level analysis capability for global optimization over a plurality of basic blocks.

In view of the stated objects, the most significant feature of the present invention is to analyze, for each basic block, which inter-expression equivalence relations are present at the exit point of a basic block, and how the equivalence relations are distributed to the entry points of branch destination basic blocks for the basic block. The main problem associated with conventional optimization methods is the difficulty to analyze inter-expression equivalence relations between the exit point of a branch origin basic block and the entry point of a branch destination basic block. The present invention addresses this problem and realizes an optimization apparatus that can analyze global dependency in the program.

The optimization apparatus of the present invention is an optimization apparatus for optimizing a program by analyzing inter-expression equivalence relations which each show that an expression located on one of a left side and a right side of an instruction can be replaced with another expression without causing changes in a program execution, the program being divided into a plurality of basic blocks based on branch origin-branch destination relations, the optimization apparatus including: a first analysis unit for analyzing, for each basic block, equivalence relations among a plurality of expressions at an exit point of an analyzed basic block, the equivalence relations being maintained until an entry point of a basic block that is a branch destination for the analyzed basic block; a second analysis unit for analyzing, for each basic block, which equivalence relations at an entry point of an analyzed basic block disappear due to processing on each instruction in the analyzed basic block, and for analyzing equivalence relations that are newly produced by the processing of each instruction in the analyzed basic block; a qualification judgement unit for judging, for each basic block, whether an E_OUT equivalent expression set group, composed of equivalent expression sets found to have equivalence relations at an exit point of a basic block, qualifies for being used to optimize the basic block, after analysis by the second analysis unit; a repeat unit for having the first analysis unit and the second analysis unit repeat respective analyses, when the qualification judgement unit judges that an E_OUT equivalent expression set group of any of the plurality of basic blocks does not qualify; and a block internal optimization unit for optimizing, when the qualification judgement unit judges that an E_OUT equivalent expression set group of each basic block qualifies, instructions in each basic block using an E_IN equivalent expression set group, composed of equivalent expression sets found to have equivalence relations at an entry point of each basic block, that is most recently obtained by the first analysis unit and the second analysis unit.

The inter-expression equivalence relation shows that an expression in the program can be replaced with another expression without causing changes in program execution. The present specification provides data flow equations to calculate the E_IN and E_OUT equivalent expression set groups, which respectively show all equivalent expression sets whose equivalence relations are established at the entry point and exit point of each basic block, from the E_GEN equivalent expression set group and E_PRE expression group obtained by analyzing each basic block. By repeatedly calculating the data flow equations until the convergence solutions are obtained, equivalent expression set groups between a plurality of basic blocks can be efficiently obtained, even when basic blocks are activated by conditional branch instructions in complex ways and thus various execution orders exist, or when feedback dependency is present in the program in which the control flow of branch destination basic block.

With the above construction, global equivalence between a plurality of expressions can be efficiently analyzed using the $E_{13}IN$ and $E_{13}OUT$ equivalent expression set groups that show generation and disappearance of equivalence relations between a plurality of basic blocks.

Thus, by repeatedly calculating the data flow equations for each basic block, all equivalent expression sets which establish equivalence at the entry point of each basic block can be obtained as an equivalent expression set group, regardless of an execution order of the plurality of basic blocks. Accordingly, the global optimization of the program can be executed safely using the obtained equivalent expression set groups.

Here, the first analysis unit may include a first calculation unit for regenerating, for each basic block, after an $E_{13}OUT$ equivalent expression set group of each basic block is generated, an $E_{13}IN$ equivalent expression set group of a basic block by performing an equivalence intersection calculation on $E_{13}OUT$ equivalent expression set groups of basic blocks which have the basic block as a common branch destination, wherein the second analysis unit includes a second calculation unit for regenerating, for each basic block, an $E_{13}OUT$ equivalent expression set group of the basic block by calculating "Formula 1" using the $E_{13}IN$ equivalent expression set group regenerated by the first calculation unit, an $E_{13}GEN$ equivalent expression set group generated by the $E_{13}GEN$ equivalent expression set group generation unit for the basic block, and an $E_{13}PRE$ expression group generated by the $E_{13}PRE$ expression group generation unit for the basic block, wherein "Formula 1" is $E_{13}OUT[B]=E_{13}GEN[B] \cup e(E_{13}IN[B] \cap e E_{13}PRE[B])$, B representing a basic block in the program, $\cap e$ representing an equivalence intersection operator, and $\cup e$ representing an equivalence union operator.

With the above construction, the first and second calculation units repeat the equivalence union calculation and equivalence intersection calculation for calculating the data flow equations, until the equivalent expression set groups of each basic block become unchanged.

Since the data flow equations are monotonic functions, the process of repeatedly solving the data flow equations can be completed within a limited time period.

Also, the initial $E_{13}OUT$ equivalent expression set group of each basic block is calculated from the $E_{13}PRE$ expression group which is composed of expressions, among all expressions written in the program, that are not changed by successive processing of instructions in each basic block, and the $E_{13}GEN$ equivalent expression set group which is generated in each basic block. Accordingly, the largest solutions can be obtained for each basic block by repeatedly solving the data flow equations.

Since an equivalent expression set group is calculated from the $E_{13}IN$ equivalent expression set group of a basic block whenever an instruction in the basic block is executed, an expression present in an instruction can be replaced with an expression which has an equivalence relation with the expression. Thus, redundant instructions can be effectively rewritten. As a result, the program redundancy is eliminated, and the execution time and the program size of the resulting machine language program can be reduced.

Here, the qualification judgement unit may judge whether the $E_{13}OUT$ equivalent expression set group regenerated by the second calculation unit qualifies for being used to optimize the basic block, wherein, when the qualification judgement unit judges that an $E_{13}OUT$ equivalent expression set group of any of the plurality of basic blocks does not qualify, the first calculation unit newly generates, for each basic block, an $E_{13}IN$ equivalent expression set group of a basic block by performing an equivalence intersection calculation on $E_{13}OUT$ equivalent expression set groups of basic blocks which have the basic block as a common branch destination, and the second calculation unit newly generates, for each basic block, an $E_{13}OUT$ equivalent expression set group of the basic block by calculating "Formula 1" using the $E_{13}IN$ equivalent expression set group newly generated by the first calculation unit, the $E_{13}GEN$ equivalent expression set group generated by the $E_{13}GEN$ equivalent expression set group generation unit for the basic block, and the $E_{13}PRE$ expression group generated by the $E_{13}PRE$ expression group generation unit for the basic block.

With the above construction, the process of solving the data flow equations is repeated until the most appropriate solutions to be used for the global optimization of the plurality of basic blocks are obtained.

Here, the qualification judgement unit may include: a transient group storage unit for storing an $E_{13}OUT$ equivalent expression set group generated by the second calculation unit as a transient group; a comparison unit for comparing, when a new $E_{13}OUT$ equivalent expression set group is generated by the second calculation unit, the new $E_{13}OUT$ equivalent expression set group with the transient group; and a judgement unit for judging that the transient group qualifies if the new $E_{13}OUT$ equivalent expression set group and the transient group match, and judging that the transient group does not qualify if the new $E_{13}OUT$ equivalent expression set group and the transient group are different.

With the above construction, inter-expression equivalence relations can be analyzed over a plurality of basic blocks in a short time using the data flow equations. As a result, the overall program redundancy can be eliminated, so that the execution time and the program size of the machine language program can be reduced.

Here, the block internal optimization unit may include a processing storage unit initialization unit for setting the $E_{13}IN$ equivalent expression set group, most recently obtained by the first analysis unit for the basic block, in the processing storage unit, wherein the instruction optimization unit includes: a first redundancy elimination unit for replacing an expression in the retrieved instruction with an expression which has an equivalence relation with the expression by referring to equivalent expression sets in the $E_{13}IN$ equivalent expression set group stored in the processing storage unit; and a second redundancy elimination unit for deleting, when the retrieved instruction is an assignment instruction whose expressions on both sides are included in one of the equivalent expression sets in the processing storage unit, the retrieved instruction from the program, and wherein the update unit includes: a first processing storage unit update unit for deleting, when the retrieved instruction is an assignment instruction whose left side member is a variable, expressions affected by processing of the assignment instruction from the equivalent expression sets in the processing storage unit; a second processing storage unit update unit for deleting, when the retrieved instruction is an assignment instruction whose left side member is an indirect calculation expression, expressions affected by variables which are potentially changed by processing of the assignment instruction from the equivalent expression sets in the processing storage unit; a third processing storage unit update unit for adding, when the retrieved instruction is an assignment instruction and the processing storage unit stores at least one equivalent expression set including an expression located on one side of the assignment instruction, an expression on another side of the assignment instruction to the equivalent expression sets, and for generating, when the processing storage unit stores no equivalent expression sets including an expression located on any side of the assignment instruction, an equivalent expression set composed of expressions on both sides of the assignment instruction and adding the generated equivalent expression set to the processing storage unit; a fourth processing storage unit update unit for deleting, when the retrieved instruction is a function call instruction, expressions affected by variables which was potentially changed by processing of the function call instruction from the equivalent expression sets stored in the processing storage unit; and an equivalence replacement optimization control unit for activating the processing storage unit initialization unit, then activating the first redundancy elimination unit and the second redundancy elimination unit for each instruction, and then successively activating the first processing storage unit update unit, the second processing storage unit update unit, the third processing storage unit update unit, and the fourth processing storage unit update unit.

With the above construction, when expressions on both sides of an assignment instruction are equivalent, such an assignment instruction can be deleted from the program.

Here, the block internal optimization unit may include a third redundancy elimination unit for replacing, when the retrieved instruction is an assignment instruction whose expression on a right side is included in an equivalent expression set in the processing storage unit along with a constant, the expression with the constant, and for replacing, when the retrieved instruction is an assignment instruction whose expression on the right side is one of a binary calculation expression and a monadic calculation expression with each variable used in the expression being included in an equivalent expression set in the processing storage unit along with a constant, each variable used in the expression with a corresponding constant, calculating the expression, and replacing the expression with the calculation result, wherein the equivalence replacement optimization control unit activates the processing storage unit initialization unit, then activates the first redundancy elimination unit, the second redundancy elimination unit, and the third redundancy elimination unit for each instruction, and then successively activates the first processing storage unit update unit, the second processing storage unit update unit, the third processing storage unit update unit, an the fourth processing storage unit update unit.

With the above construction, redundancy can be eliminated by replacing an expression with a constant if possible.

Here, the block internal optimization unit may include a fourth redundancy elimination unit for replacing, when the retrieved instruction is a conditional branch instruction and expressions on both sides of a conditional expression written in the conditional branch instruction are included in equivalent expression sets in the processing storage unit, the conditional expression with "(1)" if it is validated that a condition given by the conditional expression is definitely met, and replacing the conditional expression with "(0)" if it is validated that the condition given by the conditional expression is definitely unmet, wherein the equivalence replacement optimization control unit activates the processing storage unit initialization unit, then activates the first redundancy elimination unit, the second redundancy elimination unit, the third redundancy elimination unit, and the fourth redundancy elimination unit for each instruction, and then successively activates the first processing storage unit update unit, the second processing storage unit update unit, the third processing storage unit update unit, and the fourth processing storage unit update unit.

With the above construction, redundancy can be eliminated by replacing a conditional expression with either "(1)" or "(0)" which shows whether the condition is definitely met. Also, while redundancy of instructions in each basic block is eliminated in the optimization process, the equivalent expression set group is modified in accordance with changes resulting from the optimization process. As a result, the highly accurate equivalent expression set group can be obtained, so that the execution time and the program size of the machine language program can be reduced.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3 shows an iterative algorithm for reaching definitions;

FIG. 4 shows an example program used in the description of the background art;

FIG. 12A shows an example of a POINT set;

FIG. 12B shows an example of a CHANGE set;

FIG. 13A shows the storage content of the universal expression storage unit 23;

FIG. 13B shows the storage content of the $E_{13}$GEN group storage unit 30;

FIG. 13C shows the storage content of the $E_{13}$PRE group storage unit 31;

FIG. 14A shows the transition of the storage content of the $E_{13}$GEN processing expression set storage unit 28;

FIG. 14B shows the transition of the storage content of the $E_{13}$PRE processing expression storage unit 29;

FIG. 14C shows the transition of the storage content of the former $E_{13}$OUT group storage unit 35;

FIG. 15A shows the initial content of the $E_{13}$IN group storage unit 32;

FIG. 15B shows the initial content of the $E_{13}$OUT group storage unit 33;

FIG. 16A shows the storage content of the $E_{13}$IN group storage unit 32 after the first loop processing;

FIG. 16B shows a result of an equivalence intersection calculation between the $E_{13}$IN equivalent expression set group and the $E_{13}$PRE expression group;

FIG. 16C shows the storage content of the $E_{13}$OUT group storage unit 33 after the first loop processing;

FIG. 17A shows the content of the $E_{13}$IN equivalent expression set group in the equivalence information storage unit 19;

FIG. 17B shows the content of the $E_{13}$OUT equivalent expression set group in the equivalence information storage unit 19;

FIG. 18A shows the transition of the storage content of the processing expression set storage unit 101 when basic block BLK2 is processed;

FIG. 18B shows the transition of the storage content of the processing expression set storage unit 101 when basic block BLK4 is processed;

FIG. 18C shows the transition of the storage content of the processing expression set storage unit 101 when basic block BLK5 is processed;

FIG. 20 shows an example of the process of generating the $E_{13}$GEN equivalent expression set group;

FIG. 22 shows a calculation algorithm for the $E_{13}$GEN equivalent expression set groups;

FIG. 23 shows a calculation algorithm for the $E_{13}$PRE expression groups;

FIG. 24 shows a calculation algorithm for the equivalent expression set groups;

FIG. 25 shows an equivalence replacement algorithm;

FIGS. 43A, 43B, and 43C show concepts of the equivalence union calculation.

DESCRIPTION OF THE PREFERRED EMBODIMENT(S)

1. Introduction

Figure 1:
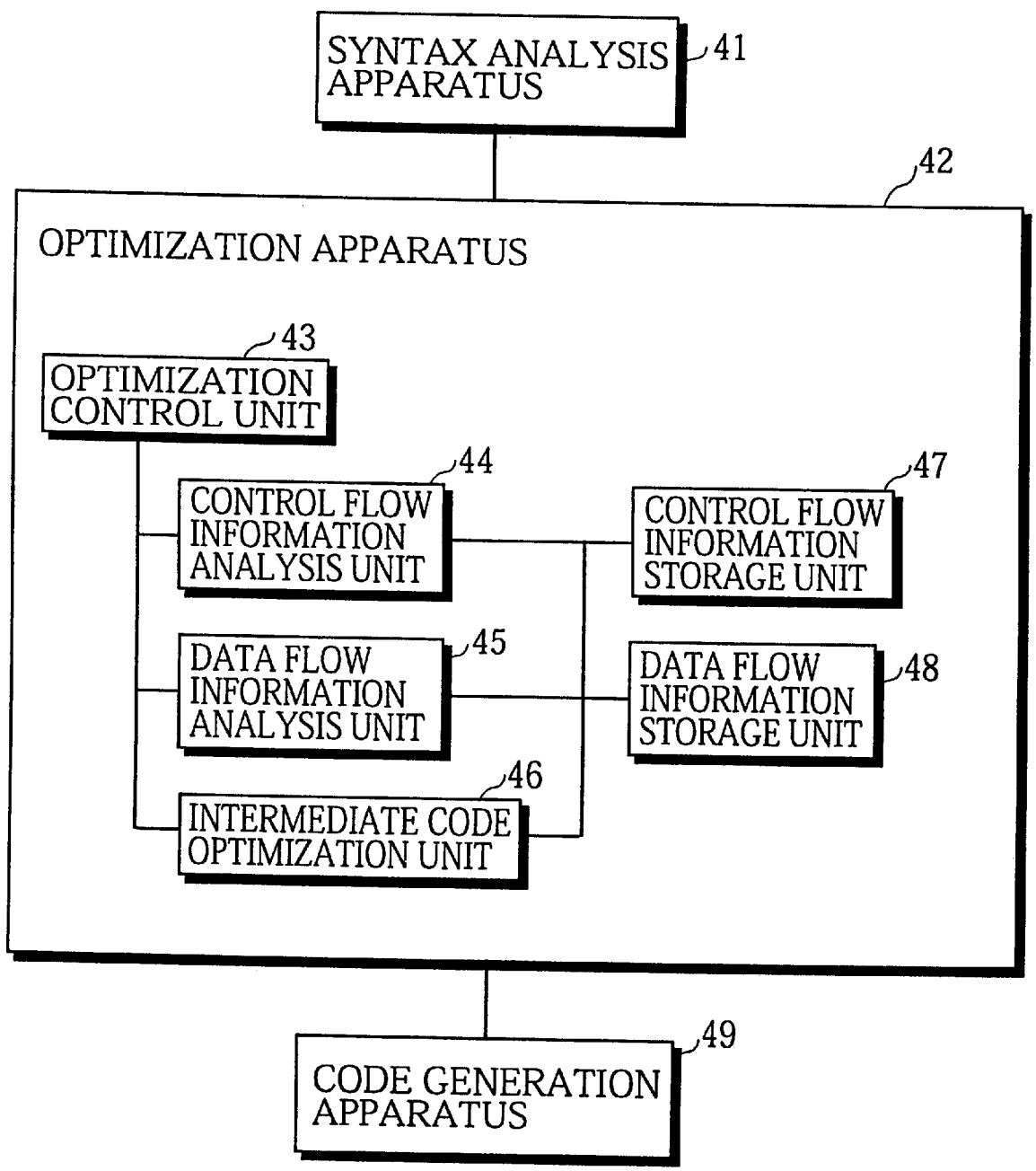
FIG. 1 shows the construction of a conventional compiler apparatus.
Figure 2:
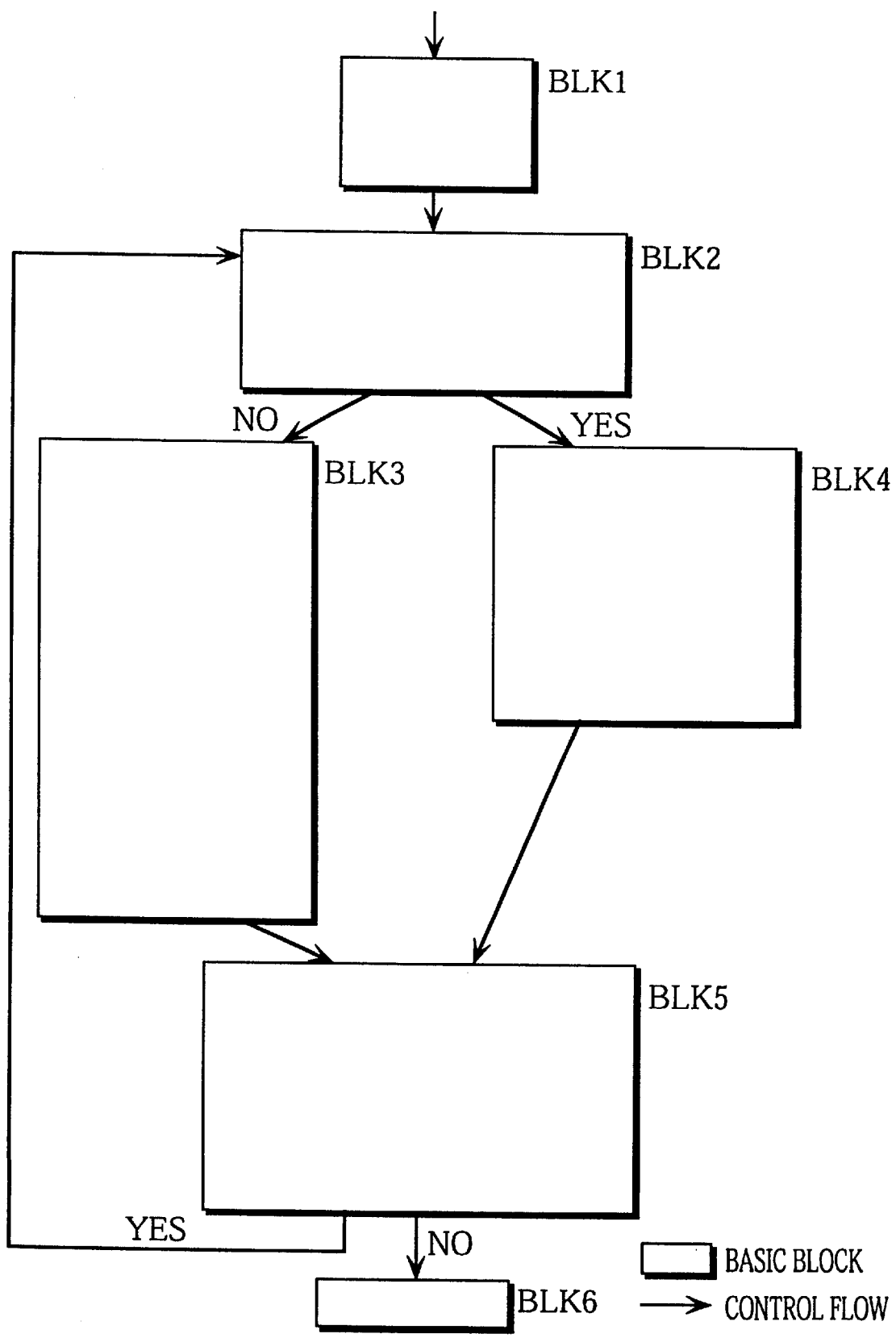
FIG. 2 shows an example of a plurality of basic blocks.
Figure 5:
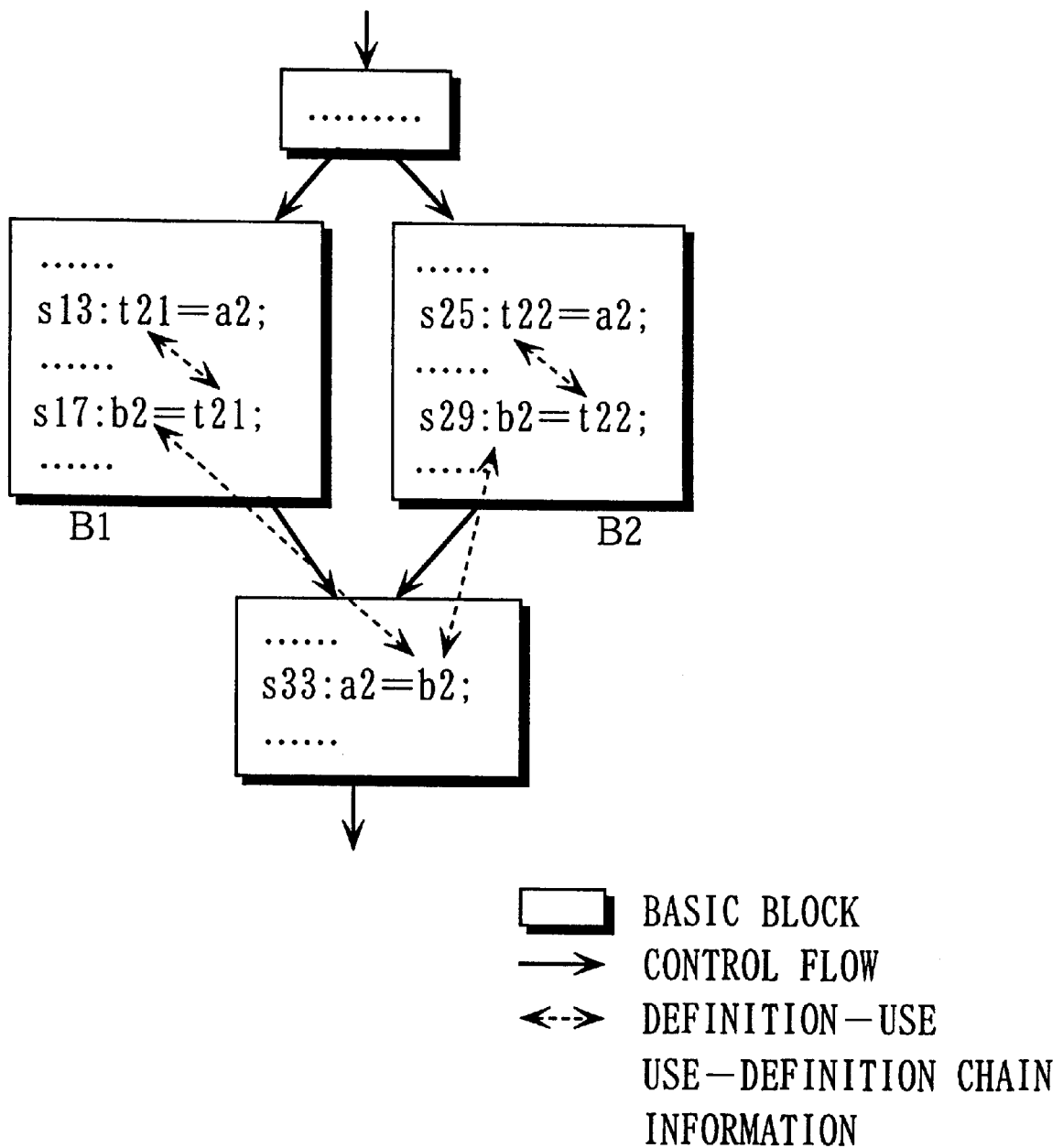
FIG. 5 shows another example program used in the description of the background art.
Figure 6:
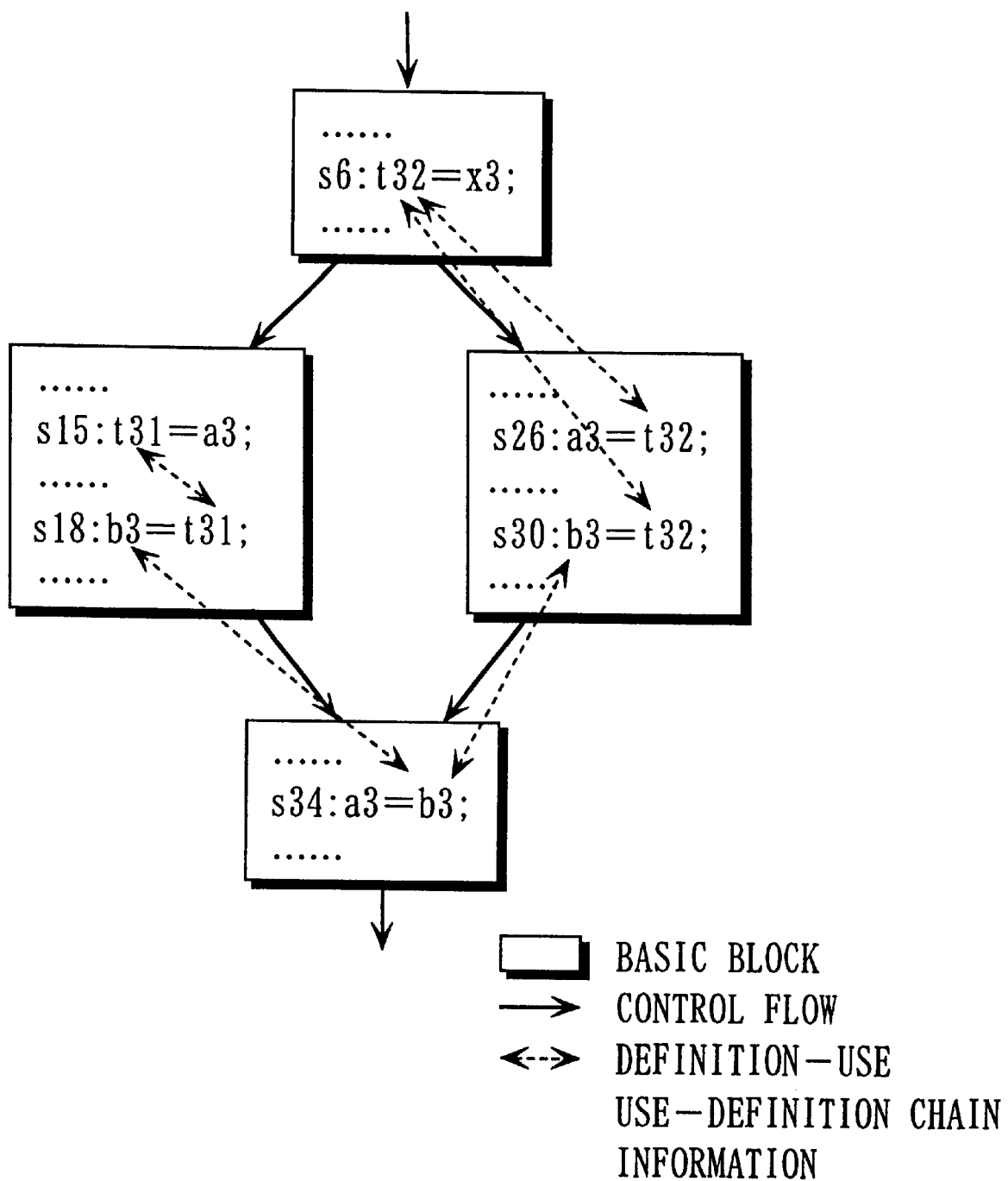
FIG. 6 shows another example program used in the description of the background art.

Here, definitions, features, and terms of the main concepts of the present invention are explained. Also explained are a new type of data flow information called "equivalent expression sets", date flow equations for calculating the equivalent expression sets, iterative algorithms for solving the data flow equations, and optimizations using the equivalent expression sets.

1.1. Concepts Used in Program System of Present Embodiment

<Intermediate Instruction>

There are several types of intermediate instructions, as stated in the description of the background art. For ease of understanding, this specification will refer to a three-address format that is the most common type. However, it should be remembered that the methods of the present invention may also be applied to other kinds of intermediate instructions. The formats of the intermediate instructions are as follows.

(1) Assignment Intermediate Instructions "a=b"

In this format, a is a variable or an indirect calculation expression, and b is variable, a constant, a monadic operator, or binary operator. These operators comply to the rules of C language. Examples of this format are intermediate instructions s1 and s17 in FIG. 11.

(2) Conditional Branch Intermediate Instructions

These intermediate instructions have a format given as "if (conditional expression) goto (branch label)". The conditional expression must comply to the rules of C language. Examples of this format are intermediate instruction s8 and s39 in FIG. 11.

(3) Unconditional Branch Intermediate Instructions

These intermediate instructions have a format given as "goto (branch label)". An example of this format is intermediate instruction s24 in FIG. 11.

(4) Function (Subroutine) Call Intermediate Instructions

These intermediate instructions have a format given as "function name (real argument list)". An example of this format is intermediate instruction s20 in FIG. 11.

(5) Labels

These intermediate instructions are used to express specific positions within the intermediate program. Examples of labels are L1, L2, and L3 in FIG. 11.

<Expressions>

In the 1996 edition of JIS Handbook No. 58 *Information Processing—Terminology, Codes, Data Codes,* an "expression" is defined as a "language element that calculates a value from one or more operands". In this specification, the term "expression" is defined as a language element such as a variable, constant, monadic expression, or binomial. Out of the monadic expressions, expressions of the format "*(variable)", which use an indirect operator "*" as in C language, are called indirect calculation expressions. Note that the variable used in "*(variable)" format is called a pointer variable.

<Indicated Variable Sets>

When variable v is a pointer variable, the set of variables which may be indicated by variable v in intermediate instruction s is expressed as POINT[s,v]. This indicated variable set is found according to the method described in p648–p660 of reference (1), so that only a simple description is given here, with reference to FIG. 21A.

Figures 21A, 21B:
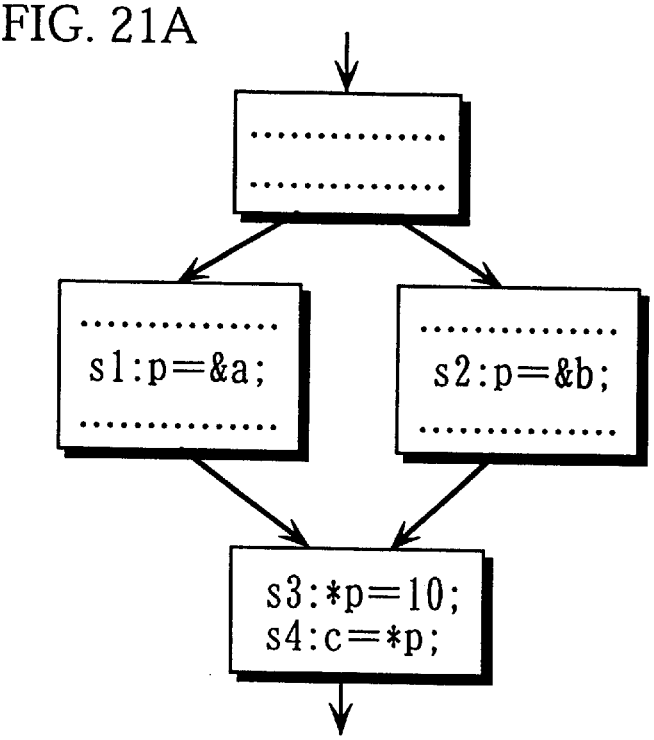
FIG. 21A shows an example of an indicated variable set.
FIG. 21B shows an example of a changed variable set.

In FIG. 21A, it is supposed that there is no definition of pointer variable p from a point immediately after intermediate instructions s1, s2 to intermediate instruction s3.

In the present example, intermediate instructions s1 and s2 assign the addresses of variables a and b to pointer variable p, so that for intermediate instruction s3, pointer variable p indicates variables a and b. As a result, indicated variable set POINT [s3,p] for intermediate instruction s3 includes variables a and b. In intermediate instruction s3, variable a or variable b is converted, which is to say, intermediate instruction s3 is a definition of variable a or variable b. Also, in this example, intermediate instruction s4 also uses variable a or variable b.

Figure 9:
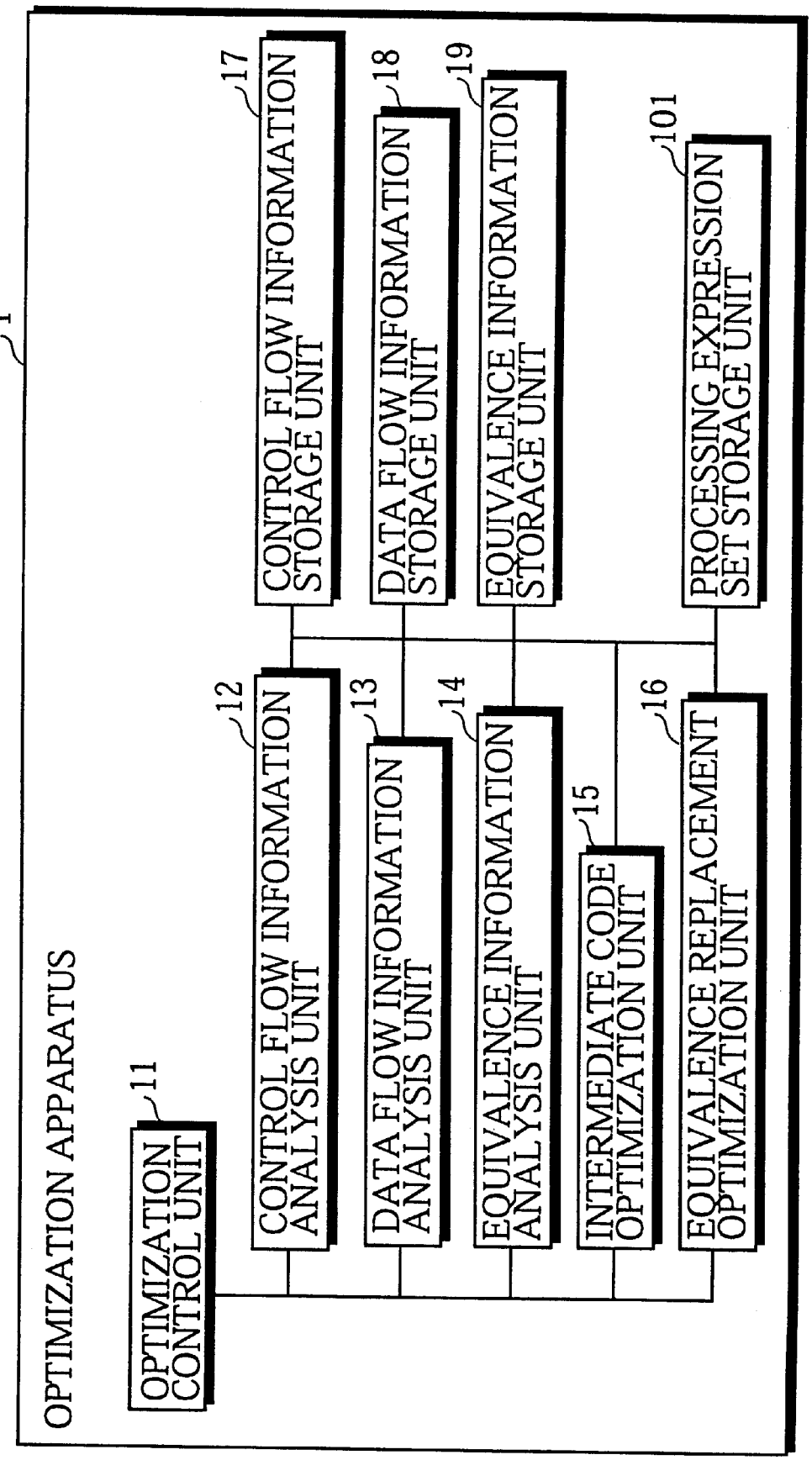
FIG. 9 shows the construction of the optimization apparatus 1 of the embodiment of the present invention.

This calculation of the indicated variable set is performed by the data flow information analysis unit 13 shown in FIG. 9, before the calculation of the equivalent expression sets in the present method.

<Changed Variable Sets>

The set of variables that may have their values changed as a result of intermediate instruction s calling function f is expressed as changed variable set CHANGE[s,f]. This changed variable set is found according to the method described in p648–p660 of reference (1), so that only a simple description is given here, with reference to FIG. 21B.

In FIG. 21B, the called relationship of a function in the intermediate program is shown in C language notation, with variable a as an external variable and function f1 including variables b1 and b2 as local variables. Intermediate instructions s1 and s2 pass over the addresses of variables b1 and b2 as real arguments and call function f2. Function f2 uses pointer variable p which is a virtual argument. This function f2 assigns a value to the expression indicated by pointer variable p, as shown by arrow y1, and a value to external variable a, as shown by arrow y2.

As a result, function call f2 in intermediate instruction s1 in function f1 may result in a change in the values of variables b1 and a, so that CHANGE[s1,f2] includes these variables b1 and a.

In the same way, variables b2 and a are included in CHANGE[s2,f2].

This calculation of the changed variable set is performed by the data flow information analysis unit 13 shown in FIG. 9, before the calculation of the equivalent expression sets of the present method.

<Equivalent Expression Sets>

In this specification, equivalence refers to when one expression a may be replaced with another expression b, or vice versa, at one point in the program. This means that at that point, expression a is equivalent to b, and vice versa. Expressions that exhibit such equivalence relations are called equivalent expressions.

An equivalent expression set is a grouping of all expressions that are mutually equivalent. In the present specification, variables, constants, monadic expressions, and binomials are defined as expressions, so that for the example in FIG. 7, the lack of a definition of variable a4 between a point directly after intermediate instruction s20 and a point directly before intermediate instruction s35 and between a point directly after intermediate instruction s31 and a point directly before intermediate instruction s35 means that expressions x4+y4 and a4 are mutually equivalent just before intermediate instruction s35, making an equivalent expression set (x4+y4,a4). From this equivalent expression set (x4+y4,a4), it is clear that x4+y4 can be replaced with expression a4, which means that intermediate instruction s35 can be deleted.

In general, equivalent expression sets are different at different points in a program, with the possibility of there being several equivalent expression sets at certain points in the program. For the example in FIG. 7, suppose that the aforementioned assumption is valid for variable a4. Also assume that there are no definitions of variables x4 and p41 in any of the routes from a position directly after intermediate instruction s5 to a position directly before intermediate instruction s35 and no definitions of variables y4, p42 in any of the routes from a position directly after intermediate instruction s7 to a position directly before intermediate instruction s35. In such a case, a plurality of equivalent expression sets given as $\{(x4,p41),(y4,p42),(a4,x4+y4)\}$ will be present directly before intermediate instruction s35. When the same assumptions are valid, the equivalent expression sets, given as $\{(x4,p41),(y4,p42),(t42,x4+y4,a4)\}$, will be present immediately after intermediate instruction s31. This means that it is normal for there to be a group of equivalent expression sets (hereinafter the equivalent expression set group) for each point in the program.

Figure 7:
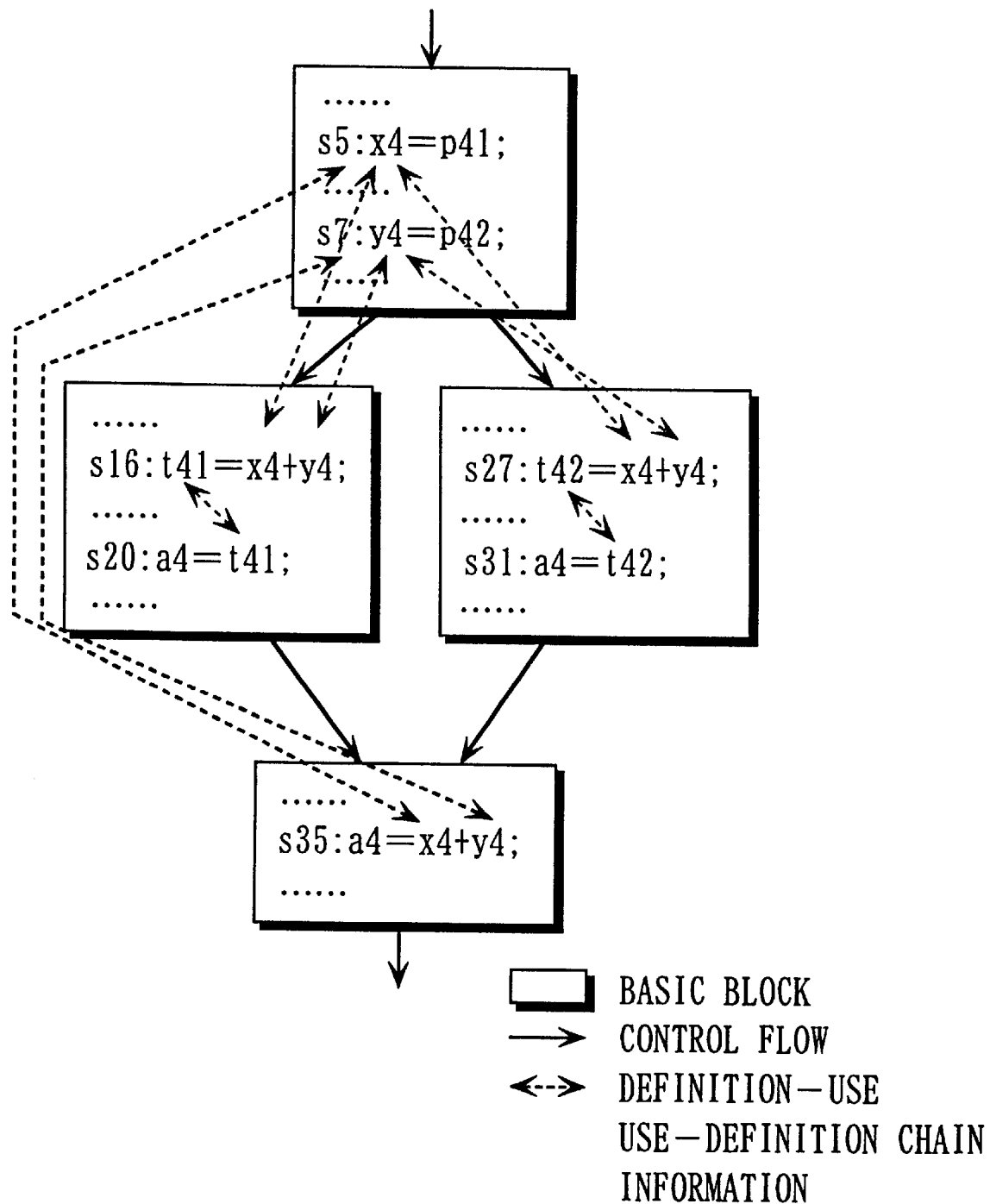
FIG. 7 shows another example program used in the description of the background art.
Figure 8:
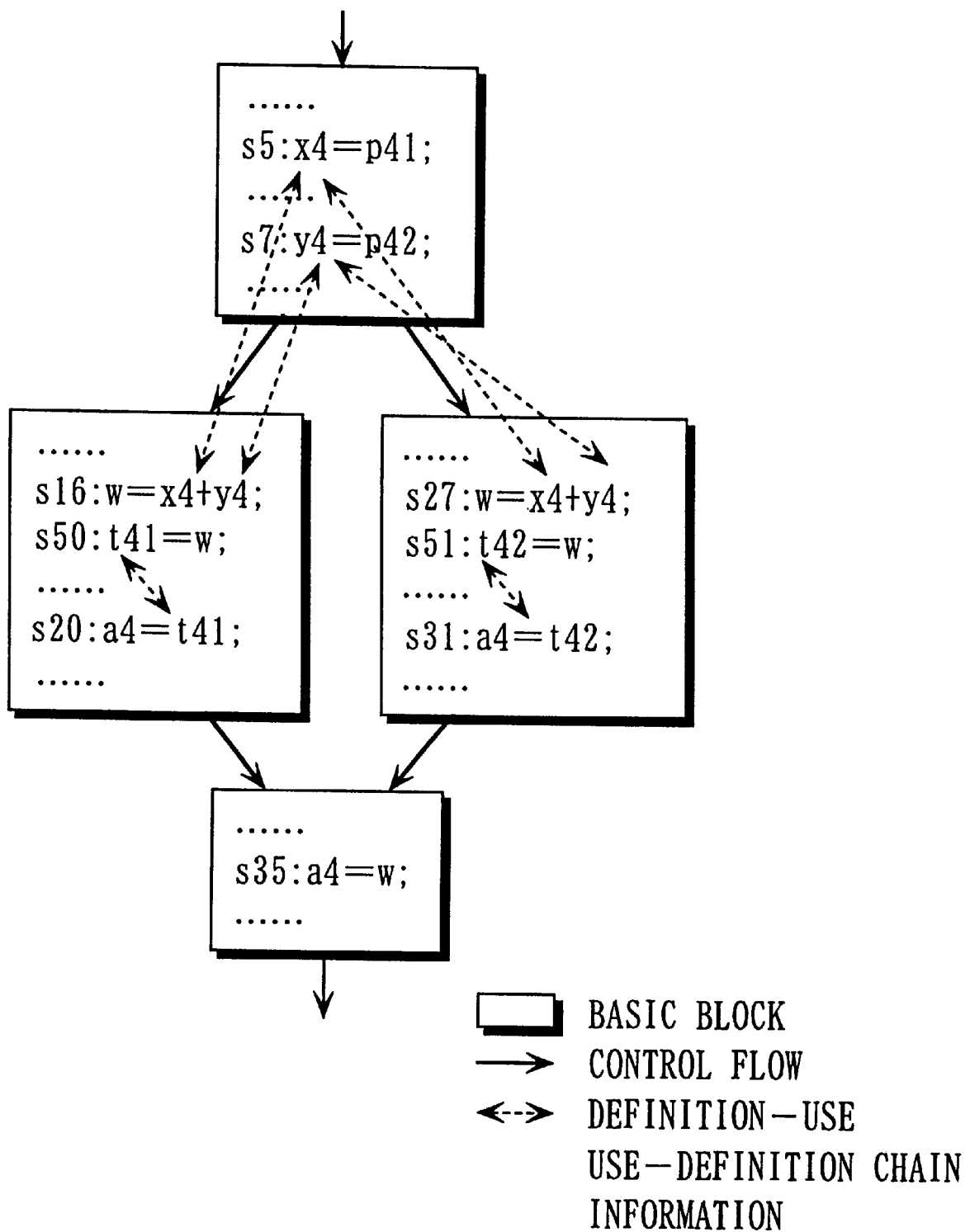
FIG. 8 shows another example program used in the description of the background art.

In FIG. 7, intermediate instruction s5 establishes equivalency between variable x4 and variable p41, and since this equivalency is still unbroken at a point immediately before intermediate instruction s35, the equivalency between variable x4 and variable p41 is said to "reach" the point immediately before intermediate instruction s35.

1.2. Mathematical Notation and Terminology Used in this Specification

The following is a description of the symbols that are generally used in set theory. The symbol "$\in$" means "belongs to the set", "$\cap$" indicates the intersection of sets, "$\cup$" indicates the union of sets, "$-$" indicates the difference between sets, and "$\subset$" indicates a state where two sets are equal or where one set includes all members of another set. The symbol "$\phi$" represents the empty set. Sets where the intersection is the empty set are called "mutually exclusive". The symbol "$\forall$" represents the universal quantifier and the symbol "$\exists$" represents an existential quantifier.

<Universal Set of Expressions E>

Figure 11:
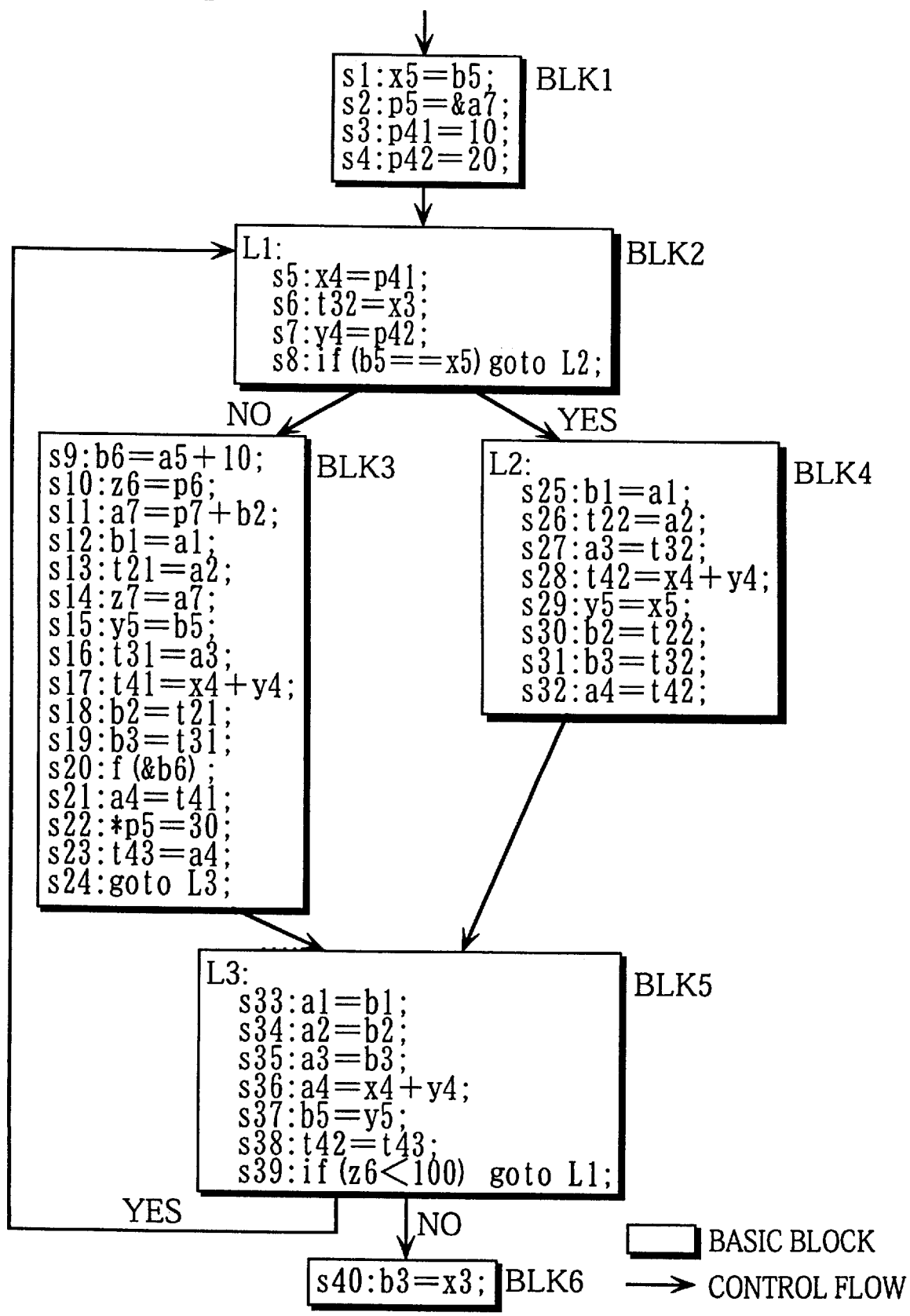
FIG. 11 shows an example program.

The set of all expressions in the intermediate program aside from conditional expressions is set as "E". As one example, when all of the expressions are as shown in FIG. 11, the total set of expressions E is as shown in FIG. 13A.

In general the total set of expressions E will be the finite set shown by Equation 6 below.

$$E=\{e1, e2, \ldots en\} \quad \text{Equation 6}$$

In the following explanation, the total set is given as E, the subset group of E as P(E) (all of the possible subsets of E), and the subset group of the subsets P(E) (all of the possible subsets of P(E)) as $P\hat{0}2(E)$. The subset group of the subsets $P\hat{0}2(E)$ (all of the subsets of P(E)) is given as $P\hat{0}4(E)$. In general, the set E and its subset groups are expressed by the following Equation 7.

$$E = \{e1, e2, \ldots en\} \quad \text{Equation 7}$$
$$P(E) = \{(e1), (e2), \ldots (e1, e2), \ldots (e1, e2, e3) \ldots, E\}$$
$$P^\wedge 2(E) = \{\{(e1)\}, \{(e2)\}, \ldots \{(e1, e2)\}, \ldots$$
$$\{(e1, e2, e3), (e3, e4)\} \ldots$$
$$\{(e1, e2), (e3, e4), (e5, e6, e7)\}, \ldots$$
$$P(E) \ldots\}$$
$$P^\wedge 4(E) = \{\{\{(e1)\}, \{(e2)\}, \ldots \{\{(e1, e2)\},$$
$$\{(e1, e2, e3), (e3, e4)\}\} \ldots$$
$$\{\{(e1, e3), (e3, e5), (e5, e7, e9)\},$$
$$\{e2, e4, e6), (e4, e8)\}\} \ldots P^\wedge 2(E) \ldots\}$$

<PR(E) Set>

PR(E) is a set of subsets that belong to $P\hat{0}2(E)$ and are mutually exclusive. This can be formally found by the following Equation 8.

$$PR(E)=\{S|S\in P\hat{0}2(E), Si\in S, Sj\in S, Si\neq Sj, Si\cap Sj=\phi\} \quad \text{Equation 8}$$

As one example, the set $\{(e1,e2),(e3,e4),(e5,e6,e7)\}$ belongs to PR(E), but the subsets in $\{(e1,e2,e3),(e3,e4)\}$ both include the element e3, so that the set does not belong to PR(E).

It should be noted here that the equivalent expression set groups that will be described later belong to PR(E) due to this property.

<CM relation>

The CM relation for the set $X\in P\hat{0}2(E)$ is as follows.

(1) When the elements A,B of X have an intersecting part, A,B are said to be in a CM relation. This is formally expressed below.

If $A,B\in X$, $A\cap B\neq\phi$, A,B are said to be in a CM relation. This is expressed as [A cm B].

(2) When the elements A,B, and C of X are such that A and B are in a CM relation and B and C are in a CM relation, then A and C will also be in a CM relation. This is formally expressed below.

If $A,B,C\in X$, and A and B are in a CM relation and B and C are in a CM relation, then A and C are also in a CM relation. This means that if A cm B and B cm C, the A cm C.

(3) The element A in X is in a CM relation with itself. This is formally expressed below.

$A\in X$, A is in a CM relation with itself. This means A cm A.

As one example when $X=\{(e1,e2),(e2,e3),(e3,e4),(e5,e6)\}$ and these elements are respectively named A, B, C and D, elements A and B have the common element (intersection) e2, while elements B and C have the intersection e3. so that A cm B, B cm C, and A cm C. Element D, however, does not have a common element with any of the elements A, B or C, so that none of A, B, and C has a CM relation with element D.

As a result of the above definition, it can be seen that a CM relation is a reflexive (property (3) above), symmetric (property (1)) and transitive (property (2)) relation, as described on page 351 of reference (2). This means that a CM relation is an equivalence relation. Based on CM relations, set $X\in P\hat{0}2(E)$ can be divided into mutually exclusive subsets.

As one example, the set $X=\{(e1,e3),(e2,e4,e6),(e3,e5),(e4,e8),(e5,e7,e9)\}$ can be divided into the two subsets $X1=\{(e1,e3),(e3,e5),(e5,e7,e9)\}$ and $X2=\{(e2,e4,e6),(e4,e8)\}$ due to the above CM relation.

It should be especially noted here that an element in one of the sets within a given one of the subsets resulting from the above division, such as e3 in X1, is not present in any of the sets within the other subset (in this case, any of the sets in X2).

<$CM_{13}PT[X]$ set>

The set $CM_{13}PT[X]$ is a set that is produced by dividing the set $X(\in P\hat{0}2(E))$ based on CM relations. Here, it should be clear that $CM_{13}PT[X]\in P\hat{0}4(E)$.

As one example, for the same set $X=\{(e1,e3),(e2,e4,e6),(e3,e5),(e4,e8),(e5,e7,e9)\}$, $CM_{13}PT[X]=\{\{(e1,e3),(e3,e5),(e5,e7,e9)\}, \{(e2,e4,e6),(e4,e8)\}\}$.

<$E_{13}SET[Y]$>

$E_{13}SET[Y](\in P\hat{0}2(E))$ is a grouping of sets $S(\in(E))$ that are composed of elements $e(\in E)$ in the set $E(\in P(E))$ belonging to set P, for each element set $P(\in P\hat{0}2(E))$ belonging to the set $Y(\in P\hat{0}4(E))$. This is formally expressed by Equation 9 below.

$$Y\in P\hat{0}4(E), \quad \text{Equation 9}$$
$$E_{13}SET[Y]=\{S|$$
$$\cup Ej\}$$

where $$E_j \in P_i. \qquad 9$$

As one example, for the above case where X={(e1,e3), (e2,e4,e6),(e3,e5),(e4,e8),(e5,e7,e9)} and Y=$CM_{13}$PT[X]= {{(e1,e3),(e3,e5), (e5,e7,e9)}, {(e2,e4,e6), (e4,e8)}}(∈P04 (E)), $E_{13}$SET[Y] is given by Equation 10 below.

$$E\_SET[Y] = E\_SET[CM\_PT[\{(e1, e3), (e2, e4, e6), \qquad \text{Equation 10}$$
$$(e3, e5), (e4, e8), (e5, e7, e9)\}]]$$
$$= E\_SET[\{\{(e1, e3), (e3, e5), (e5, e7, e9)\},$$
$$\{(e2, e4, e6), (e4, e8)\}\}]$$
$$= \{(e1, e3, e5, e7, e9), (e2, e4, e6, e8)\}$$

FIGS. 43A to 43C give a graphic depiction of the set $E_{13}$SET[$CM_{13}$PT[X]]. FIG. 43A is a Venn diagram for the sets given in Equation 11 below.

$$X1=(e1, e3) \qquad \text{Equation 11}$$
$$X2=(e2, e4, e6)$$
$$X3=(e3, e5)$$
$$X4=(e4, e8)$$
$$X5=(e5, e7, e9)$$

FIG. 43B shows the CM_PM[X] set and FIG. 43C shows the $E_{13}$SET[CM_PT[X]]. In these drawings, sets are joined at what were originally intersecting parts. As one example, the set X1, X3, and X5 of FIG. 43A are joined to form a single set (X1∪X3∪X5 in FIG. 43B) that is part of E_SET [CM_PT[X]]. Since the sets X1∪X3∪X5 and X2∪X4 that are elements in E_SET[CM_PT[X]] have different elements, the set E_SET[CM_PT[X]] belongs to the set PR(E). This property is also exhibited in general by the sets in P^2(E) aside from X Definition of the Equivalence Union Calculation (Definition of the [∪e] Operator)

The calculation of sets shown as Equation 12 below is called the equivalence union calculation, with this being expressed using the operator [∪e].

$$A, B \in PR(E) \qquad \text{Equation 12}$$
$$A \cup e\ B = E\_SET[CM\_PT[A \cup B]]$$

As one example when A={(e1,e3), (e2,e4,e6)}, B={(e1, e3), (e4,e8), (e5,e7,e9)}, A∪e B is as shown by Equation 13 below.

$$A \cup e\ B = E\_SET[CM\_PT[A \cup B]] = E\_SET[CM\_PT[(e1,e3), (e2, \qquad \text{Equation 13}$$
$$e4,e6),$$
$$(e4,e8), (e5,e7,e9)]] = E\_SET[\{(e1,e3)\}, \{(e2,e4,e6), (e4,e8)\}, \{(e5, e7,e9)\}] = \{(e1,e3), (e2,e4,e6,e8), (e5,e7,e9)\}$$

As should be more apparent from FIG. 43, the set E_[CM_PT[X]] itself is equal to a set that results from repetition of a calculation, for the elements of the set X(∈P^(E)), that links sets with an intersection to form a single set until no more elements with intersections are left.

Properties of the Equivalence Union Operator ∪e

As shown on page 81 of reference (2), the operator ∪e for PR(E) has the following properties.

(1) A∪e A=A (idempotency)

Proof: From the properties of the union [∪] of sets, A∪A=A and A∈PR(E), so that A∪e A=E_SET[CM_PT [A∪A]]=E_SET[CM_PT[A]]=A is satisfied.

(2) A∪e B=B∪e A (commutation)

Proof: From the properties of the union [∪] of sets, A∪B=B∪A, so that the relationship A∪e B=E_SET[CM_PT[A∪B]]=E_SET[CM_PT[B∪A]]=B∪e A is satisfied.

(3) (A∪e B)∪e C=A∪e(B∪e C) (association)

Proof: As should be clear from the definition of the operator ∪e, first performing E_SET[CM_PT[B∪B]]=X and then performing E_SET[CM_PT[X∪C]] is the equivalent of performing E_SET[CM_PT[A∪B∪C]]. As a result, (A∪e B)∪e C=E_SET[CM_PT[A∪B∪C]].

In the same way, A ∪e(B∪e C)=E_SET[CM_PT [A∪B∪C]], so that (A∪e B)∪e C=A∪e(B∪e C) is also satisfied.

Definition of the Equivalence Intersection Calculation (Definition of the [∩e]operator)

The set calculation shown below as Equation 14 is called the equivalence intersection calculation, with this being expressed using the operator [∩e].

$$A, B \in PR(E) \qquad \text{Equation 14}$$
$$A \cap e\ B = \{C | Ai \in A, C = Ai \cap Bi\}$$

As one example, when A={(e1,e3), (e2,e4,e6)} and B={ (e1,e3), (e4,e8), (e5,e7,e9)}, A ∩e B={(e1,e3), (e4)}.

Properties of the Equivalence Intersection Operator ∩e

As shown on page 81 of reference (3), the operator ∩e for PR(E) has the following properties.

(1) A∩e B=A (idempotency)

Proof: When Ai∈A, Aj∈A, and i=j, Ai∩Ai is satisfied. When i≠j, Ai∩Aj=φ, so that A∩e A=A is satisfied. As one example, when A=(A1,A2, . . . An), for element A1, A1∩Aj=φ(n≧j≧1), so that only A1∩A=A1 is satisfied.

(2) A∩e B=B∩e A (commutation)

Proof: This is clear from the properties of the intersection [∩] or sets under definition of ∩e.

(3) (A∩e B)∩e C=C=A∩e(B∩e C) (association)

Proof: This is clear from the properties of the intersection [∩] of sets under the definition of ∩e.

(4) For all A∈PR(E), A∩eφ=φ, so that the zero element is φ.

(5) For all A∈PR(E), A∩e{E}=A, so that the one element is {E}.

From the above properties, it can be seen that the set PR(E) is a semi-lattice for the calculation ∩e, as shown in page 81 of the reference (3).

Distribution of the Operator ∩e for the Operator ∪e

The following is an explanation of the proposition in the following Equation 15 where the operator ∩e has been distributed for the operator ∪e, using the property described below as "proof of the monotonicity of the *function f(X)= E_GEN[B]∪e(X∩e {E_PRE[B]})".

$$\text{for } A,B,C \in PR(E) \qquad \text{Equation 15}$$
$$\forall Wi \in (A \cap e\ C) \cup e (B \cap e\ C),$$
$$\exists Xj \in (A \cup e\ B) \cap e\ C,$$
$$Wi \subset Xj \ldots (A)$$
$$(\text{where for all } Wi \in (A \cap e\ C) \cup e (A \cap e\ C),$$
$$Xj \in (A \cup e\ B) \cap e\ C \text{ exists, and } Wi \subset Xj)$$

Proof

First, from the definition of ∩e.
(1) ∀Ak∈A, ∃X1∈A∪e B, Ak⊂X1
(2) ∀Bm∈B, ∃Xn∈A∪e B, Bm⊂Xn
(3) From (1), for ∀Cp∈C
Ak∩Cp⊂X1∩Cp
Here, (Ak∩Cp)∈(A∩e C), (X1∩Cp)∈((A∪e B)∩e C)
Ak, Cp are arbitrary values so that
∀ACi∈(A∩e C), ∃Yj∈((A∪e B)∩e C), and ACi⊂Yj are satisfied.
(4) In the same way as (3), from (2) for ∀Cq∈C, (Bm∩Cq)⊂(Xn∩Cq)
Here, (Bm∩Cq)∈(B∩e C), (Xn∩Cq)∈((A∪e B)∩e C)
Bk, Cq are arbitrary values, so that
∀BCi∈(B∩e C), ⌈Yk∈((A∪e B)∩e C), and BCi⊂Ym
(6) From the definition of the operator ∪e, for Wi∈(A∩e C)∪e(B∩e C)

Dividend Pi={Ek, Ek+1, . . . En}
(Pi∈CM_PT[(A∩e C)∪(B∩e C)],
Ei∈((A∩e C)∪(B∩e C)) (k=1. . . n)) is present, with
Wi=∪Ej
where j=k . . . n (7) In (6), when Pi only includes one element, (which is to say when Pi={Ek}),
Wi=Ek is valid, so that from (5),
Wi⊂Ym, so that
Ym∈((A∪e B)∩e C) exists.
(8) Since the CM relation is transitive, when Pi has a plurality of elements in (6)
for any elements E1,En∈Pi, there is a value Et∈Pi (t=1, . . . n) so
E1∩E2≠φ
Et-1∩Et≠φ
Et∩Et+1≠φ
En-1∩En≠φ
(9) Here, from (5) it can be seen that Et⊂Yt, Et+1⊂Yt+1 (Yt,Yt+1∈((A∪e B)∩e C)) are valid, and that Et∩Et+1≠φ, so that the common element Yc=Et∩Et+1 is included in both Yt and Yt+1.

This means that
Yc⊂Yt and Yc⊂Yt+1
However, since elements that conform to ((A∪e B)∩e C)∈PR(E) are mutually exclusive,
Yt=Yrt=1
(10) Since E1, En are arbitrary elements in Pi, this means that all elements in Pi are included in Yt, and that Wi, which is the set union of all elements of Pi, is included in Yt. This means that for Wi, a value Yt∈((A∪e B)∩e C) where Wi⊂Yt exists.
(11) Conclusion
(A) is proved from (7) and (10) (End of Proof).

Variable Utilizing Expression Set (VEXP[x,v])

A set of expressions that are affected by an updating of the value of the variable v in a given intermediate instruction s is called the variable utilizing expression set of the variable v for intermediate instruction s. This is expressed as VEXP[x,v]. This set is formally expressed by the following Equation 16.

$$VEXP[s,v]=\{e|$$ Equation 16

{e|e is an expression of the following format that belongs to E. Here, "op" may be any operator aside from the address operator "&".

variable v expression [op v] (a monadic expression with v as an operand)

expression [v op b] or expression [b op v] (binomial with v as an operand)

expression [*p], However, v ∈ POINT[s,p]}

1.3. Special Uses Within the Present Embodiment

E_Group

In basic block B, E_GEN[B] is the group of the equivalent expression sets described below. Putting this another way, these are the equivalence relations that occur in basic block B and reach the exit point of basic block B. This group E_GEN[B] is found according to the algorithm shown in FIG. 22.

In FIG. 22, "WSET" represents the work variables that store sets of expressions, "a" represents a variable or an indirect calculation expression, and "b" represents an expression (a variable, a constant, a monadic expression or a binomial). Statement(1) in FIG. 22 refers to the extraction of an expression that utilizes variable a from the elements in set X belonging to WSET. Statement(2) refers to the extraction of an expression that utilizes variable v which is indicated by pointer variable p from set X belonging to WSET. The processing in statement(3) adds expression b to set Y if set Y, to which expression a belongs, is already present as an element in the set WSET. The processing in statement(4) adds expression a to set Y if set Y to which expression b belongs is already present as an element of the set WSET. Statement (5) adds a new equivalent expression set that has expressions a and b as elements to the set WSET. Statement (6) extracts expression that use variable v, which may be updated as a result of a call of function f, from the elements of set X belonging to WSET.

Next, the transition in the set WSET during basic block B1 in FIG. 20 is described. Here, it is assumed that the variables indicated by pointer variable d in intermediate instruction s4 are variables a and b. This, is to say, POINT[s4,d]={a,b}. It is also assumed that the variable whose value changes as a result of intermediate instruction s6 calling function f is x. This is to say, CHANGE[s6,f]={x}.

First, in the processing for intermediate instruction s1, {(a,b+10)} is added to WSET in FIG. 22(5), so that WSET becomes {(a,b+10)}.

In the processing for intermediate instruction s2, the expression b+10 is deleted from set (a,b+10) in FIG. 22(1), so that the set WSET becomes {(a)}. Next, in FIG. 22(5), {(a,x+20)} is added to the set WSET, so that WSET becomes {(a), (b,x+20)}.

In the processing for intermediate instruction s3, {(c,x+y)} is added to the set WSET in FIG. 22(5), so that WSET becomes {(a), (b,x+20), (c,x+y)}.

In the processing for intermediate instruction s4 in FIG. 22(2), a and b are deleted from the expression sets (a) and (b,x+20) that include expressions that utilize a and b, so that WSET becomes {(x+20), (c,x+y)}. Next, in FIG. 22(5), {(*d,30(} is added to WSET, so that WSET becomes {(x+20), (c,x+y), (*d,30)}.

In the processing for intermediate instruction s5, (e,x+y) is added to the element (c,x+y) in WSET in FIG. 22(4), so that the WSET becomes {(x+20), (c,x+y,e), (*d,30)}.

In the processing for intermediate instruction s6, expressions that utilize expression x are deleted from WSET in FIG. 22(6), so that the WSET becomes {(c,e), (*d,30)}.

In the processing for intermediate instruction s7, (z,*d) is added to the element (*d,30) in WSET in FIG. 22(4), so that WSET becomes {(c,e), (*d,30,z)}.

In the processing for intermediate instruction s8, the value of variable a is changed in FIG. 22(1), so that *d is deleted from (*d,30,z) making WSET={(c,e), (30,z)}. In FIG. 22(5), {(z,x+z)} is added to WSET, so that WSET becomes {(c,e), (30,z), (a,x+z)}.

As a result of the above processing, the final state of E_GEN[B1] is {(c,e), (30,z), (a,x+z)}.

While it can be understood from the calculation algorithm of E_GEN[B] that equivalent variables generated by assignments will belong to the same set, it should also be noted that these sets are mutually exclusive, so that E_GEN[B] belongs to the set PR(E).

E_PRE GROUP

The E_PRE group is the group of expressions that are unaffected by the updating of variables that results from all intermediate instructions in the basic block B. The algorithm for finding E_PRE[B] is shown in FIG. 23.

1.4. Data Flow Equations that are Special to this Embodiment

Data Flow Equations that relate to Equivalent Expression Sets

The following is an explanation of the equivalent relations between expressions at the entry point and exit point of basic block B, using the terminology defined above. The data flow equations that relate to the equivalent expression set groups E_IN[S] and E_OUT[B] are shown as Equation 17 below.

$$E\_IN[B] = \bigcap e \ E\_OUT[P] \quad \text{Equation 17}$$
$$P \in pred[B]$$
$$E\_OUT[B] = E\_GEN[B] \cup e \ \{E\_IN[B] \cap e \ \{E\_PRE[B]\}\}$$

The notion of "reaching" of equivalent relations used in these data flow equations is as follows. Only equivalent relations that are established at the exit point of every preceding block for basic block B are included in E_IN[B], with these equivalent relations being said to "reach" the entry point of basic block B. E_OUT[B] shows the equivalent relations that reach the exit point B, which are the equivalent relations E_GEN[B] that are produced within basic block B and the equivalent relations present at the entry point of basic block B that are unaffected by the processing in basic block B.

Proof of the Monotonicity of Function f(X)=E_GEN[B]∪e (X∩e {E_PRE[B]})

As mentioned earlier in the definition of "reaching", to solve the data flow equations that relate to equivalent expression sets using iterative algorithms, the following proofs are necessary, as shown between pages 79 and 88 in reference (2). First, it is necessary to prove that for the confluent calculation "∩e", PR(E) is a semi-lattice (this has already been shown). Second, it is necessary to prove the monotonicity of the function f(X)=E_GEN[B] ∪e(X ∩e {E_PRE[B]})} in the data flow equations that relate to the aforementioned equivalent expression sets, where the term E_IN[B] on the right side of the E_OUT[B] function (showing the effect of basic block B) has been replaced by X. Here, E_GEN[B]. {E_PRE[B]} are respectively set as G and P for ease of explanation, with the monotonicity of f(X)=G ∩e (X ∩e P) being proved below. From pages 81 to 83 of reference (3), it is necessary to prove Equation 18 below to prove the monotonicity.

$$X, Y \in PR(E) \quad \text{Equation 18}$$
$$f(X \cap e \ Y) \cap e (f(X) \cap e \ f(Y)) = f(X \cap e \ Y)$$

However, from page 81 in reference (3), it can be seen that it is sufficient to prove the following Equation 19.

For any Ai∈f(X∩e Y), a value Bj∈f(X)∩e f(Y) exists where Ai⊂Bj    Equation 19

Proof

First, by using f(X∩e Y) and f(X)∩e f(Y) as actual examples of function f, the following equations are given.

$$f(X \cap e \ Y) = G \cup e((X \cap e \ Y) \cap e \ P) \quad (1)$$
$$f(X) \cap e \ f(Y) = (G \cup e(X \cap e \ P)) \cap e (G \cup e(Y \cap e \ P)) \quad (2)$$

Here, the right side of formula (2) above further changes. If the right side of formula (2) is thought of as being the A part of "G", the part of "(X∩e P)", and the C part of "(G ∪e(Y∩e P)", the C part may be distributed among the A part and B part as follows.

$$(G \cap e(G \cup e(Y \cap e \ P))) \cup e((X \cap e \ P) \cap e(G \cup e(Y \cap e \ P))) \quad (3)$$

Rearranging this formula based on the commutation of ∩e give the following.
(3)=((G∪e(Y∩e P))∩e G)∪e((G∪e(Y∩e P))∩e(X∩e P))=S If formula (3) is thought of as being the A part of the original "G", the B part of "(Y∩e P)", the C part of "G", the A part of the next "G", the B part of the next "(Y∩e P)", and the C part of the next "(X∩e P)", the C part may be distributed among the A part and B part as follows.

((G∩e G)∪e((Y∩e P)∩e G))∪e ((G∩e(X∩e P))∪e((Y∩e P)∩e(X∩e P)))    (4)

Rearranging this formula based on the idempotency, commutation, and association of ∩e gives the following.
(4)=(G∪e(G∩e(Y∩e P)))∪e ((G∩e(X∩e P))∪e((X∩e Y)∩e P))

Rearranging this formula based on the commutation and association of the calculation ∪e.
(4)=(G∪e((X∩e Y)∩e P))∪e((G∩e(Y∩eP))∪e(G∩e(X∩e P)))

Here, since G ∪e((X∩e Y)∩eP) in formula (4) is f(X∩e Y) as given in formula (1).
(4)=f(X∩e Y)∪e((G∩e Y∩e P)∪e(G∩e X∩e P))=T This is solved as follows.
X,Y∈PR(E), ∀Xi∈x, ∃Zj∈(X∪e Y), xi⊂zj.
Therefore
∀Ai∈f(X∩e Y), ∃Tj∈T, Ai⊂Tj.

Based on the results of the "distribution of the operator ∩e into the operator ∪e" described earlier, the following relationships are established.
∀Ti∈T, ∃Sj∈S, Ti⊂Sj
∀Si∈S, ∃Bj∈(f(X)∩e f(Y)), Si⊂Bj
This means
∀Ai∈f(X∩e Y), ∃Bj∈(f(X)∩e f(Y)), Ai⊂Bj is established. (End of proof)

1.5. Algorithms specially used in this Embodiment
Iterative Algorithm for the Equivalent Expression Set Groups The iterative algorithm for solving the data flow equations relating to the equivalent expression set groups is shown in FIG. 24.

The algorithm of FIG. 24 repeatedly performs a calculation for all basic blocks B until there are no more changes to E_OUT[B] of any the basic blocks. The values of the E_IN[B] and E_OUT[B] once these groups have converged are the solutions for the data flow equations.

As is apparent from FIG. 24(1), the equivalent relations at the exit point of basic block B are set as the equivalent relations that are produced by the execution of the processing in basic block B shown as E_GEN[B]. Also, all expressions that are unaffected by basic block B are assumed to have equivalent relations with other expression by adding the expression set groups that have only E_PRE[B] as elements through an equivalence union calculation. By doing so, larger equivalence set groups can be found, which enables the largest solution to the data flow equations to be found.

Equivalence Replacement Algorithm

FIG. 25 shows an optimal example of an equivalence replacement algorithm that uses the equivalent expression set groups found by the iterative algorithm for the equivalent expression set groups. The processing in this algorithm is performed for one basic block at a time.

2.1. Overall Explanation of the Embodiment

The following is an explanation of an embodiment of an optimization apparatus of the present invention with reference to the figures. As a method for distributing and retailing optimization apparatuses that is familiar to those skilled in the art, software that achieves the functions of the present embodiment may be recorded onto a recording medium and then distributed and sold as packaged software. A customer who has bought this packaged software may install it into a standard computer, and the standard computer may thereafter operate in accordance with the installed software to achieve the functioning of the optimization apparatus.

When considering the widespread use of this software format, it is more appropriate to regard the functions of an optimization apparatus as software recorded on a recording medium, rather than hardware resources such as a processor or memory that are provided in a standard computer. Software that realizes complex processing will generally be composed of a plurality of subroutines and work areas, with it being appropriate to consider each subroutine and work area as an independent component. The following explanation describes the functions that need to be realized by subroutines and work areas to achieve the functioning of the optimization apparatus. It should be noted here that there is no need to develop entirely new components for this optimization apparatus, so that it is normal to use files that are stored in library format by an existing operating system, compiler, or optimization apparatus. The present specification will no describe the components that can be realized by such conventional subroutines and work areas in detail.

2.2. Overall Configuration of Optimization Apparatus

FIG. 9 shows the configuration of the optimization apparatus 1 in the embodiment of the present invention. As shown in FIG. 9, the optimization apparatus 1 is composed of an optimization control unit 11, a control flow information analysis unit 12, a data flow information analysis unit 13, an equivalence information analysis unit 14, an intermediate code optimization unit 15, an equivalence replacement optimization unit 16, a control flow information storage unit 17, a data flow information storage unit 18, an equivalence information storage unit 19, one a processing expression set storage unit 101. These components are described below.

The optimization control unit 11 controls the entire optimization process.

The control flow information analysis unit 12 is activated by the optimization control unit 11 and, as in the background art, divides an intermediate program into basic blocks where the control flow is unidirectional. The control flow information analysis unit 12 also produces control flow information showing the control flow between basic blocks.

The data flow information analysis unit 13 is activated by the optimization control unit 11 and, as in the background art, uses the control flow information described above to further analyze the intermediate code. By doing so, the data flow information analysis unit 13 produces data flow information showing reaching definitions and available expressions.

The intermediate code optimization unit 15 is activated by the optimization control unit 11 and optimizes the intermediate code using the control flow information and data flow information, as in the background art.

The data flow information storage unit 18 stores the data flow information produced by the data flow information analysis unit 13.

The control flow information storage unit 17 stores the control flow information produced by the control flow information analysis unit 12.

The equivalence information storage unit 19 stores the equivalent expression set groups present at the entry and exit points of each basic block. These equivalent expression set groups are produced by the equivalence information analysis unit 14.

The equivalence information analysis unit 14 is one of the most important components of the optimization apparatus 1. On being activated by the optimization control unit 11, the equivalence information analysis unit 14 analyzes global dependence using the iterative algorithm for the equivalent expression set groups given in FIG. 24 to realize the former part of the optimization by the optimization apparatus 1.

2.2.1. Components Realizing Equivalence Information Analysis Unit 14

Figure 10:
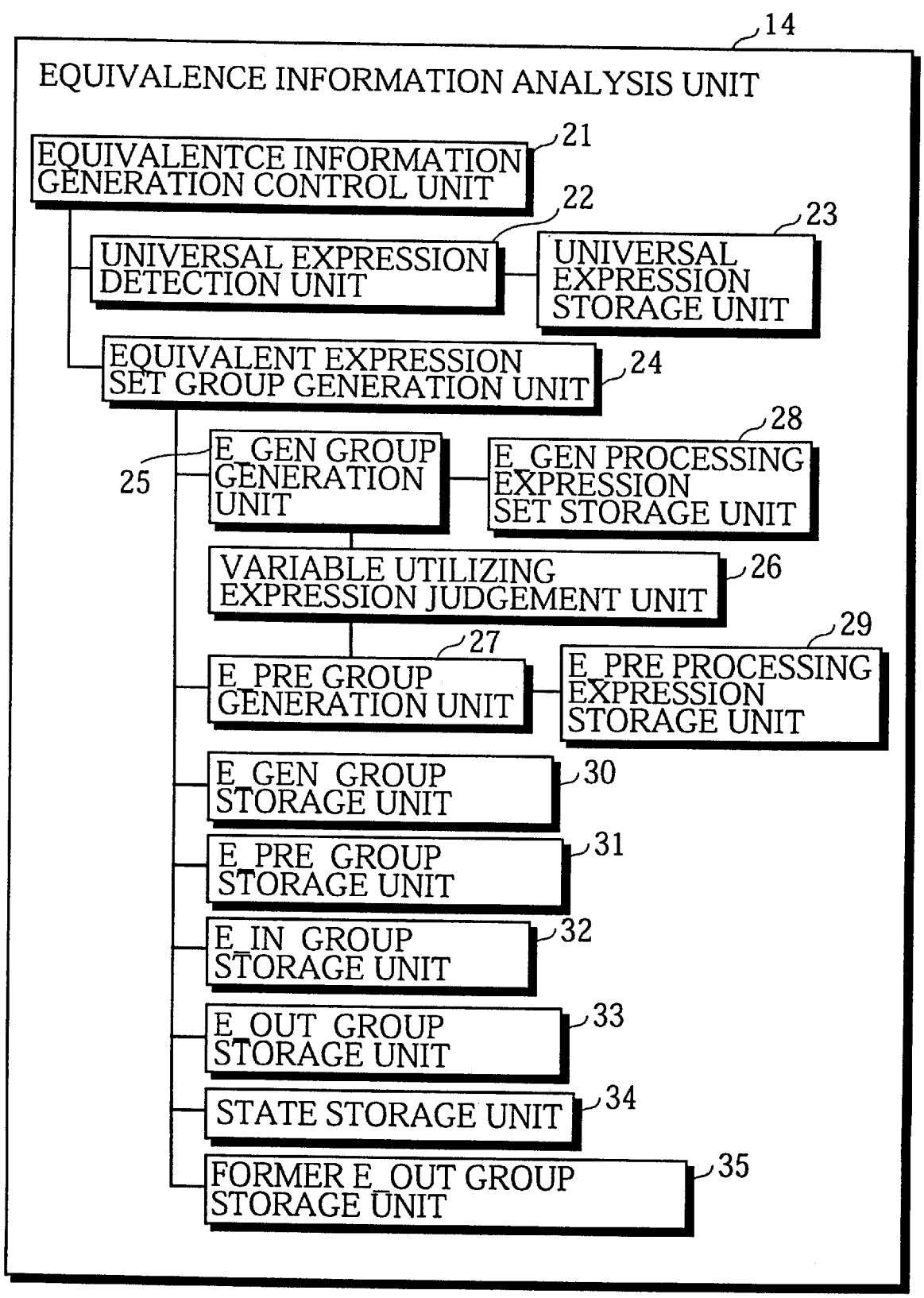
FIG. 10 shows the construction of the equivalence information analysis unit 14 show in FIG. 9.

The following explanation focuses on the equivalence information analysis unit 14 that realizes the characteristic analyzing process of the optimization apparatus 1. FIG. 10 shows the configuration of the equivalence information analysis unit 14. The equivalence information analysis unit 14 is composed of an equivalence information generation control unit 21, a universal expression detection unit 22, a universal expression storage unit 13, an equivalent expression set group generation unit 24, an E_GEN group generation unit 25, a variable utilizing expression judgment unit 26, an E_PRE group generation unit 27, an E_GEN group processing expression set storage unit 28, an E_PRE processing expression storage unit 29, an E_GEN group storage unit 30, an E_PRE group storage unit 31, an E_IN group storage unit 32, an E_OUT group storage unit 33, a state storage unit 34, and a former E_OUT group storage unit 35. These components of the equivalence information analysis unit 14 are described below.

2.2,2. Equivalence Information Generation Control Unit 21, Universal Expression Detection Unit 22, and Universal Expression Storage Unit 23

The equivalence information generation control unit 21 controls the entire equivalence information analysis unit 14.

The universal expression detection unit 22 is activated by the equivalence information generation control unit 21 and detects every expression that appears in the program. The universal expression detection unit 22 stores all these expressions in the universal expression storage unit 23.

The universal expression storage unit 23 stores every expression that appears in the program.

2.2.3. Equivalent Expression et Group-Generation Unit 24

The equivalent expression set group generation 24 is activated by the equivalence information generation control unit 21 and generates the E_GEN equivalent expression set group, E_PRE expression group E_OUT equivalent expression set group, and E_IN equivalent expression set group for each basic block. This generation of equivalent expression set groups by the equivalent expression set group generation unit 24 can be roughly divided into three phases.

In the first phase, the equivalent expression set group generation unit 24 generates the E_GEN equivalent expression set group and E_PRE expression group for each basic block. In the second phase, the equivalent expression set group generation unit 24 initializes the E_OUT and E_IN equivalent expression set groups of each basic block using the E_GEN equivalent expression set groups and E_PRE expression groups generated in the first phase. Finally, in the third phase, the equivalent expression set group generation unit 24 solves the data flow equations given as Equation 1 using an iterative method to calculate the largest solutions for the generated E_OUT and E_IN equivalent expression set groups.

2.2.4. Hierarchical Structure of Processing by Equivalent Expression Set Group Generation Unit 24

Figure 35:
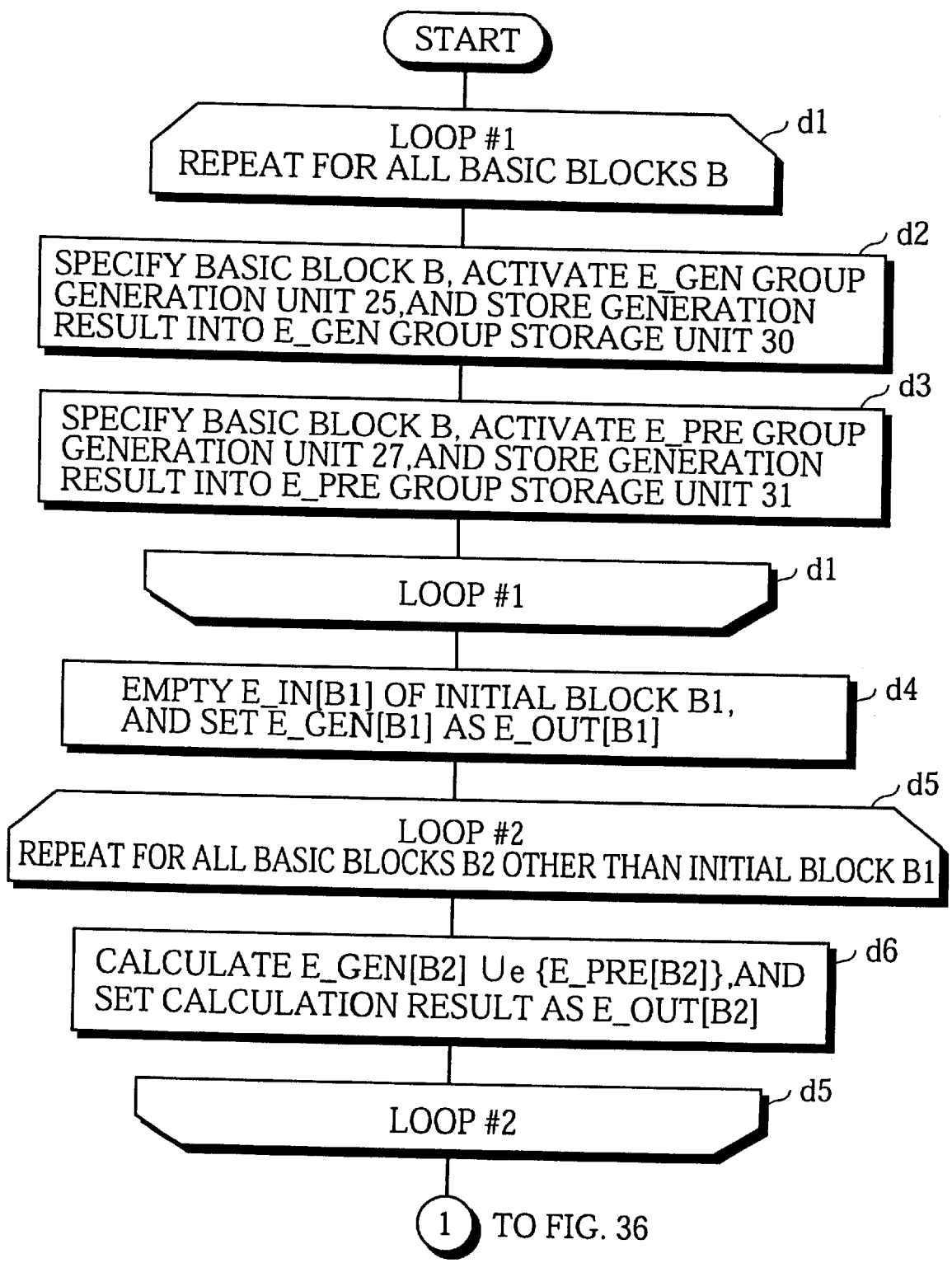
FIG. 35 is a flowchart showing the processing of the equivalent expression set group generation unit 24.
Figure 36:
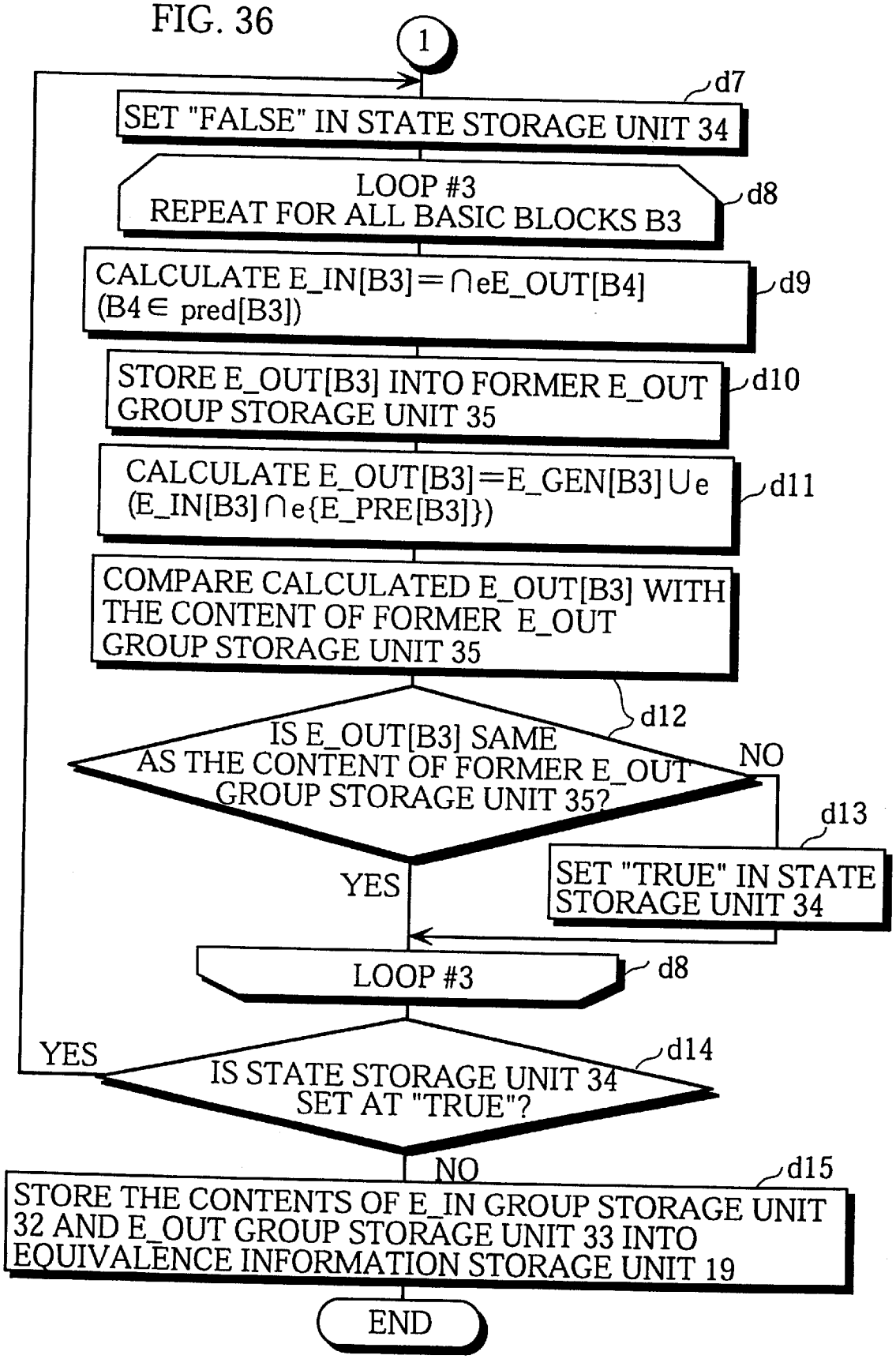
FIG. 36 is a flowchart showing the processing of the equivalent expression set group generation unit 24.

FIGS. 35 and 36 are flowcharts showing the processing for the equivalent expression set groups described above.

In these flowcharts, the generation of E_GEN[B] by the E_GEN group generation unit 25 in step d2 and the generation of E_PRE[B] by the E_PRE group generation unit 27 in step d3 for all basic blocks B correspond to the first phase. These processes form iterative loop #2.

The initialization of the E_OUT and E_IN equivalent expression set groups of initial block B1 in step d4 and the calculation of the equivalence union E_GEN[B2]∪E_PRE[B2] in step d6 for all basic blocks B2 other than initial block B1 correspond to the second phase. These processes form iterative loop #2.

The calculation of E_IN[B3]∩eE_OUT[B4] (B4∈pred[B3]) in step d9, the storage of E_OUT[B3] into the former E_OUT group storage unit 35 in step d10, the calculation of E_OUT[B3]=E_GEN[B3]∪e(E_IN[B3] ∩eE_PRE[B3]) in step d11, the comparison of E_OUT[B3] with the content stored in the former E_OUT group storage unit 35 in step d12, the setting of "True" in the state storage unit 34 in step d13 depending on the comparison result, steps d9–d13 forming iterative loop #3 which repeats for each basic block, and the execution of iterative loop #3 in step d14 until "False" is set in the state storage unit 34 correspond to the third phase. Each step shown in these flowcharts is described later.

2.2.5. E_GEN GROUP GENERATION Unit 25

The E_GEN group generation unit 25 is activated by the equivalent expression set group generation unit 24 in each iterative loop #1 Shown in FIG. 35 and generates the E_GEN equivalent expression set group of each basic block B using the E_GEN[B] calculation algorithm shown in FIG. 22.

FIGS. 27–31 are flowcharts showing the processing of the E_GEN group generation unit 25. The processing of the E_GEN group generation unit 25 has the hierarchical structure composed of the top layer, the middle layer, and the bottom layer.

2.2.5.1. Hierarchical Structure of Processing by E_GEN Group Generation Unit 25

Figure 27:
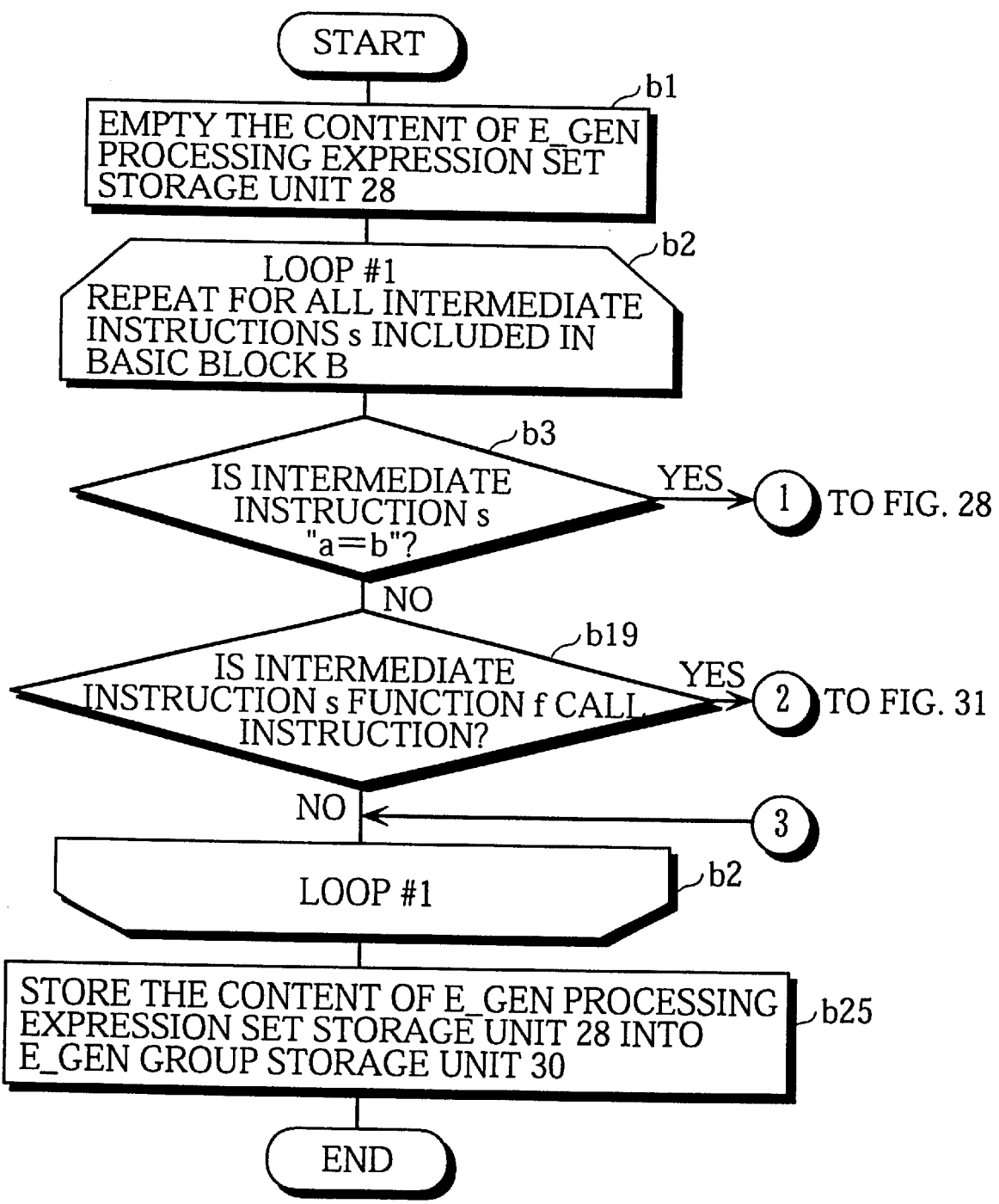
FIG. 27 is a flowchart showing the processing of the top layer of the $E_{13}$GEN group generation unit 25.

FIG. 27 is a flowchart showing the process of the top layer in the hierarchical structure of the E_GEN group generation unit 23. This top layer has iterative loop 41 for analyzing each intermediate instruction s included in basic block B. In iterative loop #1, it is judged whether intermediate instruction s has the format "a=b" in step b3, and it is judged whether intermediate instruction s is a function f call instruction in step b19. As is result of iterative loop #1, the E_GEN equivalent expression set group is produced in the E_CEN processing expression set storage unit 28 and stored into the E_GEN group storage unit 30.

Figure 28:
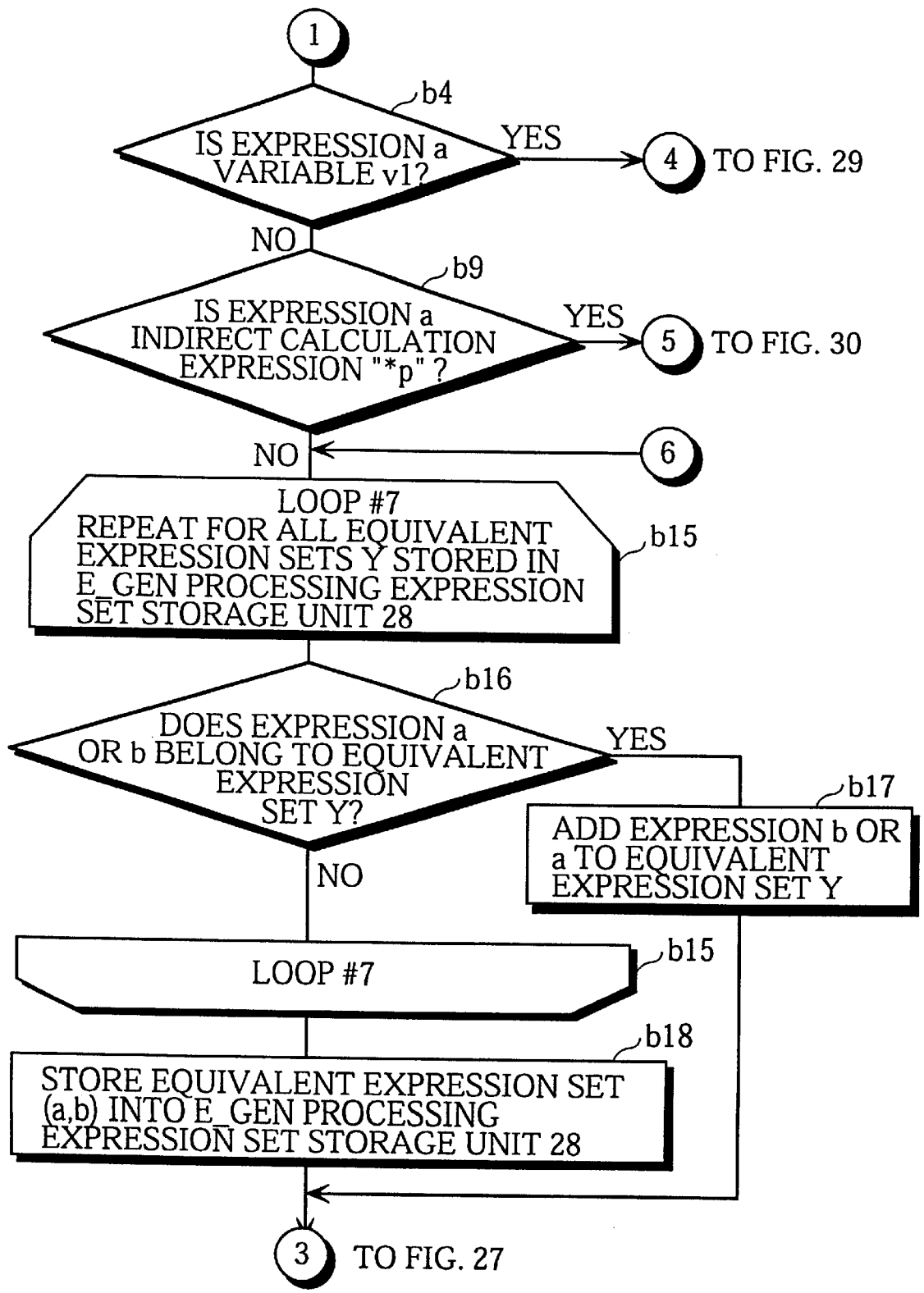
FIG. 28 is a flowchart showing the processing of the middle layer of the $E_{13}$GEN group generation unit 25.

FIG. 28 is a flowchart showing the process of the middle layer in the hierarchical structure of the E_GEN group generation unit 25. Here, further analysis is performed to produce the E_GEN equivalent expression set group when it judged that intermediate instruction s has the format "a=b" in step b3 in FIG. 27. The judgment whether expression a in intermediate instruction s is variable v1 in step b4 and the judgment whether expression a is an indirect calculation expression "*p" in step b9 correspond to the further analysis. When expression a is neither variable v1 nor an indirect calculation expression "*p", it is judged whether expression a or expression b belongs to equivalent expression set Y (∀Y∈(E_GEN processing expression set storage unit 28)) in step b16 which repeats for every equivalent expression set Y in iterative loop #7. Once it is judged that expression a (b) belongs to equivalent expression set Y in step b16 during iterative loop #7, expression b (a) is added to equivalent expression set Y in step b17, and the processing exits from iterative loop #7 and returns to the process of the top layer shown in FIG. 27. On the other hand, after iterative loop #7 repeats for all equivalent expression sets Y, an equivalent expression set (a,b) is stored into the E_GEN processing expression set storage unit 28 in step b18. Iterative loop #7, step b17, and step b18 correspond to the E_GEN group generation.

Figure 29:
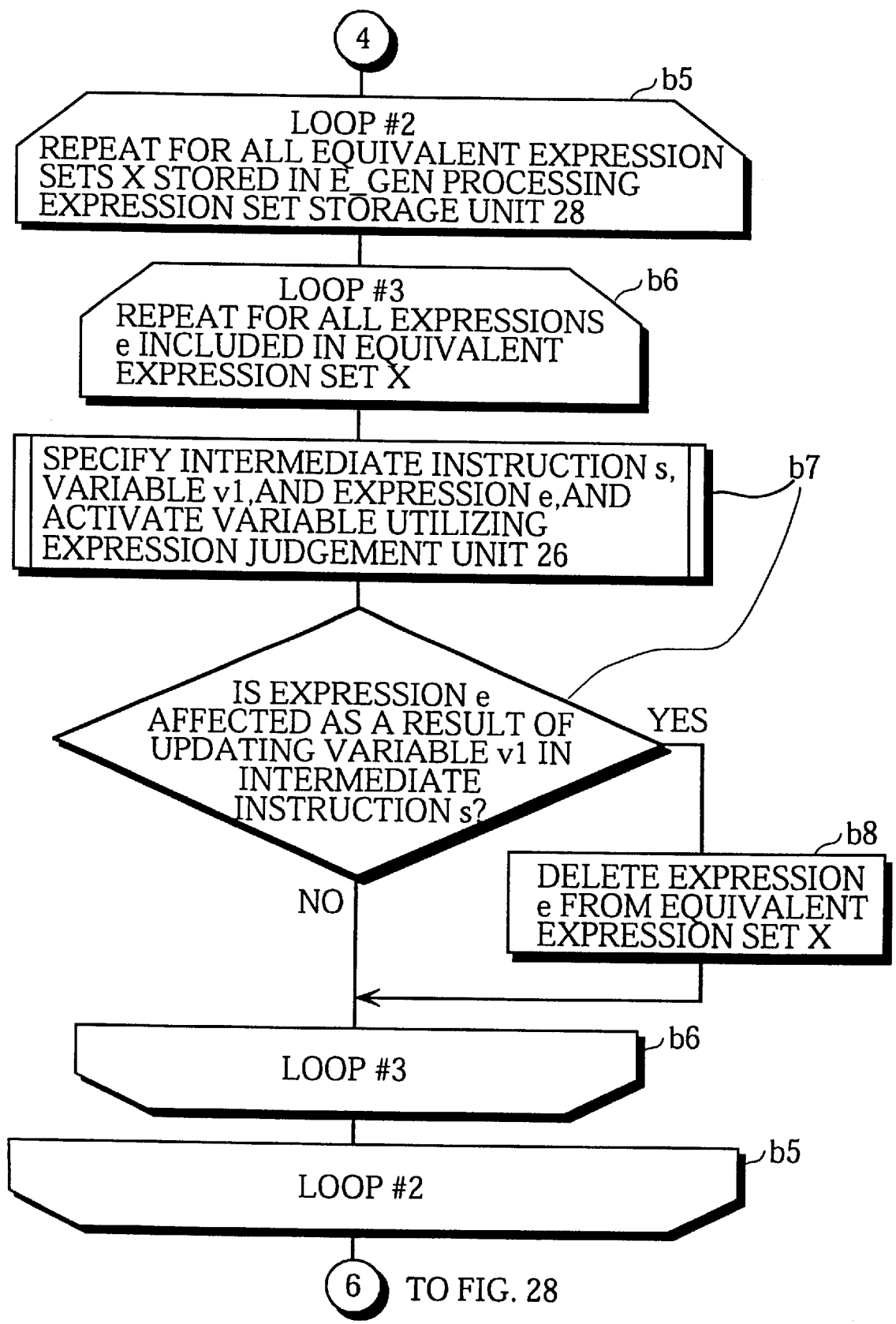
FIG. 29 is a flowchart showing the processing of the bottom layer of the $E_{13}$GEN group generation unit 25.

FIG. 29 is a flowchart partially showing the process of the bottom layer in the hierarchical structure of the E_GEN group generation unit 25. Here, the E_GEN equivalent expression set group is generated when it is judged that expression a is variable v1 in step b4 in FIG. 28.

The E_GEN group generation corresponds to Iterative loop #3 and iterative loop #2. Iterative loop #3 is made up of step b7 where it is judged whether expression e (∀e∈ (equivalent expression set X) is affected when the value of variable v1 is updated in intermediate instruction s as a result of the judgment in step b4, and step b8 where expression e is deleted from equivalent expression set X when it is judged that expression e is affected. Iterative loop #3 repeats for all expressions e included in equivalent expression set X (∀X∈ (E_GEN processing expression set storage unit 28). Iterative loop #2 has iterative loop #3 repeat for all equivalent expression sets X stored in the E_GEN processing expression set storage unit 28.

Figure 30:
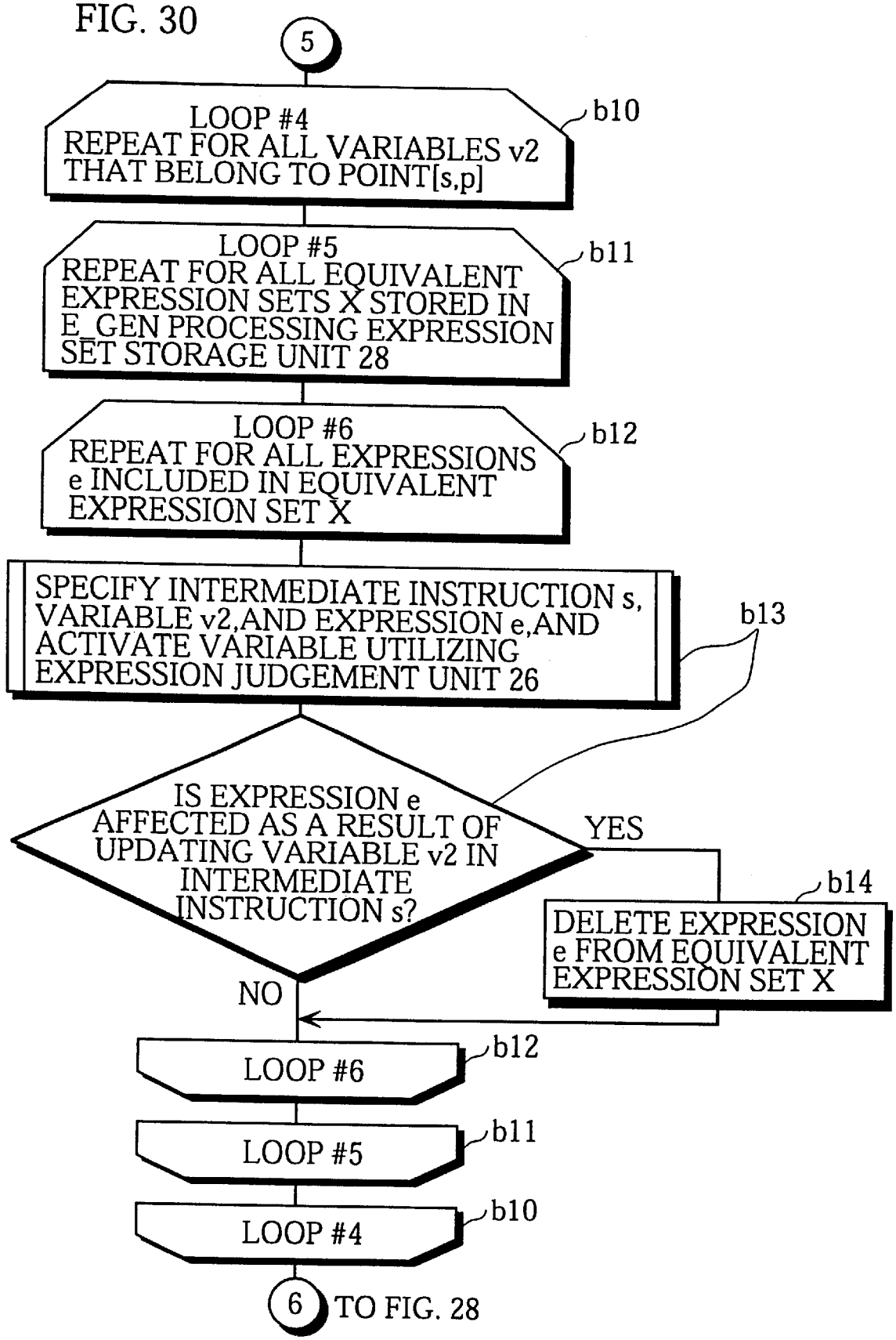
FIG. 30 is a flowchart showing the processing of the bottom layer of the $E_{13}$GEN group generation unit 25.

FIG. 30 is a flowchart partially showing the process of the bottom layer in the hierarchical structure of the E_GEN group generation unit 25. Here, the E_GEN equivalent expression set group is produced when it is judged that expression a is an indirect calculation expression "*p" in step b9 in FIG. 28.

In step b13, it is judged whether expression e (∀e∈equivalent expression set X)) is affected when the value of variable v2 (∀v2∈POINT[s,p]) is updated in intermediate instruction s as a result of the judgment result in step b9. When it is judged that expression e is affected in step b13, expression e is deleted from equivalent expression set X in step b14. Step b13 repeats for all expressions e in equivalent set X in iterative loop #6. Iterative loop #5 has iterative loop 46 repeat for all equivalent expression sets X (∀S∈(E_GEN processing expression set storage unit 28)), and iterative loop #4 has iterative loop #5 repeat for all variables v2 which belong to POINT[s,p].

Figure 31:
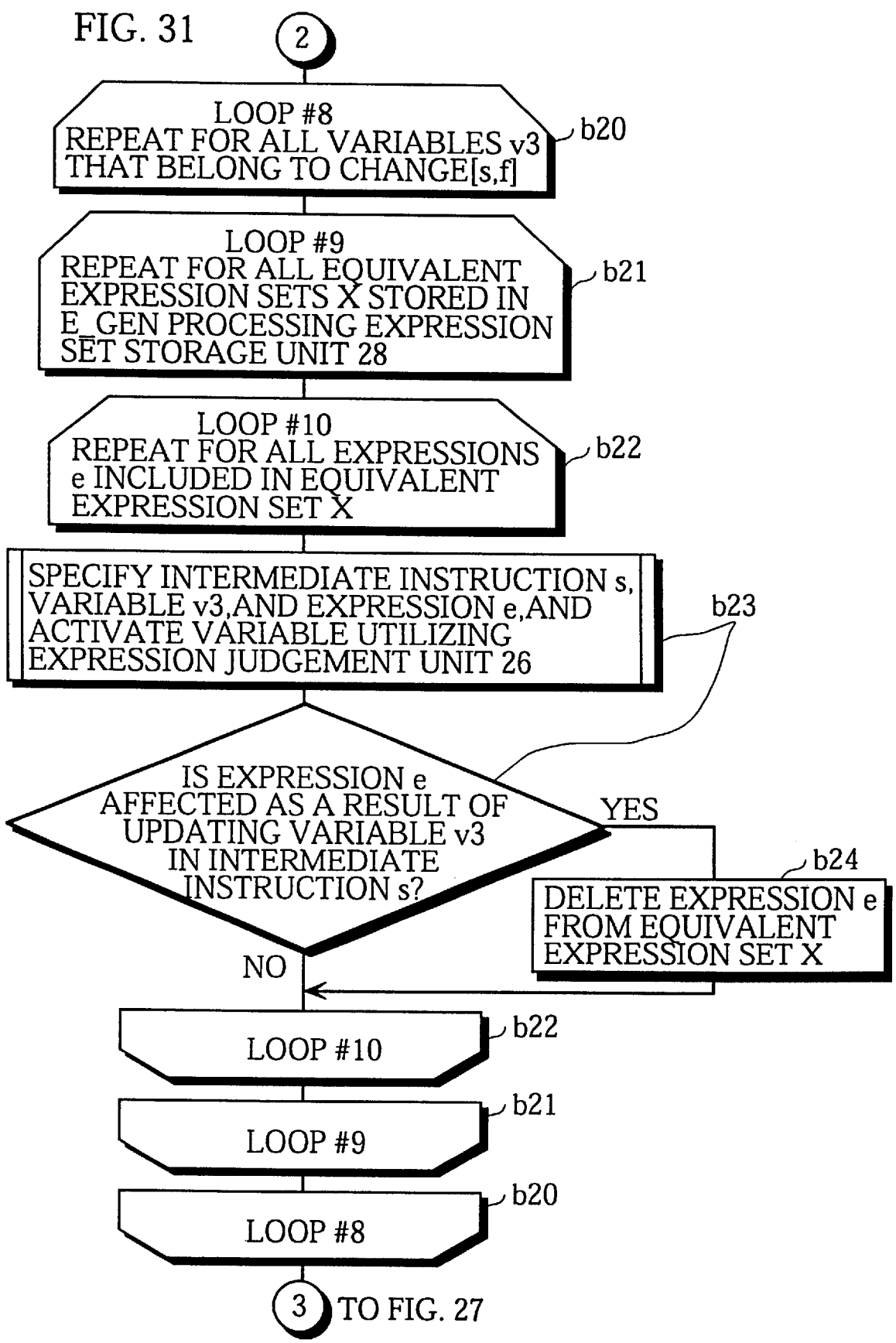
FIG. 31 is a flowchart showing the processing of the bottom layer of the $E_{13}$GEN group generation unit 25.

FIG. 31 is a flowchart partially showing the process of the bottom layer in the hierarchical structure of the E_GEN group generation unit 25. Here the E_GEN equivalent expression set group is produced when it is judged that intermediate instruction s is a function f call instruction in step b19 in FIG. 27. In step b23, it is judged whether expression e (∀e∈(equivalent expression set X)) is affected when the value of variable v3 (∀v3CHANGE[s,f]) is updated in intermediate instruction s as a result of the judgment in step b19. In step b24, expression e is deleted from equivalent expression set X when it is judged that expression e is affected in step b23. Iterative loop #10 has step b23 repeat for all expressions e included in equivalent expression set X, iterative loop #9 has iterative loop #10 repeat for all equivalent expression sets X (∀X∈(E_GEN processing expression set storage unit 28)), and iterative loop #8 has iterative loop #9 repeat for all variables v3 that belong to CHANGE[s,f].

2.2.6. Variable Utilizing Expression Judgment Unit 26

The variable utilizing expression judgment unit 26 is activated when one of the equivalent expression set group generation unit 24, the E_GEN group generation unit 25, and the E_PRE group generation unit 27 specifies intermediate instruction s, variable v, and expression e respectively as first to third arguments. On being activated, the variable utilizing expression judgment unit 26 judges whether expression e specified as the third argument is affected when variable v specified as the second argument is updated in intermediate instruction s specified as the first argument.

Figure 26:
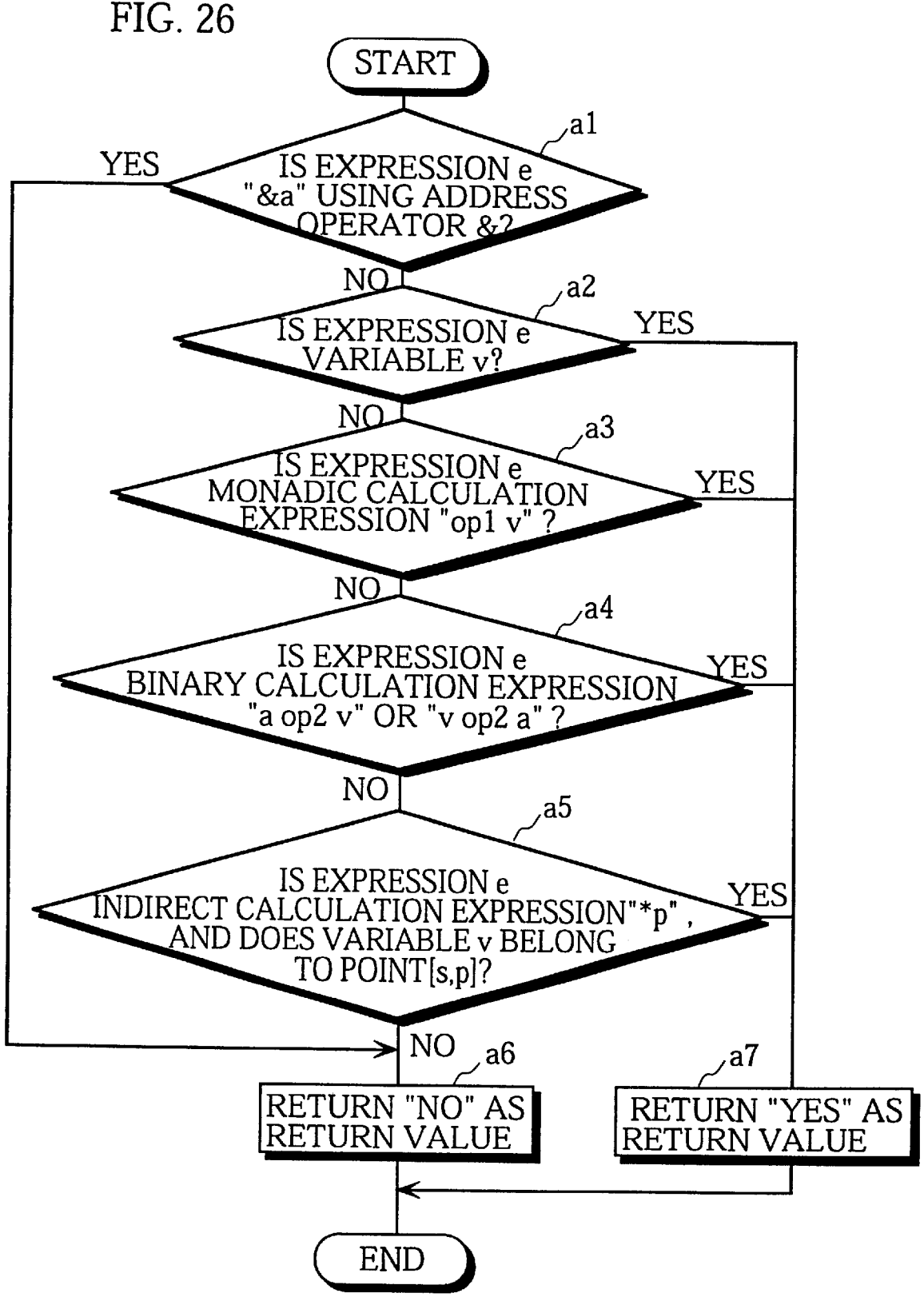
FIG. 26 is a flowchart showing the processing of the variable utilizing expression judgement unit 26.

FIG. 26 is a flowchart showing the processing of the variable utilizing expression judgment unit 26. In step a1, the variable utilizing expression judgment unit 26 judges whether expression e is an expression using the address operator &. If so, the variable utilizing expression judgment unit 26 bypasses steps a2–a5 and, in step a6, returns "No" as a return value to the equivalent expression set group generation unit 24, the E_GEN group generation unit 25, or the E_PRE group generation unit 27 that activated the variable utilizing expression judgment unit 26.

It expression e is not "&a" in step a1, in steps a2–a5, the variable utilizing expression judgment unit 26 judges: (1) whether expression e is variable v; (2) whether expression e is an expression "op1 v" using the monadic operator op1; (3) whether expression a is an expression "a op2 v" or "v op2 a" using the binary operator op2; and (4) whether expression e is an expression "*p" using the indirect reference operator * and variable v belongs to indicated variable set POINT[s, p].

If none of the conditions given in steps a2–a5 is met, the variable utilizing expression judgment unit 26 returns the return value "No" in step a6 to the equivalent expression set group generation unit 24, the E_GEN group generation unit 25, or the E_PRE group generation unit 27 that activated the variable utilizing expression judgment unit 26. If, on the other hand, one of the conditions is met, in step a7 the variable utilizing expression judgment unit 26 returns the return value "Yes" to the unit that activated the variable utilizing expression judgment unit 26.

2.2.7. Hierarchical Structure of Processing by E_PRE Group Generation Unit 27

The E_PRE group generation unit 27 is activated by the equivalent expression set group generation unit 24 in each iterative loop #1 shown in FIG. 35 and produces the E_PRE expression group for basic block B using the E_PRE[B] calculation algorithm shown in FIG. 23.

Figure 32:
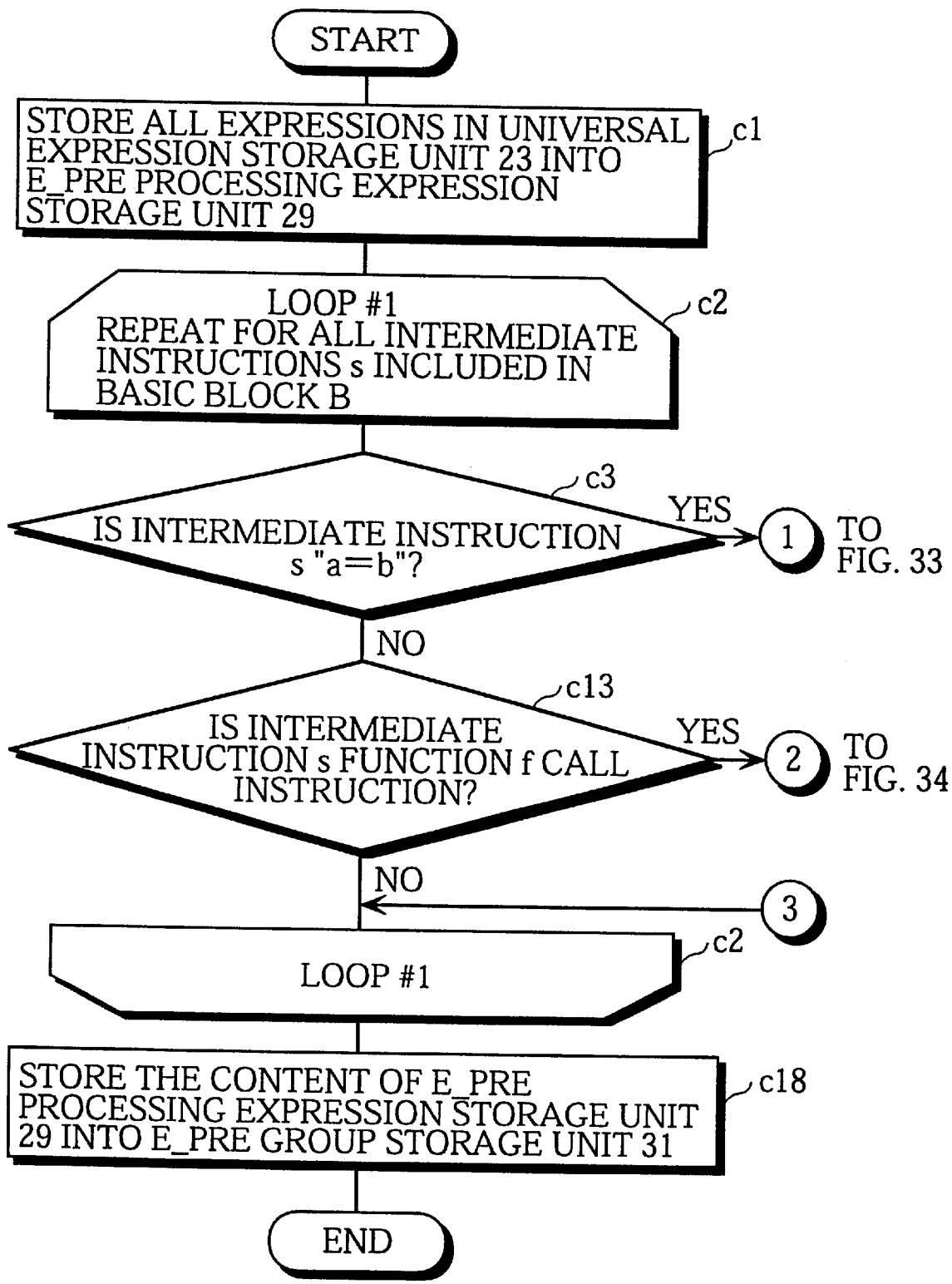
FIG. 32 is a flowchart showing the processing of the top layer of the $E_{13}$PRE group generation unit 27.
Figure 33:
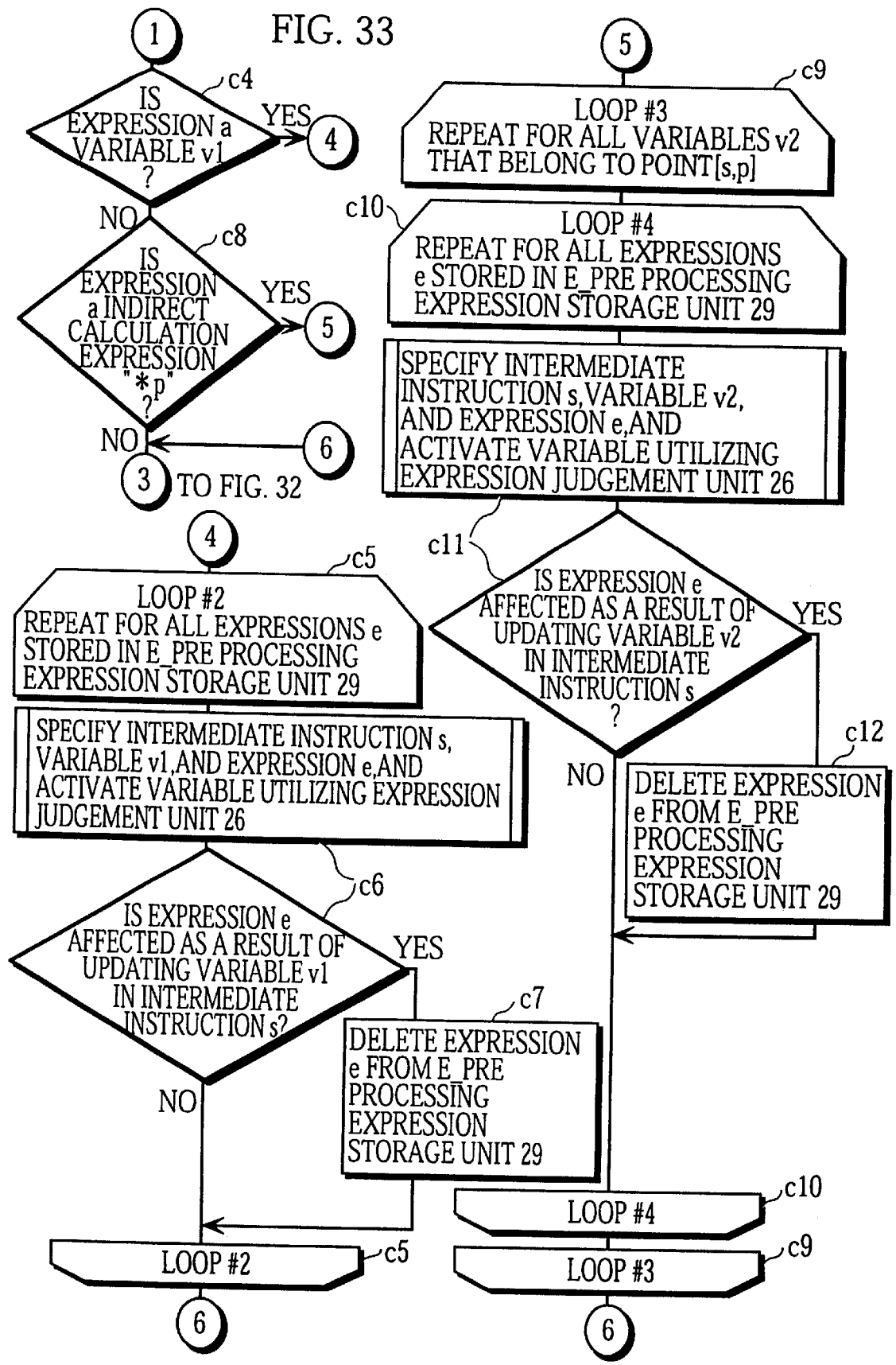
FIG. 33 is a flowchart showing the processing of the middle layer of the $E_{13}$PRE group generation unit 27.
Figure 34:
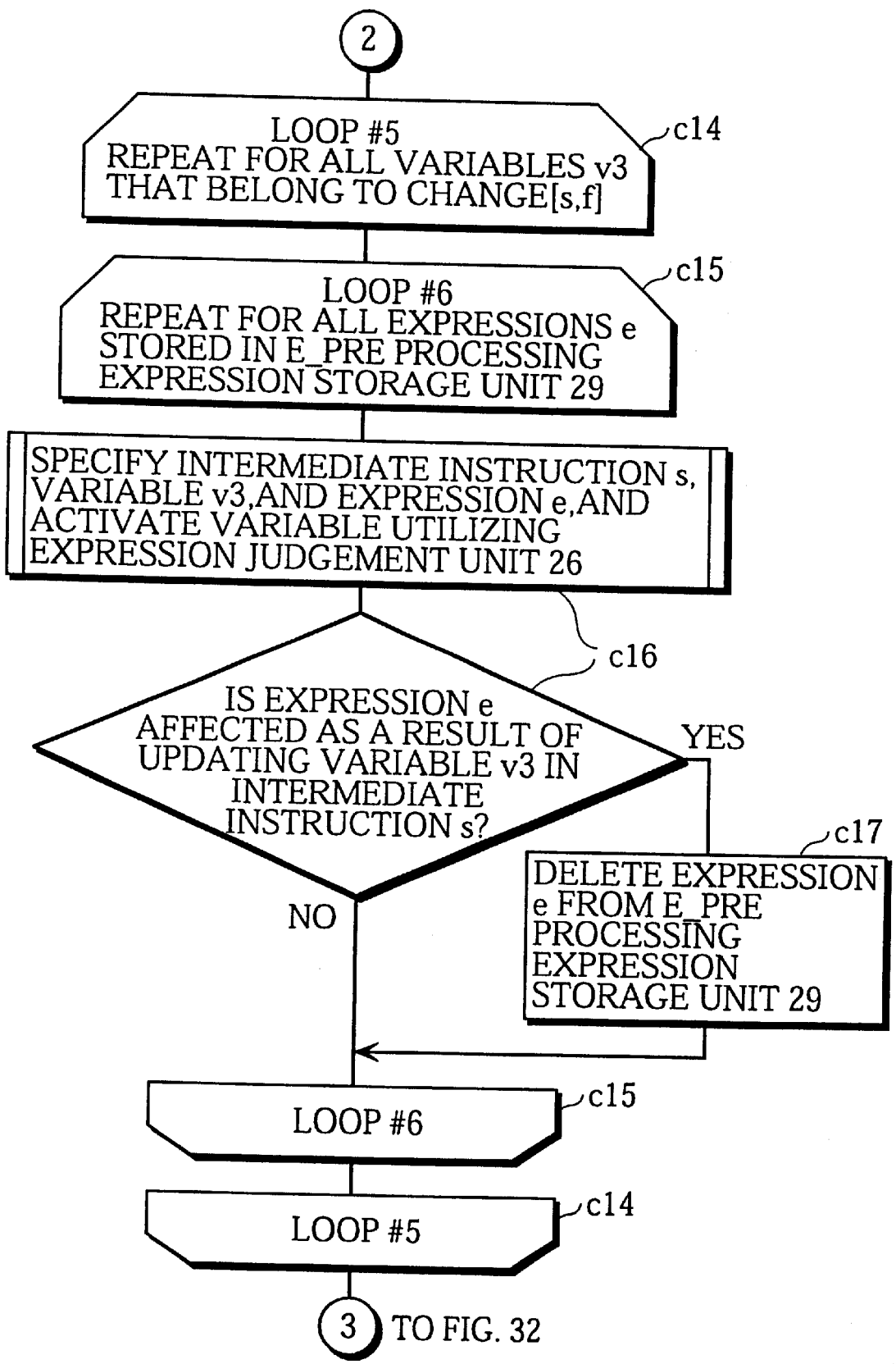
FIG. 34 is a flowchart showing the processing of the bottom layer of the $E_{13}$PRE group generation unit 27.

FIGS. 32–34 are flowcharts showing the E_PRE group generation processing. This processing has the hierarchical structure composed of the top layer, the middle layer, and the bottom layer.

FIG. 32 corresponds to the process of the top layer in the E_PRE group generation unit 27 where each intermediate instruction s in basic block B is analyzed. This analysis is performed in iterative loop #1 that repeats for all intermediate instructions s included in basic block B, iterative loop #1 being made up of step c3 where it is judged whether intermediate instruction s (∀s∈(basic block B) Los the format "a=b" and step c13 where it is judged whether intermediate instruction s is a function f call instruction. Expressions obtained in the E_PRE processing expression storage unit 29 in iterative loop #1 are stored into the E_PRE group storage unit 31 as the E_PRE expression group in step c18.

FIG. 33 corresponds to the process of the middle layer in the E_PRE group generation unit 27, where further analysis is performed to produce the E_PRE expression group of basic block B when intermediate instruction s is judged as "a=b" in step c3 in FIG. 32.

The further analysis corresponds to step c4 where it is judged whether expression a is variable v1 and step c8 where it is judged whether expression a is an indirect calculation expression "*p".

When it is judged that expression a is variable v1 in step c4, the E_PRE expression group is generated by executing steps C5–C7. In step c6, it is judged whether expression e (∀e∈(E-PRE processing expression storage unit 29)) is affected when the value of variable v1 is updated in intermediate instruction s. When it is judged that expression e is affected, expression e is deleted from the E_PRE processing expression storage unit 29 in step c7. Iterative loop #2 has step c6 repeat for all expressions e in the E_PRE processing expression storage unit 29, When, on the other hand, it is judged that expression a is an indirect calculation expression "*p" in step c8, the E_PRE expression group is generated by executing steps c9–c12. In step c11, it is judged whether expression e (∀e∈(E_PRE processing expression storage unit 29)) is affected when variable v2 (∀v2∈POINT[s,p]) is updated in intermediate instruction s. When it is judged that expression e is affected, expression e is deleted from the E_PRE processing expression storage unit 29 in step c12. Iterative loop 44 has step c11 repeat for all expressions e in the E_PRE processing expression storage unit 29, and iterative loop #3 has iterative loop #4 repeat for all variables v2 that belong to POINT[s,p].

FIG. 34 also corresponds to the process of the bottom layer in the E_PRE group generation unit 27, where the E_PRE expression group is produced when intermediate instruction s is judged as a function f call instruction in step c13 in FIG. 32. This E_PRE group generation is performed by executing step c16 where it is judged whether expression e (∀e∈_PRE processing expression storage unit 9)) is affected when variable v3 (∀v3∈CHANGE[s,f]) is updated in intermediate instruction s, and step c17 where expression e is deleted from the E_PRE processing expression storage unit 29 when it is judged that expression e is affected. Iterative loop #6 has step c16 repeat for all expressions e in the E_PRE processing expression storage unit 29, and iterative loop #5 has iterative loop #6 repeat for all variables v3 that belong to CHANGE[s,f].

2.2.8. E_GEN Processing Expression Set Storage Unit 28

The E_GEN processing expression set storage unit 28 stores all equivalent expression sets that establish equivalence in processing each intermediate instruction in a basic block.

FIG. 14A shows the changes of the content of the E_GEN processing expression set storage unit 28 when the E_GEN group generation unit 25 produces the E_GEN equivalent expression set group of basic block BLK3 shown in FIG. 11. As shown in the figure, when intermediate instruction s9 is processed, expression b6 and expression a5+10 are added to the S-GEN processing expression set storage unit 28 as the E_GEN equivalent expression set group. Next, when intermediate instruction s10 is processed, expressions z6 and p6 are added to the E_GEN equivalent expression set group.

2.2.9. E_PRE Processing Expression Storage Unit 29

The E_PRE processing expression storage unit 29 in the initial state stores all expressions appearing in the program. Expressions are deleted from the E_PRE processing expression storage unit 29 in the process of analyzing basic block B by the E_PRE group generation unit 27. After the last intermediate instruction of basic block B is analyzed and all affected expressions are deleted, remaining expressions in the E_PRE processing expression storage unit 29 become the E_PRE expression group.

FIG. 14B shows the changes of the content of the E_PRE processing expression storage unit 29 when the E_PRE group generation unit 27 generates the E_PRE expression group of basic block BLK3 shown in FIG. 11.

As shown in FIG. 14B, variable a4 is deleted from the E_PRE processing expression storage unit 29 when intermediate instruction s21 is processed, since intermediate instruction s21 defines variable a4 as shown in FIG. 11. Thus, variable a4 is deleted as it is affected by processing intermediate instruction s21.

2.2.10. E_GEN Group Storage Unit 30

The E_GEN group storage unit 30 stores the E_GEN equivalent expression set group for each basic block that is produced by the E_GEN group generation unit 25. When the E_GEN group generation unit 25 produces the E_GEN group for each basic block BLK1–BLK6 shown in FIG. 11, produced E_GEN groups are stored into the E_GEN group storage unit 30 as shown in FIG. 13B.

2.2.11. E_PRE Group Storage Unit 31

The E_PRE group storage unit 31 stores the E_PRE expression group for each basic block that is produced by the E_PRE group generation unit 27. When the E_PRE group generation unit 27 produces the E_PRE group for each basic block BLK1–BLK6 shown in FIG. 11, produced E_PRE groups are stored into the E_PRE group storage unit 31 as shown in FIG. 13C.

2.2.12. E_OUT Group Storage Unit 33

The E_OUT group storage unit 33 stores the initial E_OUT equivalent expression set group for each basic block obtained from the E_GEN equivalent expression set groups stored in the E_GEN group storage unit 30 and the E_PRE expression groups stored in the E_PRE group storage unit 31, to solve the data flow equations to obtain the largest solutions for the E_OUT equivalent expression set groups. FIG. 15B shows an example of the initial E_OUT equivalent expression set group of each basic block BLK1–BLK6.

The data flow equations are calculated using the E_GEN equivalent expression set groups, the E_PRE expression groups, and the E_IN equivalent expression set groups stored in the E_IN set storage unit 32 to obtain the E_OUT equivalent expression set group of each basic block, and obtained E_OUT equivalent expression set groups are stored into the E_OUT group storage unit 33.

FIG. 16C shows how the E_OUT group for each basic block BLK1–BLK6 changes after the first loop processing shown in FIGS. 35 and 36. FIG. 17B shows the E_OUT group in the convergence state.

The state storage unit 34 is used to judge whether further loop processing is necessary in the processing of the equivalent expression set group generation unit 24.

The formed E_OUT group storage unit 35 is used to set "True" or "False" in the state storage unit 34 in the processing of the equivalent expression set group generation unit 24.

2.2.13. E_IN Group Storage Unit 32

The E_IN group storage unit 32 stores the E_IN equivalent expression set group for each basic block that satisfies the data flow equations, the E_IN equivalent expression set groups being obtained from the data flow equations using the E_OUT equivalent expression set groups newly stored in the E_OUT group storage unit 33.

FIG. 16A shows how the E_IN equivalent expression set group for each basic block BLK1–BLK6 changes after the first loop processing. FIG. 17A shows the E_IN equivalent expression set group of each basic block that is the largest solution obtained as a result of convergence in the processing of the equivalent expression set group generation unit 24.

2.3. Equivalence Replacement Optimization Unit 16

The equivalence replacement optimization unit 16 is one of the most important components of the optimization apparatus 1. The equivalence replacement optimization unit 16 is activated by the optimization control unit 11 and optimizes the intermediate program using the equivalence replacement algorithm shown in FIG. 25.

FIGS. 37–42 are flowcharts showing the hierarchical processing of the equivalence replacement optimization unit 16. The processing includes actual optimization processes and accompanying processes of revising equivalent expression sets. These revise processes are performed in response to changes in resources of equivalent expression sets as a result of the optimization processes.

2.3.1. Hierarchical structure of Processing by Equivalence Replacement Optimization Unit 16

Figure 37:
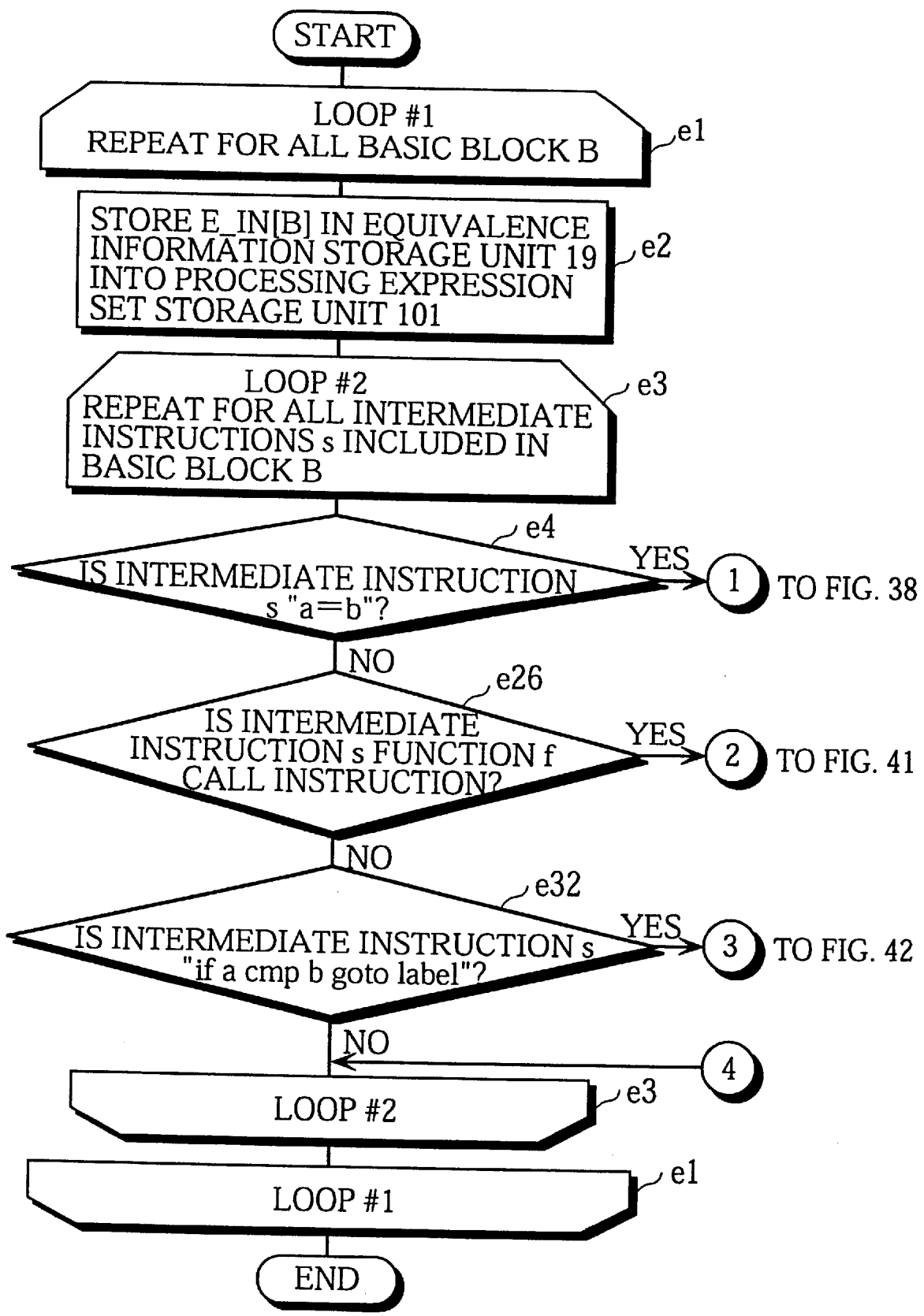
FIG. 37 is a flowchart showing the processing of the top layer of the equivalence replacement optimization unit 16.

FIG. 37 is a flowchart showing the process of the top layer in the equivalence replacement optimization unit 16. This process has the double loop configuration for sequentially analyzing each intermediate instruction 3 included in basic block B. It is judged whether intermediate instruction s has the format "a=b" in step e4, it is judged whether intermediate instruction 13 a function f call instruction in step e26, and it is judged whether intermediate instruction s has the format "if a cmp b goto label" in step e32. Iterative loop #2 has steps e4, e26, and e32 repeat for all intermediate instruction s in basic block B, and iterative loop #1 has iterative loop #2 repeat for all basic blocks B. Here, "cmp" represents the conditional operator in general.

Figure 38:
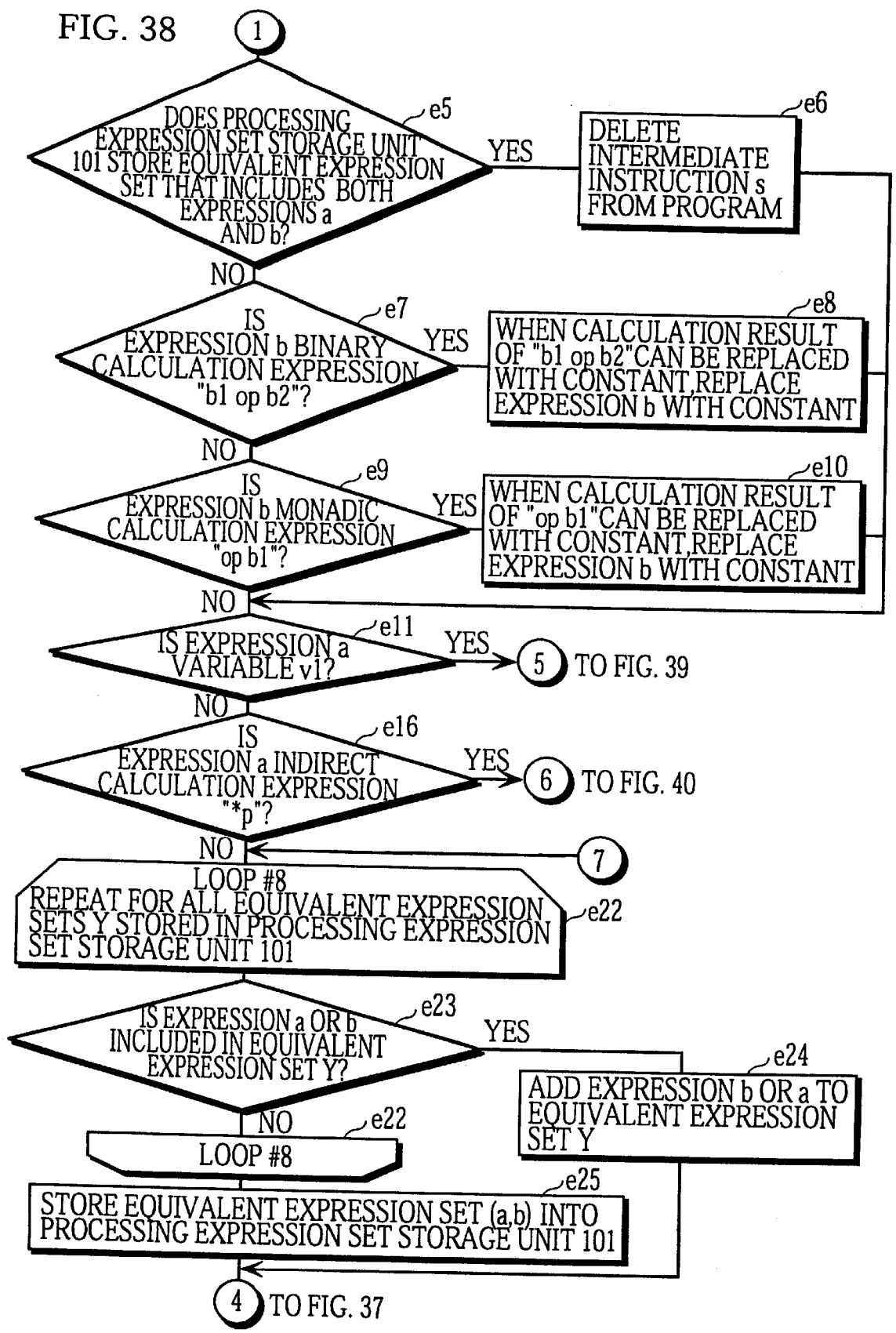
FIG. 38 is a flowchart showing the processing of the middle layer of the equivalence replacement optimization unit 16.

FIG. 38 is a flowchart showing the process of the middle layer in the equivalence replacement optimization unit 16. Here, the optimization process and the revise process are performed when intermediate instruction s is judged as "a=b" in step e4 in FIG. 37.

The optimization process is performed by executing steps e5–e10. In step e5, it is judged whether the processing expression set storage unit 101 stores an equivalent expression set that includes both expressions a and b. When the processing expression set storage unit 101 stores such an equivalent expression set, intermediate instruction s is deleted from the program in step e6, since expression a and b in intermediate instruction a have an equivalence relation, In step e7, it is judged whether expression b in intermediate instruction s has the binary calculation expression format "b1 op b2". When expression b has such a format, and when the calculation result of expression b can be replaced with a constant, expression b is replaced with the constant in step e8. In step e9, it is judged whether expression la in intermediate instruction s has the monadic calculation expression format "op b1". When expression b has such a format, and when the calculation result of expression b can be replaced with a Constant, expression b is replaced with the constant in step e10.

The revise process that accompanies the optimization process is performed by executing steps e11, e16, iterative loop #8, and steps e24–e25 in step e11, it is judged whether expression a in intermediate instruction s is variable v1. If so, the processing proceeds to the process of the bottom layer in FIG. 39, in step e16, it is judged whether expression a is an indirect calculation expression "*p". If so, the processing proceeds to the process of the top layer in FIG. 40. In step e23, it is judged whether expression a or expression b is included in equivalent expression set Y (∀A∈(processing expression set storage unit 101)). Step e23 repeats for all equivalent expression sets Y in the processing expression set storage unit 101 in iterative loop 48. Once it is judged that expression a (b) is included in equivalent expression set Y during iterative loop 48, expression b (a) is added to equivalent expression set Y in step e24 and the processing exits from iterative loop #8 and returns to the process of the top layer shown in FIG. 37.

Figure 39:
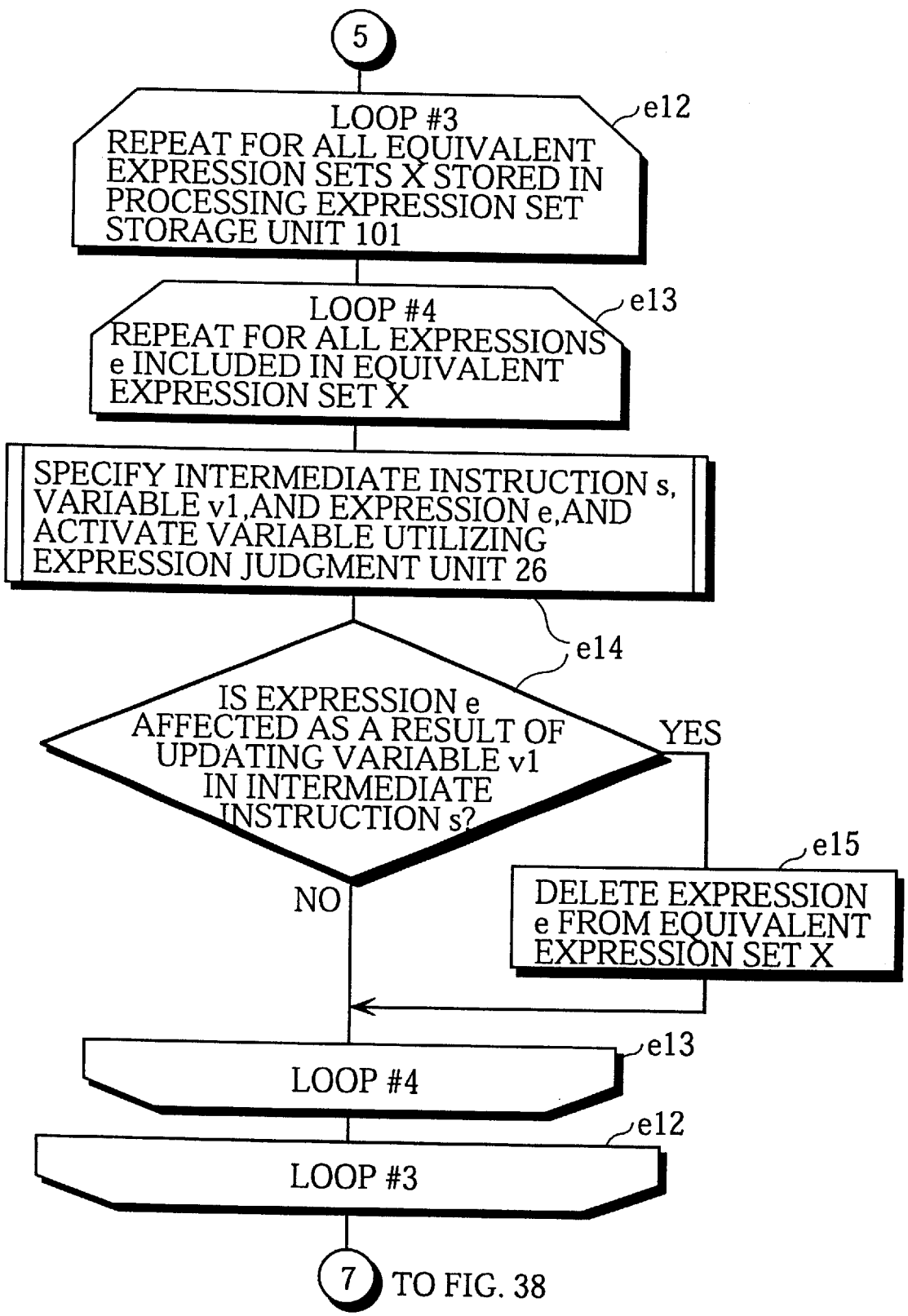
FIG. 39 is a flowchart showing the processing of the bottom layer of the equivalence replacement optimization unit 16.

FIG. 39 is a flowchart partially showing the process of the bottom layer in the equivalence replacement optimization unit 16. Here, the process of revising equivalent expression sets is performed when expression a is judged as variable b1 in step e11 in FIG. 38.

In step e14, it is judged whether expression e (∀e∈ (equivalent expression set X)) is affected when the value of variable v1 is updated in intermediate instruction s. When it is judged that expression e is affected, expression e is deleted from equivalent expression set X in step e15. Iterative loop #4 has step e14 repeat for all expressions e included in equivalent expression set X (∀e∈(processing expression set storage unit 101)), and iterative loop #3 has iterative loop #4 repeat for all equivalent expression sets X in the processing expression set storage unit 101.

Figure 40:
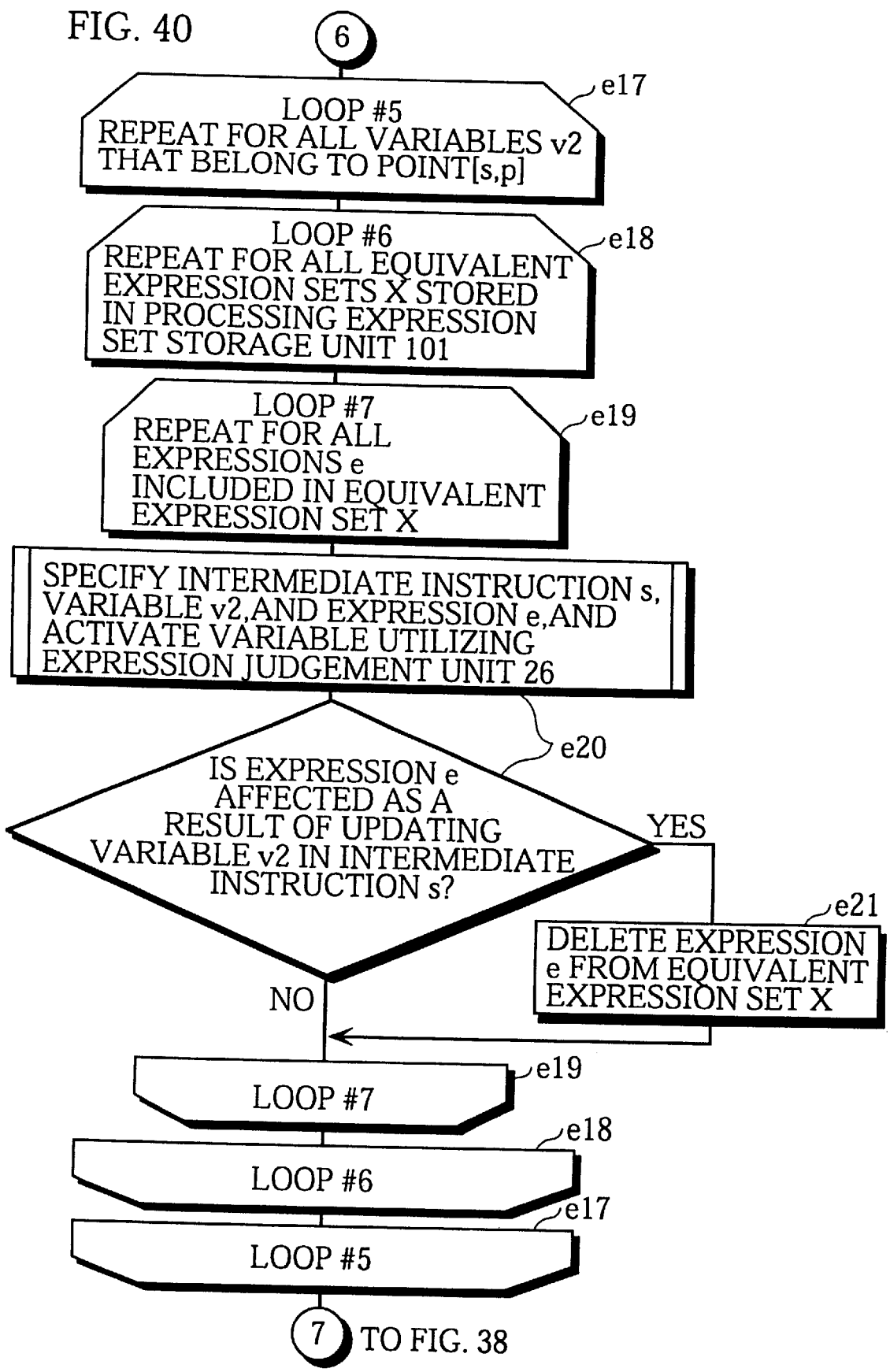
FIG. 40 is a flowchart showing the processing of the bottom layer of the equivalence replacement optimization unit 16.

FIG. 40 is a flowchart partially showing the process of the bottom layer in the equivalence replacement optimization unit 16. Here, the process of revising equivalent expression sets is performed when expression a is judged as an indirect calculation expression "*p" in step e16 in FIG. 38.

In step e20, it is judged whether expression e (∀e∈ (equivalent expression set X)) is affected when the value of variable v2 (∀v2∈POINT[s,p]) is updated in intermediate instruction s. When it is judged that expression e is affected, expression e is deleted from equivalent expression set X in step e21. Iterative loop #7 has step e20 repeat for all expressions e included in equivalent expression set X, iterative loop #6 has iterative loop #7 repeat for all equivalent expression sets X (∀X∈(processing expression Set storage unit 101)), and iterative loop #5 has iterative loop #6 repeat for all variables v2 that belong to POINT[s,p].

Figure 41:
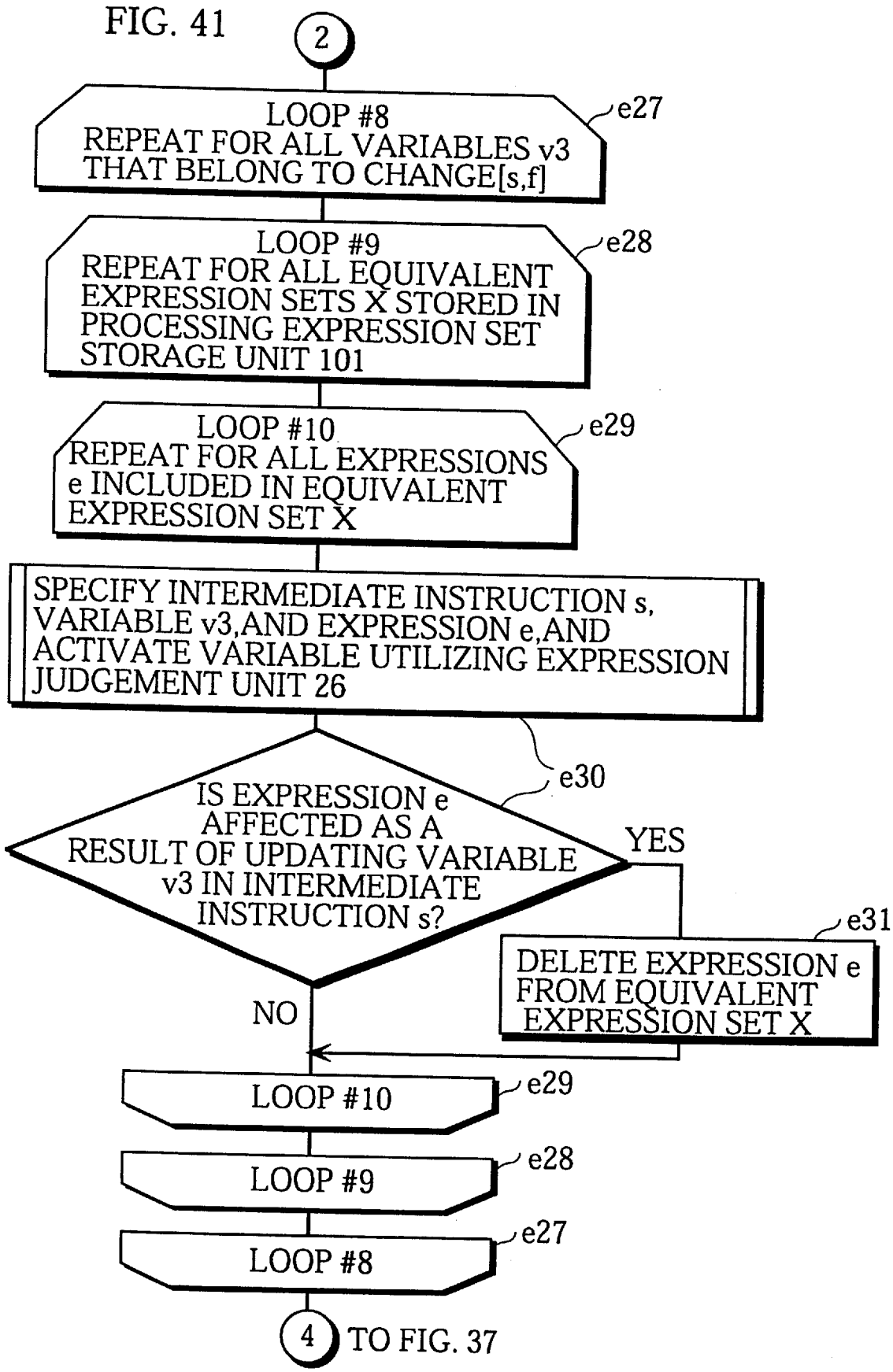
FIG. 41 is a flowchart showing the processing of the bottom layer of the equivalence replacement optimization unit 16.

FIG. 41 is a flowchart partially showing the process of the bottom layer is the equivalence replacement optimization unit 16. Here, the process of revising equivalent expression sets is performed when intermediate instruction s is judged as a function f call instruction in step e26 in FIG. 37.

In step e30, it is judged whether expression e (∀e∈ (equivalent expression set X)) is affected when the value of variable v3 (∀v3∈CHANGE[s,f]) is updated in intermediate instruction s. When it is judged that expression e is affected, expression e is deleted from equivalent expression set X in step e31. Iterative loop #10 has step e30 repeat for all expressions e included in equivalent expression set X, iterative loop #9 has iterative loop #10 repeat for all equivalent expression sets X (∀X∈(processing expression set storage unit 101)), and iterative loop #8 has iterative loop #9 repeat for all variables v3 that belong to CHANGE[s,f].

Figure 42:
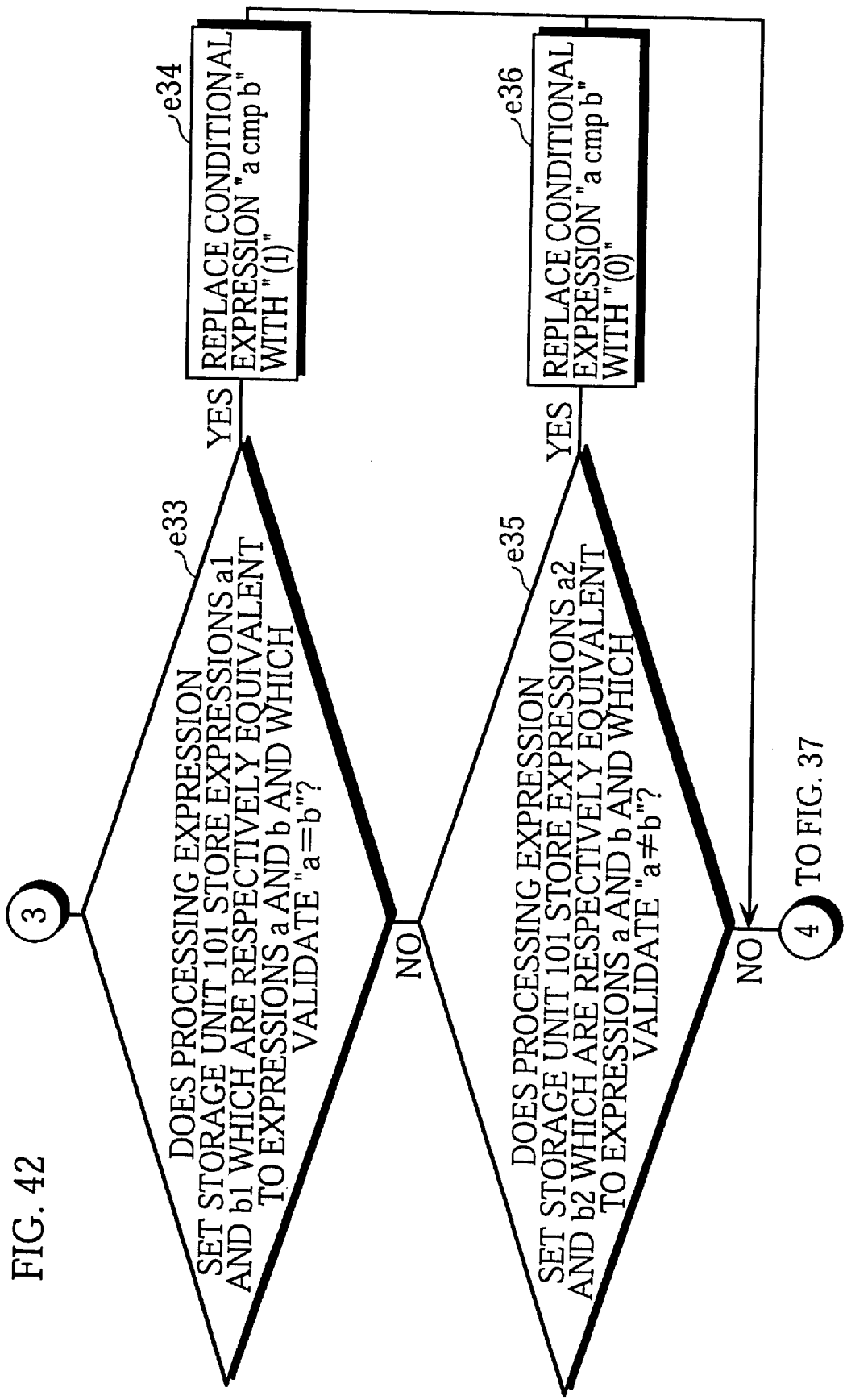
FIG. 42 is a flowchart showing the processing of the middle layer of the equivalence replacement optimization unit 16.

FIG. 42 is a flowchart showing the process of the middle layer in the equivalence replacement optimization unit 16. Here, when intermediate instruction s is judged as "if a cmp b goto label" in step e32 in FIG. 37, the optimization process is performed on the conditional expression "a cmp b".

In step e33, it is judged whether the processing expression set storage unit 101 stores expressions a1 and b1 which are respectively equivalent to expressions a and b in the conditional expression "a cmp b" and which validate "a=b". When such expressions a1 and b1 exist, conditional expression "a cmp b" in intermediate instruction s is replaced with "(1)" in step e34. When such expressions a1 and b1 do not exist, it is judged whether the processing expression set storage unit 101 stores expressions a2 and b2 which are respectively equivalent to expressions a and b and which validate "a≠b" in step e35. When such expressions a2 and b2 exist, conditional expression "a cmp b" in intermediate instruction a is replaced with "(0)" in step e36. By doing so, conditional expression "a cmp b" is optimized.

2.4. Specific Operation in Each Step of Flowcharts

The following is a more detailed description of the processing of the variable utilizing expression judgment unit 26 with reference to FIG. 26. The variable utilizing expression judgment unit 26 receives intermediate instruction s, variable v, and expression e as arguments at the time of activation. When expression e is affected as a result of updating the value of variable v in intermediate instruction s, the variable utilizing expression judgment unit 26 returns "Yes" as the return value to the unit which activated the variable utilizing expression judgment unit 26. When, on the other hand, expression e is not affected, the variable utilizing expression judgment unit 26 returns "No" to the unit which activated the variable utilizing expression judgment unit 26. This processing is explained in detail below. Note here that "a" is a given variable or constant, and "p" is a pointer variable.

In step a1, when expression e is "&a" using the address operator &, the processing proceeds to step a6.

In step a2, when expression e is variable v, the processing proceeds to step a7.

In step a3, when expression e is "op1 v" using the monadic operator op1, the processing proceeds to step a7.

In step a4, when expression e is "a op2 v" or "v op2 a" using the binary operator op2, the processing proceeds to step a7.

In step a5, when expression e is "*p" using the indirect reference operator *, and when variable v belongs to indicated variable set POINT[s,p], the processing proceeds to step a7.

In step a6, the variable utilizing expression judgment unit 26 returns the return value "No" and ends its operation.

In step a7, the variable utilizing expression judgment unit 26 returns the return value "Yes" and ends its operation.

The following is a more detailed description of the processing of the E_GEN group generation unit 25 with reference to FIGS. 27–31. The E_GEN group generation unit 25 has basic block B as an argument at the time of activation. The E_GEN group generation unit 25 calculates E_GEN[B] of basic block B and stores the calculation result into the E_GEN group storage unit 30 as the return value. This operation is explained in detail below.

In step b1, the content of the E_GEN processing expression set storage unit 28 is emptied.

In step b2, the E_GEN group generation unit 25 successively retrieves intermediate instructions from the entry point of basic block B and performs steps b3 to b19 on retrieved intermediate instruction s. On completing steps b3 to b19 for all intermediate instruction in basic block B, the processing proceeds to step b25.

In step b3, when intermediate instruction s has the format "a=b", steps b4 to b18 are executed. Otherwise, the processing proceeds to step b19. Note here that a and b are both expressions.

In step b4, when expression a is variable v1, the processing proceeds to step b5. Otherwise, the processing proceeds to step b9.

In step b5 the E_GEN group generation unit 25 successively retrieves equivalent expression sets from the E_GEN processing expression set storage unit 28 and performs steps b6–b7 on retrieved equivalent expression set X. On completing steps b6–b7 for all equivalent expression sets stored in the E_GEN processing expression set storage unit 28, the processing proceeds to step b15.

In step b6, the E_GEN group generation unit 25 successively retrieves expressions from equivalent expression set X and performs step b7 on retrieved expression e. On completing step b7 for all expressions included in equivalent expression set X, the processing proceeds to step b5 where the E_GEN group generation unit 25 retrieves the next equivalent expression set.

In step b7, the E_GEN group generation unit 25 activates the variable utilizing expression judgment unit 26 and inputs intermediate instruction s which was retrieved in step b2, variable v1 which was judged as expression a in step b4, and expression e which was retrieved in step b6 into the variable utilizing expression judgment unit 26. When the judgment result is "Yes", the processing proceeds to step b8. Otherwise, the processing proceeds to step b6 where the E_GEN group generation unit 25 retrieves the next expression.

In step b8, the E_GEN group generation unit 25 deletes expression e retrieved in step A from equivalent expression set X retrieved in step W. Then, the processing proceeds to step b6 where the B_GEN group generation unit 25 retrieves the next expression.

In step 19, when expression a is an indirect calculation expression "*p", the processing proceeds to step b10. Otherwise, the processing proceeds to step b15.

In step b10, the E_GEN group generation unit 25 successively retrieves variables that belong to variable set POINT[s,p] indicated by pointer variable p, and performs steps b11–b13 on retrieved variable v2. On completing steps b11–b13 for all variables that belong to indicated variable set POINT[s,p], the processing proceeds to step b15.

In stop b11, the E_GEN group generation unit 25 successively retrieves equivalent expression sets from the E_GEN processing expression set storage unit 28 and performs steps b12–b13 on retrieved equivalent expression set X. On completing steps b12–b13 for all equivalent expression sets in the E_GEN processing expression set storage unit 28, the processing proceeds to step b10 where the group generation unit 25 retrieves the next variable.

In step b11, the E_GEN group generation unit 25 successively retrieves expressions from equivalent expression set X retrieved in step b11 and performs step b13 on retrieved expression e. On completing step b13 for all expressions included in equivalent expression set X, the processing proceeds to step b11 where the E_GEN group generation unit 25 retrieves the next equivalent expression set.

In step b13, the E_GEN group generation unit 25 activates the variable utilizing expression judgement unit 26 and inputs intermediate instruction s retrieved in step b2, variable v2 retrieved in step b10, and expression e retrieved in step b12 into the variable utilizing expression judgement unit 26. When the judgement result is "Yes", the processing proceeds to step b14. Otherwise, the processing proceeds to step b12 and the E_GEN group generation unit 25 retrieves the next expression.

In step b14, expression e retrieved in step b12 is deleted from equivalent expression set X retrieved in step b11. Then, the processing proceeds to step b12 when the E_GEN group generation unit 25 retrieves the next expression.

In step b15, the E_GEN group generation unit 25 successively retrieves equivalent expression sets from the E_GEN processing expression set storage unit 28 and performs steps b16 and b17 on retrieved equivalent expression set Y. When step b16 is executed for all equivalent expression sets in the E_GEN processing expression set storage unit 28, which is to say, when there is no equivalent expression set that satisfies the condition given in step b16, the processing proceeds to step b18.

In step b16, when the equivalent expression set Y includes expression a or b judged in step b3, the processing proceeds to step b17. Otherwise, the processing proceeds to step b15 where the E_GEN group generation unit 25 retrieves the next equivalent expression set.

In step b17, expression b or a is added to equivalent expression set Y. Then, the processing proceeds to step b2 where the E_GEN group generation unit 25 retrieves the next intermediate instruction.

In step b18, the E_GEN group generation unit 25 generates equivalent expression set (a, b) that is composed of expressions a and b which are judged in step b3, and stores the generated equivalent expression set into the E_GEN processing expression set storage unit 28. The processing proceeds to step b2 where the E_GEN group generation unit 25 retrieves the next intermediate instruction.

In step b19, when intermediate instruction s retrieved in step b2 is a function f call instruction, the processing proceeds to step b20. Otherwise, the processing proceeds to step b2 where the E_GEN group generation unit 25 retrieves the next intermediate instruction.

In step b20, the E_GEN group generation unit 25 successively retrieves variables that belong to changed variable set CHANGE[s,f] composed of variables which may potentially be changed as a result of executing the function f call instruction judged in step b19, and performs steps b21–b23 on retrieved variable v3. On completing steps b21–b23 for all variables that belong to changed variable set CHANGE[s,f], the processing proceeds to step b2 where the E_GEN group generation unit 25 retrieves the next intermediate instruction.

In step b21, the E_GEN group generation unit 25 successively retrieves equivalent expression sets from the E_GEN processing expression set storage unit 28 and performs steps b22–b23 on retrieved equivalent expression set X. On completing steps b22–b23 for all equivalent expression sets in the E_GEN processing expression set storage unit 28, the processing proceeds to step b20 where the next variable is retrieved.

In step b22, the E_GEN group generation unit 25 successively retrieves expressions from equivalent expression set X retrieved in step b21 and performs step b23 on retrieved expression e. On completing step b23 for all expressions in equivalent expression set X, the processing proceeds to step b21 where the next equivalent expression set is retrieved.

In step b23, the E_GEN group generation unit 25 activates the variable utilizing expression judgement unit 26 and inputs intermediate instruction s retrieved in step b2, variable v3 retrieved in step b20, and expression e retrieved in step b22 into the variable utilizing expression judgement unit 26. When the judgement result is "Yes", the processing proceeds to step b24. Otherwise, the processing proceeds to step b22 where the next expression is retrieved.

In step b24, expression e retrieved in step b22 is deleted from equivalent expression set X retrieved in step b21. Then, the processing proceeds to step b22 where the next expression is retrieved.

In step b25, the content of the E_GEN processing expression set storage unit 28 is stored into the E_GEN group storage unit 30 as E_GEN[B], and the E_GEN group generation unit 25 ends its operation.

The following is a more detailed description of the processing of the E_PRE group generation unit 27 with reference to FIGS. 32–34. The E_PRE group generation unit 27 has basic block B as an argument at the time of activation. The E_PRE group generation unit 27 calculates E_PRE[B] of basic block B and stores the calculation result into the E_PRE group storage unit 31 as the return value. This processing is explained in detail below.

In step c1, all expressions stored in the universal expression storage unit 23 are stored into the E_PRE processing expression storage unit 29.

In step c2, the E_PRE group generation unit 27 successively retrieves intermediate instructions from the entry point of basic block B and performs steps c3–c17 on retrieved intermediate instruction s. On completing steps c3–c17 for all intermediate instructions in basic block B, the processing proceeds to step c18.

In step c3, when intermediate instruction s has the format "a=b", the processing proceeds to steps c4–c12. Otherwise, the processing proceeds to step c13. Note here that both a and b are expressions.

In step c4, when expression a is variable v1, the processing proceeds to step c5. Otherwise, the processing proceeds to step c8.

In step c5, the E_PRE group generation unit 27 successively retrieves expressions from the E_PRE processing expression storage unit 29 and performs step c6 on retrieved expression e. On completing step c6 for all expressions in the E_PRE processing expression storage unit 29, the processing proceeds to step c2 where the next intermediate instruction is retrieved.

In step c6, the E_PRE group generation unit 27 activates the variable utilizing expression judgement unit 26 and inputs intermediate instruction s retrieved in step c2, variable v1 judged in step c4, and expression e retrieved in step c5 into the variable utilizing expression judgement unit 26. When the judgement result is "Yes", the processing proceeds to step c7. Otherwise, the processing proceeds to step c5 where the next expression is retrieved.

In step c7, expression e retrieved in step c5 is deleted from the E_PRE processing expression storage unit 29. Then, the processing proceeds to step c5 where the next expression is retrieved.

In step c8, when expression a is an indirect calculation expression "*p", the processing proceeds to step c9. Otherwise, the processing proceeds to step c2.

In step c9, the E_PRE group generation unit 27 successively retrieves variables that belong to variable set POINT [s,p] indicated by pointer variable p and performs steps c10–c11 on retrieved variable v2. On completing steps c10–c11 for all variables that belong to indicated variable set POINT[s,p], the processing proceeds to step c2 where the next intermediate instruction is retrieved.

In step c10, the E_PRE group generation unit 27 successively retrieves expressions from the E_PRE processing expression storage unit 29 and performs step c11 on retrieved expression e. On completing step c11 for all expressions in the E_PRE processing expression storage unit 29, the processing proceeds to step c9 where the next variable is retrieved.

In step c11, the E_PRE group generation unit 27 activates the variable utilizing expression judgement unit 26 and inputs intermediate instruction s retrieved in step c2, variable v2 retrieved in step c9, and expression e retrieved in step c10 into the variable utilizing expression judgement unit 26. When the judgement result is "Yes", the processing proceeds to step c12. Otherwise, the processing proceeds to step c10 where the next expression is retrieved.

In step c12, expression e retrieved in step c10 is deleted from the E_PRE processing expression storage unit 29. Then, the processing proceeds to step c10 where the next expression is retrieved.

In step c13, when intermediate instruction s retrieved in step c2 is a function f call instruction, the processing proceeds to step c14. Otherwise, the processing proceeds to step c2 where the next intermediate instruction is retrieved.

In step c14, the E_PRE group generation unit 27 successively retrieves variables that belong to changed variable set CHANGE[s,f] composed of variables which may potentially be changed due to execution of the function f call instruction, and performs step c15–c16 on retrieved variable v3. On completing steps c15–c16 for all variables that belong to changed variable set CHANGE[s,f], the processing proceeds to step c2 where the next intermediate instruction is retrieved.

In step c15, the E_PRE group generation unit 27 successively retrieves expressions from the E_PRE processing expression storage unit 29 and performs step c16 on retrieved expression e. On completing step c16 for all expressions stored in the E_PRE processing expression storage unit 29, the processing proceeds to step c14 where the next variable is retrieved.

In step c16, the E_PRE group generation unit 27 activates the variable utilizing expression judgement unit 26 and inputs intermediate instruction s retrieved in step c2, variable v3 retrieved in step c14, and expression e retrieved in step c15 into the variable utilizing expression judgement unit 26. When the judgement result is "Yes", the processing proceeds to step c17. Otherwise, the processing proceeds to step c15 where the next expression is retrieved.

In step c17, expression e retrieved in step c15 is deleted from the E_PRE processing expression storage unit 29. Then, the processing proceeds to step c15 where the next expression is retrieved.

In step c18, the content of the E_PRE processing expression storage unit 29 is stored into the E_PRE group storage unit 31 as E_PRE[B], and the E_PRE group generation unit 27 ends its operation.

The following is a more detailed description of the processing of the equivalent expression set group generation unit 24 with reference to FIGS. 35 and 36.

In step d1, the equivalent expression set group generation unit 24 successively retrieves basic blocks from the program and performs steps d2 and d3 on retrieved basic block B. On completing steps d2 and d3 for all basic blocks, the processing proceeds to step d4.

In step d2, the equivalent expression set group generation unit 24 activates the E_GEN group generation unit 25 and inputs basic block B into the E_GEN group generation unit 25. The E_GEN equivalent expression set group of basic block B generated by the E_GEN group generation unit 25 is stored in the E_GEN group storage unit 30.

In step d3, the equivalent expression set group generation unit 24 activates the E_PRE group generation unit 27 and inputs basic block B into the E_PRE group generation unit 27. The E_PRE expression group of basic block B generated by the E_PRE group generation unit 27 is stored into the E_PRE group storage unit 31.

In step d4, the equivalent expression set group generation unit 24 sets the E_IN equivalent expression set group of initial block B1 stored in the E_IN group storage unit 32 as an empty group, and stores the E_GEN equivalent expression set group of initial block B1, which was calculated in step d2 and is stored in the E_GEN group storage unit 30, into the E_OUT group storage unit 33 as the E_OUT equivalent expression set group of initial block B1.

In step d5, the equivalent expression set group generation unit 24 successively retrieves basic blocks other than initial block B1 and performs step d6 on retrieved basic block B2. On completing step d6 for all basic blocks other than initial block B1, the processing proceeds to step d7.

In step d6, the equivalent expression set group generation unit 24 performs an equivalence union calculation on expressions stored in the universal expression storage unit 23 and the E_PRE group of basic block B2 that was calculated in step d3 and is stored in the E_PRE group storage unit 31. Next, the equivalent expression set group generation 24 performs an equivalence union calculation on the above calculation result and the E_GEN equivalent expression set group of basic block B2 that was calculated in step d2 and is stored in the E_GEN group storage unit 30. The obtained calculation result is then stored into the E_OUT group storage unit 33 as the E_OUT equivalent expression set group of basic block B2. The processing then proceeds to step d5 where the next basic block is retrieved.

In step d7, "False" is set in the state storage unit 34.

In step d8, the equivalent expression set group generation unit 24 successively retrieves basic blocks from the program and performs steps d9–d12 on retrieved basic block B3. On completing steps d9–d12 for all basic blocks, the processing proceeds to step d14.

In step d9, the equivalent expression set group generation unit 24 retrieves basic blocks B4 immediately preceding basic block B3 and retrieves the E_OUT equivalent expression set groups of basic blocks B4 from the E_OUT group storage unit 33. Next, the equivalent expression set group generation unit 24 performs an equivalence intersection calculation on the retrieved E_OUT equivalent expression set groups (E_OUT[B4]) and stores the calculation result into the E_IN group storage unit 32 as the E_IN equivalent expression set group of basic block B3.

In step d10, the equivalent expression set group generation unit 24 stores the E_OUT equivalent expression set group of basic block B3 in the E_OUT group storage unit 33 into the former E_OUT group storage unit 35.

In step d11, the equivalent expression set group generation unit 24 performs an equivalence intersection calculation on the E_IN equivalent expression set group of basic block B3 stored in the E_IN group storage unit 32 and the E_PRE expression group of basic block B3 which was calculated in step d3 and is stored in the E_PRE group storage unit 31. Next, the equivalent expression set group generation unit 24 performs an equivalence union calculation on the above calculation result and the E_GEN equivalent expression set group of basic block B3 which was calculated in step d2 and is stored in the E_GEN group storage unit 30. The obtained calculation result is then stored into the E_OUT group storage unit 33 as the E_OUT equivalent expression set group of basic block B3.

In step d12, the equivalent expression set group generation unit 24 compares the E_OUT equivalent expression set group of basic block B3 in the E_OUT group storage unit 33 with the content of the former E_OUT group storage unit 35. When they do not match, the processing proceeds to step d13. When, on the other hand, they match, the processing proceeds to step d8 where the next basic block is retrieved.

In step d13, "True" is set into the state storage unit 34. Then, the processing proceeds to step d8 where the next basic block is retrieved.

In step d14, it is judged whether "True" is set in the state storage unit 34. When "True" is set in the state storage unit 34, the processing proceeds to step d7. Otherwise, the processing proceeds to step d15.

In step d15, the contents of the E_IN group storage unit 32 and the E_OUT group storage unit 33 are stored into the equivalence information storage unit 19 shown in FIG. 9, and the equivalent expression set group generation unit 24 ends its operation.

The following is a more detailed description of the processing of the equivalence replacement optimization unit 16 with reference to FIGS. 37–42.

In step e1, the equivalence replacement optimization unit 16 successively retrieves basic blocks from the program and performs steps e2–e36 on retrieved basic block B. On completing steps e2–e36 for all basic blocks, the equivalence replacement optimization unit 16 ends its operation.

In step e2, the equivalence replacement optimization unit 16 retrieves the E_IN equivalent expression set group of basic block B from the equivalence information storage unit 19 and stores it into the processing expression set storage unit 101.

In step e3, the equivalence replacement optimization unit 16 successively retrieves intermediate instructions from the entry point of basic block B and performs steps e4–e36 on retrieved intermediate instruction s. On completing steps e4–e36 for all intermediate instructions in basic block B, the processing proceeds to step e1 where the next basic block is retrieved.

In step e4, when intermediate instruction s has the format "a=b", steps e5–e25 are executed. Otherwise, the processing proceeds to step e26. Note here that both a and b is expressions.

In step e5, when the processing expression set storage unit 101 stores an equivalent expression set that includes both expressions a and b, the processing proceeds to step e6. Otherwise, the processing proceeds to step e7.

In step e6, intermediate instruction s retrieved in step e3 is deleted from the program, and the processing proceeds to step e11.

In step e7, when expression b is a binary calculation expression "b1 op b2", the processing proceeds to step e8. Otherwise, the processing proceeds to step e9.

In step e8, when, in the expression "b1 op b2", bi is constant c1 or alternatively an equivalent expression set that includes both b1 and constant c1 is stored in the processing expression set storage unit 101, and when b2 is constant c2 in the same way as b1 or alternatively an equivalent expression set that includes both b2 and constant c2 is stored in the processing expression set storage unit 101, expression b is replaced with the calculation result of "c1 op c2". In the same way, expression b in intermediate instruction s in the program is replaced with the calculation result of "c1 op c2". Then, the processing proceeds to step e11.

In step e9, when expression b is a monadic calculation expression "op b1", the processing proceeds to step e10. Otherwise, the processing proceeds to step e11.

In step e10, when, in the expression "op b1", b1 is constant c1, or when an equivalent expression set that includes both b1 and constant c1 is stored in the processing expression set storage unit 101, expression b is replaced with the calculation result of "op c1". In the same way, expression b in intermediate instruction s in the program is replaced with the calculation result of "op c1".

In step e11, when expression a is variable v1, the processing proceeds to step e12. Otherwise, the processing proceeds to step e16.

In step e12, the equivalence replacement optimization unit 16 successively retrieves equivalent expression sets from the processing expression set storage unit 101 and performs steps e13–e14 on retrieved equivalent expression set X. On completing steps e13–e14 for all equivalent expression sets in the processing expression set storage unit 101, the processing proceeds to step e22.

In step e13, the equivalence replacement optimization unit 16 successively retrieves expressions from equivalent expression set X retrieved in step e12 and performs step e14 on retrieved expression e. On completing step e14 for all expressions in equivalent expression set X, the processing proceeds to step e12 where the next equivalent expression set is retrieved.

In step e14, the equivalence replacement optimization unit 16 activates the variable utilizing expression judgement unit 26 and inputs intermediate instruction s retrieved in step e3, variable v1 judged in step e11, and expression e retrieved in step e13 into the variable utilizing expression judgement unit 26. When the judgement result is "Yes", the processing proceeds to step e15. Otherwise, the processing proceeds to step e13 where the next expression is retrieved.

In step e15, expression e retrieved in step e13 is deleted from equivalent expression set X retrieved in step e12. Then, the processing proceeds to step e13 where the next expression is retrieved.

In step e16, when the expression a is an indirect calculation expression "*p", the processing proceeds to step e17. Otherwise, the processing proceeds to step e22.

In step e17, the equivalence replacement optimization unit 16 successively retrieves variables that belong to variable set POINT[s,p] indicated by pointer variable p, and performs steps e18–e20 on retrieved variable v2. On completing steps e18–e20 for all variables that belong to indicated variable set POINT[s,p], the processing proceeds to step e22.

In step e18, the equivalence replacement optimization unit 16 successively retrieves equivalent expression sets from the processing expression set storage unit 101 and performs steps e19–e20 on retrieved equivalent expression set X. On completing steps e19–e20 for all equivalent expression sets in the processing expression set storage unit 101, the processing proceeds to step e17 where the next variable is retrieved.

In step e19, the equivalence replacement optimization unit 16 successively retrieves expressions from equivalent expression set X retrieved in step e18 and performs step e20 on retrieved expression e. On completing step e20 for all expressions in equivalent expression set X, the processing proceeds to step e18 where the next equivalent expression set is retrieved.

In step e20, the equivalence replacement optimization unit 16 activates the variable utilizing expression judgement unit 26 and inputs intermediate instruction s retrieved in step e3, variable v2 retrieved in step e17, and expression e retrieved in step e19 into the variable utilizing expression judgement unit 26. When the judgement result is "Yes", the processing proceeds to step e21. Otherwise, the processing proceeds to step e19 where the next expression is retrieved.

In step e21, expression e retrieved in step e19 is deleted from equivalent expression set X retrieved in step e18. Then, the processing proceeds to step e19 where the next expression is retrieved.

In step e22, the equivalence replacement optimization unit 16 successively retrieves equivalent expression sets from the processing expression set storage unit 101 and performs step e23 on retrieved equivalent expression set Y. When this process is executed for all equivalent expression sets in the processing expression set storage unit 101, that is to say, when there is no equivalent expression set that satisfies the condition given in step e23, the processing proceeds to step e25.

In step e23, when equivalent expression set Y retrieved in step e22 includes expression a or b, the processing proceeds to step e24. Otherwise, the processing proceeds to step e22 where the next equivalent expression set is retrieved.

In step e24, expression b or a is added to equivalent expression set Y. Then, the processing proceeds to step e3 where the next intermediate instruction is retrieved.

In step e25, the equivalence replacement optimization unit 16 generates equivalent expression set (a,b) composed of expressions a and b which were judged in step e4, and stores the generated equivalent expression set into the processing expression set storage unit 101. The processing then proceeds to step e3 where the next intermediate instruction is retrieved.

In step e26, when intermediate instruction s retrieved in step e3 is a function f call instruction, the processing proceeds to steps e27–e31. Otherwise, the processing proceeds to step e32.

In step e27, the equivalence replacement optimization unit 16 successively retrieves variables that belong to changed variable set CHANGE[s,f] composed of variables that may potentially be changed due to execution of the function f call instruction, and performs steps e28–e30 on retrieved variable v3. On completing steps e28–e30 for all variables that belong to changed variable set CHANGE[s,f], the processing proceeds to step e3 where the next intermediate instruction is retrieved.

In step e28, the equivalence replacement optimization unit 16 successively retrieves equivalent expression sets from the processing expression set storage unit 101 and performs steps e29–e30 on retrieved equivalent expression set X. On completing steps e29–e30 for all equivalent expression sets in the processing expression set storage unit 101, the processing proceeds to step e27 where the next variable is retrieved.

In step e29, the equivalence replacement optimization unit 16 successively retrieves expressions from equivalent expression set X retrieved in step e28 and performs step e30 on retrieved expression e. On completing step e30 for all expressions in equivalent expression set X, the processing proceeds to step e28 where the next equivalent expression set is retrieved.

In step e30, the equivalence replacement optimization unit 16 activates the variable utilizing expression judgement unit 26 and inputs intermediate instruction s retrieved in step e3, variable v3 retrieved in step e27, and expression e retrieved in step e29 into the variable utilizing expression judgement unit 26. When the judgement result is "Yes", the processing proceeds to step e31. Otherwise, the processing proceeds to step e29 where the next expression is retrieved.

In step e31, expression e retrieved in step e29 is deleted from equivalent expression set X retrieved in step e28. The processing then proceeds to step e29 where the next expression is retrieved.

In step e32, when intermediate instruction retrieved in step e3 is a conditional branch instruction "if a cmp b goto label" (cmp=conditional operator, label=branch destination label), steps e33–e36 are executed. Otherwise, the processing proceeds to step e3 where the next intermediate instruction is retrieved.

In step e33, when there are a1 and b1 in the processing expression set storage unit 101 that are respectively equivalent to expressions a and b and that validate "a=b", the processing proceeds to step e34. Otherwise, the processing proceeds to step e35. Here, a1 is either identical with expression a or is included in an equivalent expression set which also includes expression a in the processing expression set storage unit 101. Similarly, b1 is either identical with expression b or is included in an equivalent expression set which also includes expression b in the processing expression set storage unit 101.

In step e34, the conditional expression "a cmp b" in intermediate instruction s is replaced with "(1)". The processing then proceeds to step e3 where the next intermediate instruction is retrieved.

In step e35, when there are a2 and b2 that are respectively equivalent to expressions a and b and that validate "a≠b", step e36 is executed. Otherwise, the processing proceeds to step e3 where the next intermediate instruction is retrieved. Here, a2 is either identical with expression a or is included in an equivalent expression set which also includes expression a in the processing expression set storage unit 101. Similarly, b2 is either identical with expression b or is included in an equivalent expression set which also includes expression b in the processing expression set storage unit 101.

In step e36, the conditional expression "a cmp b" in intermediate instruction s is replaced with "(0)". The processing proceeds to step e3 where the next intermediate instruction is retrieved.

2.5 Operation of Optimization Apparatus 1

The following is a specific explanation of the processing of the equivalence information analysis unit 14 and the equivalence replacement optimization unit 16 in the optimization apparatus 1 of the present embodiment with the above construction, with reference to the flowcharts described above.

The example program shown in FIG. 11 is used in the following explanation. In FIG. 11, "s1:", "s2:", . . . "s40" written in basic blocks BLK1–BLK5 show intermediate instructions. The other descriptions in the figure are written in C.

Before the equivalence information analysis unit 14 shown in FIG. 9 is activated, data to be used in the equivalence information analysis unit 14 is calculated by the data flow information analysis unit 13. This data is shown in FIG. 12. FIG. 12A shows a POINT set indicated by pointer variable p5 shown in FIG. 11. Here, it is shown that variable a7 is indicated in intermediate instruction s22. FIG. 12B shows a CHANGE set relating to the function f call instruction (intermediate instruction s20) in FIG. 11. Here, it is shown that variables b6 and z6 are listed as variables that may potentially be changed by execution of the function f call instruction. These are calculated using the method described in reference (1) (pp. 648–660).

The processing of the equivalence information analysis unit 14 is explained below with reference to FIGS. 10–41.

First, the equivalence information generation control unit 21 activates the universal expression detection unit 22 in the equivalence information analysis unit shown in FIG. 10. As a result, all expressions, other than conditional expressions, written in the program are detected and stored into the universal expression storage unit 23. The storage content of the universal expression storage unit 23 is shown in FIG. 13A.

Next, the equivalence information generation control unit 21 activates the equivalent expression set group generation unit 24. As a result, the E_IN and E_OUT equivalent expression set groups of each basic block are calculated and stored into the equivalence information storage unit 19.

<Processing of Equivalent Expression Set Group Generation Unit 24>

The following is a specific explanation of the processing of the equivalent expression set group generation unit 24 with reference to FIGS. 35 and 36. First, the E_GEN equivalent expression set group and E_PRE expression group of each basic block are generated in steps d1–d3. The processing of the E_GEN group generation unit 25 and the E_PRE group generation unit 27 is explained below.

<Processing of E_GEN Group Generation Unit 25>

First, the processing of the E_GEN group generation unit 25 is explained using basic block B3 shown in FIG. 11 as an example, with reference to FIGS. 26–31.

In step b1 shown in FIG. 27, the content of the E_GEN processing expression set storage unit 28 is emptied as shown in line "-" in FIG. 14A.

In step b2, intermediate instruction s9 is retrieved. Since intermediate instruction s9 has the format "a=b", the processing proceeds from step b3 to step b4 in FIG. 28. Since variable b6 corresponds to expression a, the processing proceeds to step b5 in FIG. 29. Since the E_GEN processing expression set storage unit 28 is empty, the processing proceeds to step b15 and then to step b18 in FIG. 28. In step b18, equivalent expression set (b6,a5+10) is generated using expressions b6 and a5+10 in intermediate instruction s9 which correspond to expressions a and b, and stored into the E_GEN processing expression set storage unit 28. As a result, the storage content of the E_GEN processing expression set storage unit 28 changes as shown in line s9 in FIG. 14A.

Next, the processing returns to step b2 in FIG. 27 where intermediate instruction s10 is retrieved. In step b3, since intermediate instruction s10 has the format "a=b", the processing proceeds to step b4 in FIG. 28. Since variable z6 corresponds to expression a, the processing proceeds to step b5 in FIG. 29. In step b5, equivalent expression set (b6,a5+10) is retrieved from the E_GEN processing expression set storage unit 28. In step b6, expression b6 is retrieved from equivalent expression set (b6,a5+10). In step b7, the variable utilizing expression judgement unit 26 is activated and intermediate instruction s10, variable z6, and expression b6 are inputted. Since expression b6 does not satisfy any of the conditions given in steps a1–a5 in FIG. 26, the return value "No" is returned in step a6 to the E_GEN group generation unit 25 in step b7 in FIG. 29. The processing accordingly proceeds to step b6 where expression a5+10 is retrieved. In step b7, the variable utilizing expression judgement unit 26 is activated and intermediate instruction s10, variable z6, and expression a5+10 are inputted. Since expression a5+10 does not satisfy any of the conditions given in steps a1–a5, the return value "No" is returned to the E_GEN group generation unit 25. The processing accordingly proceeds to step b6 and then step b5 in FIG. 29, since there is no more expression to be retrieved. Since there is no more equivalent expression set to be retrieved from the E_GEN processing expression set storage unit 28, the processing proceeds to step b15 in FIG. 28. In step b15, equivalent expression set (b6,a5+10) is retrieved from the E_GEN processing expression set storage unit 28. Since neither expression z6 nor expression p6 is included in equivalent expression set (b6, a5+10), the processing proceeds from step b16 to step b15. Since there is no more equivalent expression set to be retrieved, the processing proceeds to step b18 where equivalent expression set (z6,p6) is generated and stored into the E_GEN processing expression set storage unit 28. As a result, the storage content of the E_GEN processing expression set storage unit 28 changes as shown in line s10 in FIG. 14A.

After processing intermediate instructions s11–s24 in the same way, the storage content of the E_GEN processing expression set storage unit 28 becomes as shown in line s24 in FIG. 14A. Here, when processing intermediate instruction s18, variable b2 is updated and accordingly, in step b8 in FIG. 29, expression p7+b2 is deleted from equivalent expression set (a7,p7+b2) in line s17 in FIG. 14A. Also, since expression t21 is included in equivalent expression set (t21,a) in line s17 in FIG. 14A, expression b2 is added to equivalent expression set (t21, a) in step b17 in FIG. 28. When processing intermediate instruction s20 which is the function (f) call instruction, the processing proceeds from step b19 to steps b20–b24. Since variables b6 and z6 that belong to the CHANGE set shown in FIG. 12B may potentially be changed due to execution of the function call instruction, in step b24 in FIG. 31, expressions z6 and p6 are deleted respectively from equivalent expression sets (z6,p6) and (b6, a5+10) in line s19 in FIG. 14A. When processing intermediate instruction s22 which is an indirect calculation expression, the processing proceeds from step b9 to steps b10–b14 in FIG. 30. Since variable z7 that belongs to the indicated variable set shown in FIG. 12A may potentially be changed, in step b14 variable a7 is deleted from equivalent expression sets (a7) and (z7,a7) in line s21 in FIG. 14A.

After processing intermediate instruction s24 of basic block B3, the processing proceeds to step b25 in FIG. 27. In step b25, the content of line s24 in FIG. 14A is stored into the E_GEN group storage unit 30 as shown in line BLK3 in FIG. 13B.

The E_GEN group generation unit 25 performs the same operation on basic blocks BLK1, BLK2, BLK4, BLK5, and BLK6, and as a result the E_GEN equivalent expression set groups are stored in the E_GEN group storage unit 30 as shown in FIG. 13B.

<Processing of E_PRE Group Generation Unit 27>

The processing of the E_PRE group generation unit 27 is explained below using basic block BLK3 in FIG. 11 as an example, with reference to FIGS. 32–34.

In step c1 in FIG. 32, the content of the universal expression storage unit 23 shown in FIG. 13A is stored into the E_PRE processing expression storage unit 29 as shown in line "-" in FIG. 14B.

In step c2, intermediate instruction s9 is retrieved. In step c3, since intermediate instruction s9 has the format "a=b", the processing proceeds to step c4 in FIG. 33. Since variable b6 corresponds to expression a, the processing proceeds to step c5 where expression x5 is retrieved from the E_PRE processing expression storage unit 29 shown in FIG. 14B. In step c6, the variable utilizing expression judgement unit 26 is activated and intermediate instruction s9, variable b6, and expression x5 are inputted. Since expression x5 does not satisfy any of the conditions given in steps a1–a5 in FIG. 26, the return value "No" is returned in step a6. In the same way, steps c5–c7 are executed for the other expressions written in line "-" in FIG. 14B. Here, in the case of expression b6, the return value "Yes" is returned to the E_PRE group generation unit 27 in step c6, and accordingly expression b6 is deleted from the E_PRE processing expression storage unit 29 in step c7.

After processing intermediate instructions s10–s24 in the same way, the storage content of the E_PRE processing expression storage unit 29 becomes as shown in line s24 in FIG. 14B. Here, when processing intermediate instruction s18, expressions b7+b2 and b2 are deleted from the E_PRE processing expression storage unit 29 in step c7. When processing intermediate instruction s20, variables b6 and z6 that belong to the CHANGE set shown in FIG. 12B are successively retrieved in step c14 in FIG. 34 and are processed in the same way. As a result, expressions that use any of variables b6 and z6 are deleted from the E_PRE processing expression storage unit 29 (note here that in the present example, expressions that use any of variables b6 and z6 have already been deleted when processing intermediate instructions s9 and s10, so that the content of the E_PRE processing expression storage unit 29 does not change when processing intermediate instruction s20). When processing intermediate instruction s22, variable a7 that belongs to the indicated variable set shown in FIG. 12A is retrieved in step c9 in FIG. 33. Accordingly, expressions that use variable a7 are deleted from the E_PRE processing expression storage unit 29 (note that in the present example, expressions that use variable a7 have already been deleted when processing intermediate instruction s11, so that the content of the E_PRE processing expression storage unit 29 does not change when processing intermediate instruction s22).

After processing intermediate instruction s24 of basic block BLK3, the processing proceeds to step c18 in FIG. 32, where the content of line s24 in FIG. 14B is stored into the E_PRE group storage unit 31. As a result, the E_PRE expression group of basic block BLK3 is stored in the E_PRE group storage unit 31 as shown in line BLK3 in FIG. 13C.

The E_PRE group generation unit 27 performs the same operation on basic blocks BLK1, BLK2, BLK4, BLK5, and BLK6, and as a result the E_PRE expression group of each basic block is stored as shown in FIG. 13C.

<Processing of Equivalent Expression Set Group Generation Unit 24>

Now, the explanation returns to the processing of the equivalent expression set group generation unit 24.

In step d4 in FIG. 35, the E_IN equivalent expression set group of initial block BLK1 is set as an empty group. In steps d5 and d6, the initial E_OUT equivalent expression set group of each basic block, aside from initial block BLK1, is calculated. For example, in the case of basic block BLK3, the E_GEN equivalent expression set group of basic block BLK3 (E_GEN[BLK3]) shown in FIG. 13B and the E_PRE expression group of basic block BLK3 (E_PRE [BLK3]) shown in FIG. 13C are retrieved, and an equivalence union calculation is performed on E_GEN[BLK3] and E_PRE[BLK3]. As a result, E_OUT[BLK3] is obtained as shown in FIG. 15B. FIG. 15B shows the E_OUT equivalent expression set groups obtained as a result of processing the other basic blocks in the same way as basic block BLK3.

The processing proceeds to step d7 in FIG. 36 where "False" is set in the state storage unit 34. In step d8, basic block BLK1 is retrieved. Since basic block BLK1 does not have preceding blocks, E_IN[BLK1] becomes an empty group in step d9, the group then being stored in the E_IN group storage unit 32 as shown in line BLK1 in FIG. 16A. In step d10, E_OUT[BLK1] shown in FIG. 15B is stored into the former E_OUT group storage unit 35 as shown in FIG. 14C(1). In step d11, since E_IN[BLK1] is an empty group as shown in FIG. 15A, E_GEN[BLK1] shown in FIG. 13B becomes the new E_OUT[BLK1] and is stored into the E_OUT group storage unit 33 as shown in FIG. 16C. In step d12, E_OUT[BLK1] in FIG. 16C is compared with the content of the former E_OUT group storage unit 35 shown in FIG. 14C(1). Since they are the same, the processing proceeds to step d8.

In step d8, basic block BLK2 is retrieved. In step d9, an equivalence intersection calculation is performed on the E_OUT groups of basic blocks BLK1 and BLK5 which are preceding blocks for basic block BLK2. Here, an equivalence intersection calculation is performed on newly obtained E_OUT[BLK1] shown in FIG. 16C and E_OUT[BLK5] shown in FIG. 15B, and the calculation result is stored into the E_IN group storage unit 32 as E_IN[BLK2], as shown in FIG. 16A.

In step d10, initial E_OUT[BLK2] shown in FIG. 15B is stored into the former E_OUT group storage unit 35 as shown in FIG. 14C(2).

In step d11, E_IN[BLK2] shown in FIG. 16A and E_PRE[BLK2] shown in FIG. 13C are retrieved, and an equivalence intersection calculation is performed on E_IN[BLK2] and E_PRE[BLK2]. The calculation result is shown in line BLK2 in FIG. 16B.

Next, an equivalence union calculation is performed on E_GEN[BLK2] shown in FIG. 13B and the above calculation result, and the obtained calculation result is stored into the E_OUT group storage unit 33 as E_OUT[BLK2], as shown in FIG. 16C.

In step d12, newly obtained E_OUT[BLK2] is compared with the content of the former E_OUT group storage unit 35 shown in FIG. 14C(2). Since they are different, "True" is set in the state storage unit 34 in step d13.

The same processing is executed for basic blocks BLK3–BLK6, and the processing results are shown in FIG. 16A–16C.

Next, in step d14, since "True" is set in the state storage unit 34, the processing returns to step d7 where "False" is set in the state storage unit 34, and the E_IN and E_OUT equivalent expression set groups of each basic block are recalculated. In the case of the example program shown in FIG. 11, in the second loop processing, E_OUT[BLK1] does not change, and the result of an equivalence intersection calculation of E_OUT[BLK1] and E_OUT[BLK5] is the same as E_IN[BLK2]. Accordingly, E_OUT[BLK2] does not change. As a result, the E_OUT equivalent expression set group of each of basic blocks BLK3–BLK6 does not change either, so that the state storage unit 34 remains "False". After the second loop processing, the processing proceeds from step d14 to step d15, where the contents shown in FIGS. 16A and 17C are stored into the equivalence information storage unit 19 as shown in FIG. 17. The equivalent expression set group generation unit 24 thus ends its operation.

The following is a specific explanation of the processing of the equivalence replacement optimization unit 16 using basic blocks BLK2, BLK4, and BLK5 as examples, with reference to FIGS. 17–42.

<Processing of Basic Block BLK2>

First, the processing of basic block BLK2 is explained.

In step e2 in FIG. 37, the E_IN equivalent expression set group of basic block BLK2 (E_IN[BLK2]) shown in FIG. 17A is stored into the processing expression set storage unit 101 as shown in line "-" in FIG. 18A. In step e3, intermediate instruction s5 is retrieved, and then steps e4, e5, e7, e9, and e11 are executed. Next, in steps e12–e15 in FIG. 39, though there is a possibility that expressions stored in the processing expression set storage unit 101 are affected when the value of variable x4 which is the left side member of intermediate instruction s5 is updated, in this case no expressions shown in line "-" in FIG. 18A are affected by variable x4. The processing proceeds to steps e22–e24. Since equivalent expression set (p41,10) that includes variable p41 used in intermediate instruction s5 is stored in the processing expression set storage unit 101, variable x4 is added to equivalent expression set (p41,10) in step e24. As a result of processing intermediate instruction s5 as such, the content of the processing expression set storage unit 101 changes as shown in line s5 in FIG. 18A.

Next, intermediate instruction s6 is retrieved in step e3 in FIG. 37 and processed in the same way as intermediate instruction s5. In the case of intermediate instruction s6, in step e23 in FIG. 38, since any of the equivalent expression sets stored in the processing expression set storage unit 101 includes neither t32 nor x3, equivalent expression set (t32, x3) is stored into the processing expression set storage unit 101 in step e25. As a result, the content of the processing expression set storage unit 101 changes as shown in line s6 in FIG. 18A. Next, intermediate instruction s7 is retrieved in step e3 and processed in the same way as intermediate instruction s5. As a result, the content of the processing expression set storage unit 101 further changes as shown in line s7 in FIG. 18A.

Next, intermediate instruction s8 is retrieved in step e3 and processed in the same way as intermediate instruction s5. Here, the processing proceeds from step e32 to e33 in FIG. 42. Since equivalent expression set (x5,b5) which includes both expressions b5 and x5 used in intermediate instruction s8 exists in the processing expression set storage unit 101 as shown in line s7 in FIG. 18A and thus an equivalence relation between x5 and b5 is established, conditional expression "b5==x5" is definitely satisfied. Accordingly, the conditional expression in intermediate instruction s8 is replaced with "(1)" in step e34. The replacement result is shown in intermediate instruction s8 in FIG. 19.

Basic blocks BLK4 and BLK5 are processed basically in the same way as basic block BLK2. In the following, only characteristic processes in the processing of basic blocks BLK4 and BLK5 are explained.

<Processing of Basic Block BLK4>

Intermediate instructions s25–s27 in basic block BLK4 are processed in the same way as intermediate instructions s5 and s6 in basic block BLK2. The resulting content of the processing expression set storage unit 101 is shown in line s27 in FIG. 18B. Next, intermediate instruction s28 "t42=x4+y4" is retrieved in step e3. In step e7, since x4+y4 satisfies the given condition, the processing proceeds to step e8. Since variables x4 and y4 are respectively included in equivalent expression sets (x4,p41,10) and (y4,p42,20) in line s27 in FIG. 18B, variables x4 and y4 are respectively equivalent to constants 10 and 20. Accordingly, expression x4+y4 is equivalent to constant 30. As a result, in step e8, intermediate instruction s28 in FIG. 11 is rewritten as shown in intermediate instruction s28 in FIG. 19.

<Processing of Basic Block BLK5>

The storage content of the processing expression set storage unit 101 before processing intermediate instruction s33 in basic block BLK5 is shown in line "-" in FIG. 18C. Since equivalent expression set (b1,a1) that includes both variables a1 and b1 used in intermediate instruction s33 exists in the processing expression set storage unit 101 as shown in FIG. 18C, intermediate instruction s33 is deleted in step e6 from the program as a redundant instruction. Intermediate instructions s34–s38 are also deleted as redundant instructions. As a result, basic block BLK5 in FIG. 11 is rewritten to basic block BLK5 in FIG. 19. While the processes shown in the flowcharts in FIGS. 40 and 41 are not used in the above explanation, these processes are executed when processing an indirect reference calculation instruction, such as intermediate instruction s22 in basic block BLK3, and a function call instruction, such as intermediate instruction s20 in basic block BLK3. Such processes are executed in the same way as the processes shown in FIGS. 30 and 31, which have already been described in the processing of the E_GEN group generation unit 25.

Figure 19:
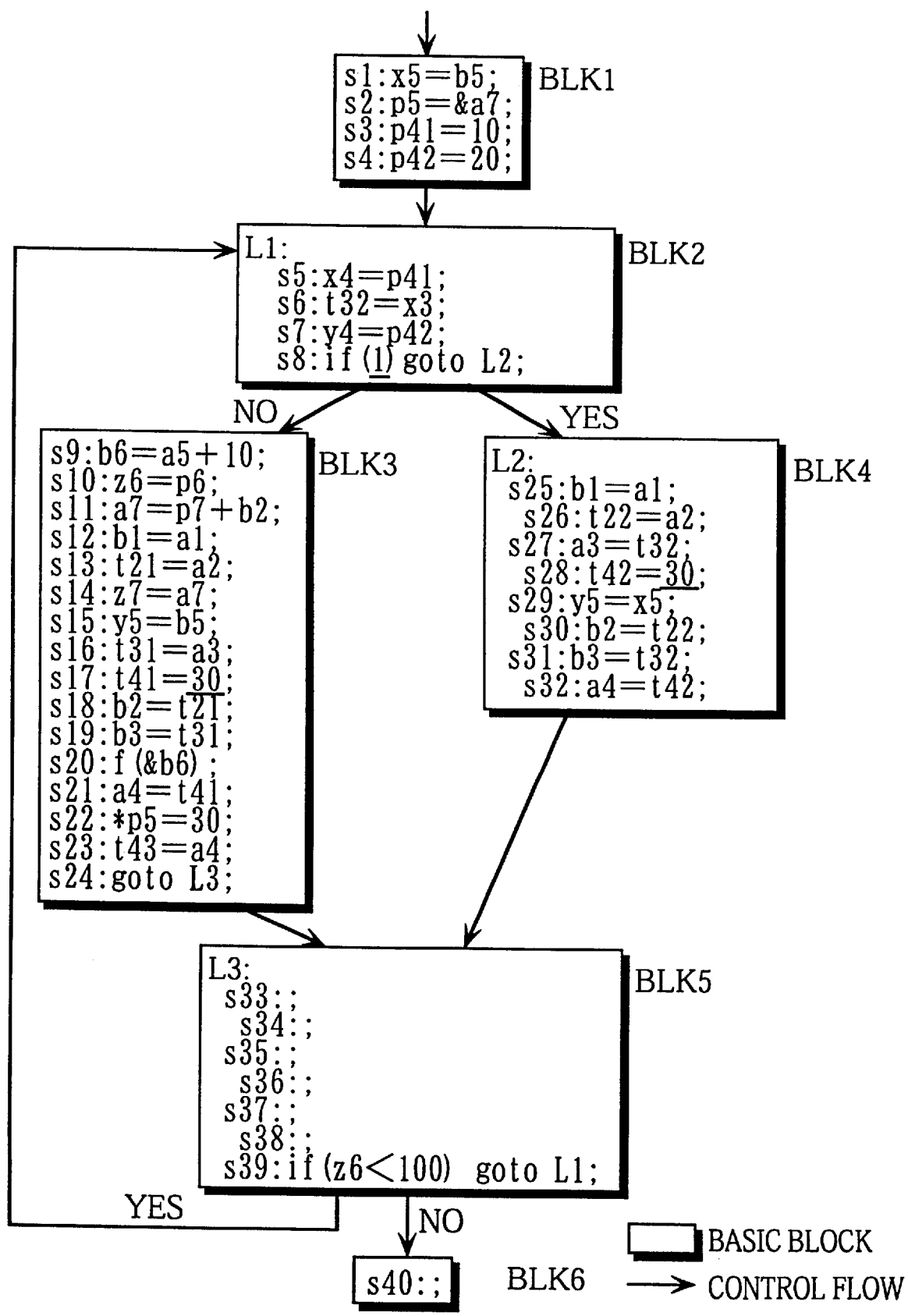
FIG. 19 shows the program obtained after the equivalence replacement optimization unit 16 optimizes the program shown in FIG. 11.

As a result of processing of the other basic blocks by the equivalence replacement optimization unit 16, the program shown in FIG. 11 is optimized as shown in FIG. 19.

With the present invention, it is possible to obtain equivalent expression set groups over a plurality of basic blocks in processing of each intermediate instruction. Accordingly, the program can be optimized by eliminating redundancy using the obtained equivalent expression set groups.

In the optimized program shown in FIG. 19, basic block BLK3 is not executed since the conditional expression in intermediate instruction s8 is definitely satisfied. Accordingly, after the processing of the equivalence replacement optimization unit 16, the intermediate code optimization unit 15 may be activated again to optimize the former control flow, so that basic block BLK3 can be deleted from the program.

Also, the processing of the equivalence replacement optimization unit 16 may be repeatedly executed to further optimize the program.

Also, the equivalence replacement optimization unit 16 may be incorporated in the intermediate code optimization unit 15, so that the processing of the intermediate code optimization unit 15 and the equivalence replacement optimization unit 16 can be repeatedly executed to further optimize the program.

Also, when both expressions a and b are included in equivalent expression set Y in step b16 in FIG. 28 during the processing of the E_GEN group generation unit 25, intermediate instruction s retrieved in step b2 in FIG. 27 may be deleted.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optimization apparatus equipped in a compiler that converts a program into a plurality of machine language instructions, the program being composed of a plurality of basic blocks which are each made up of instructions, each instruction having two expressions respectively on a left side and a right side, the expressions being selected from the group consisting of three types of expressions that are (a) a variable, (b) a constant, and (c) a combination of at least one operator and at least two operands that are variables and/or constants, the compiler being equipped with a code generation apparatus for assigning variables included in expressions to registers or memories and generating the machine language instructions, the optimization apparatus comprising:
analysis means for analyzing, for each basic block, equivalence relations among a plurality of expressions at an entry point of an analyzed basic block, and generating an E_IN equivalent expression set group that is composed of at least one set of equivalent expressions which have an equivalence relation at the entry point of the analyzed basic block, the equivalence relation meaning that one of the expressions can be replaced with a different one of the expressions without changing what the program computes; and optimization means for optimizing all instructions in each basic block, using the E_IN equivalent expression set group for each basic block, wherein the optimization by the optimization means includes an operation of replacing an operator-operand combination expression in an instruction with an equivalent expression that is a variable or constant.

2. The optimization apparatus of claim 1, wherein the analysis means includes:
first analysis means for analyzing, for each basic block, equivalence relations among a plurality of expressions at an exit point of an analyzed basic block, the equivalence relations being maintained until an entry point of a basic block that is a branch destination for the analyzed basic block;

second analysis means for analyzing, for each basic block, which equivalence relations at an entry point of an analyzed basic block disappear due to processing of each instruction in the analyzed basic block, and for analyzing equivalence relations that are newly produced by the processing of each instruction in the analyzed basic block;

qualification judgement means for judging, for each basic block, whether an E_OUT equivalent expression set group, that is composed of at least one set of equivalent expressions which are found to have an equivalence relation at an exit point of a basic block as a result of analysis by the second analysis means, qualifies for being used to optimize the basic block; and repeat means for having the first analysis means and the second analysis means repeat respective analyses, when the qualification judgement means judges that an E_OUT equivalent expression set group of any of the plurality of basic blocks does not qualify, and the optimization means includes
block internal optimization means for optimizing, when the qualification judgement means judges that an E_OUT equivalent expression set group of each basic block qualifies, all instructions in each basic block rising an E_IN equivalent expression set group composed of at least one set of equivalent expressions which are found to have an equivalence relation at an entry point of each basic block, that is most recently obtained by the first analysis means and the second analysis means.

3. The optimization apparatus of claim 2, further comprising:

E_GEN equivalent expression set group generation means for generating, for each basic block, an E_GEN equivalent expression set group composed of at least one set of equivalent expressions whose equivalence relation is newly produced by processing of each instruction in a basic block;

E_PRE expression group generation means for generating, for each basic block, an E_PRE expression group composed of expressions, among all expressions appearing in the program, that are unchanged by the processing of each instruction in the basic block; and initialization means for performing an equivalence union calculation on an E_GEN equivalent expression set group and an E_PRE expression group of each basic block other than an initial block, setting the calculation result as an initial E_OUT equivalent expression set group of each basic block other than the initial block, and setting an E_GEN equivalent expression set group of the initial block as an initial E_OUT equivalent expression set group of the initial block, wherein the first analysis means analyzes, for each basic block, which equivalent expression sets, among equivalent expression sets in initial E_OUT equivalent expression set groups, maintain equivalence relations at an entry point of a basic block, wherein the second analysis means analyzes, for each basic block, which equivalence relations maintained at the entry point of the basic block disappear due to processing of each instruction in the basic block, and analyzes which equivalence relations are newly produced by the processing of each instruction in the basic block, wherein the first analysis means includes
first calculation means for regenerating, for each basic block, after an E_OUT equivalent expression set group of each basic block is generated, an E_IN equivalent expression set group of a basic block by performing an equivalence intersection calculation on E_OUT equivalent expression set groups of basic blocks which have the basic block as a common branch destination, and wherein the second analysis means includes
second calculation means for regenerating, for each basic block, an E_OUT equivalent expression set group of the basic block by calculating "Formula 1" using the E_IN equivalent expression set group regenerated by the first calculation means, an E_GEN equivalent expression set group generated by the E_GEN equivalent expression set group generation means for the basic block, and an E_PRE expression group generated by the E_PRE expression group generation means for the basic block, wherein "Formula 1" is $$E\_OUT[B]=E\_GEN[B]4e(E\_IN[B]3eE\_PRE[B]),$$

B representing a basic block in the program,
3e representing an equivalence intersection operator, and
4e representing an equivalence union operator.

4. The optimization apparatus of claim 3,
wherein the qualification judgement means judges whether the E_OUT equivalent expression set group regenerated by the second calculation means qualifies for being used to optimize the basic block, and wherein, when the qualification judgement means judges that an E_OUT equivalent expression set group of any of the plurality of basic blocks does not qualify, the first calculation means newly generates, for each basic block, an E_IN equivalent expression set group of a basic block by performing an equivalence intersection calculation on E_OUT equivalent expression set groups of basic blocks which have the basic block as a common branch destination, and the second calculation means newly generates, for each basic block, an E_OUT equivalent expression set group of the basic block by calculating "Formula 1" using the E_IN equivalent expression set group newly generated by the first calculation means, the E_GEN equivalent expression set group generated by the E_GEN equivalent expression set group generation means for the basic block, and the E_PRE expression group generated by the E_PRE expression group generation means for the basic block.

5. The optimization apparatus of claim 4,
wherein the qualification judgement means includes:
a transient group storage unit for storing an E_OUT equivalent expression set group generated by the second calculation means as a transient group;
a comparison unit for comparing, when a new E_OUT equivalent expression set group is generated by the second calculation means, the new E_OUT equivalent expression set group with the transient group; and
a judgement unit for judging that the transient group qualifies if the new E_OUT equivalent expression set group and the transient group match, and judging that the transient group does not qualify if the new E_OUT equivalent expression set group and the transient group are different.

6. The optimization apparatus of claim 3,
wherein the E_GEN equivalent expression set group generation means includes:
a first retrieval unit for retrieving an instruction from the basic block to analyze equivalence relations;
an E_GEN processing storage unit for storing equivalent expression sets whose equivalence relations were generated by processing of instructions which precede the retrieved instruction in the basic block;
a first E_GEN processing storage unit update unit for deleting, when the retrieved instruction is an assignment instruction whose left side member is a variable, expressions affected by processing of the assignment instruction from the equivalent expression sets stored in the E_GEN processing storage unit;
a second E_GEN processing storage unit update unit for deleting, when the retrieved instruction is an assignment instruction whose left side member is an indirect calculation expression, expressions affected by variables which are potentially changed by processing of the assignment instruction from the equivalent expression sets in the E_GEN processing storage unit;
a third E_GEN processing storage unit update unit for adding, when the retrieved instruction is an assignment instruction and the E_GEN processing storage unit stores an equivalent expression set including an expression located on one side of the assignment instruction, an expression on another side of the assignment instruction to the equivalent expression set, and for generating, when the E_GEN processing storage unit stores no equivalent expression sets including an expression located on any side of the assignment instruction, an equivalent expression set on both sides of the assignment instruction and adding the generated equivalent expression set to the E_GEN processing storage unit; and
a fourth E_GEN processing storage unit update unit for deleting, when the retrieved instruction is a function call instruction, expressions affected by variables which are potentially changed by processing of the function call instruction from the equivalent expression sets in the E_GEN processing unit.

7. The optimization apparatus of claim 3,
wherein the E_PRE expression group generation means includes:
  a second retrieval unit for retrieving an instruction from the basic block to analyze equivalence relations;
  an E_PRE processing storage unit for storing all expressions which appear in the program;
  a first E_PRE processing storage unit update unit for deleting, when the retrieved instruction is an assignment instruction whose left side member is a variable, expressions affected by processing of the assignment instruction from the E_PRE processing storage unit;
  a second E_PRE processing storage unit update unit for deleting, when the retrieved instruction is an assignment instruction whose left side member is an indirect calculation expression, expressions affected by variables which are potentially changed by processing of the assignment instruction from the E_PRE processing storage unit; and
  a third E_PRE processing storage unit update unit for deleting, when the retrieved instruction is a function call instruction, expressions affected by variables which are potentially changed by processing of the function call instruction from the E_PRE processing storage unit.

8. The optimization apparatus of claim 3,
wherein the equivalence intersection calculation is performed for sets in two set groups, the two set groups being respectively composed of mutually exclusive sets of members.

9. The optimization apparatus of claim 3,
wherein the equivalence union calculation first performs a set union calculation for two set groups and then joins sets in a union calculation result that have common members to form single sets until all sets in the union calculation result are mutually exclusive.

10. The optimization apparatus of claim 2,
wherein the block internal optimization means includes:
  a processing storage unit for storing, in an initial state, an E_IN equivalent expression set group most recently obtained by the first analysis means for a basic block, and for storing, after optimization of the basic block starts, an equivalent expression set group obtained by updating the E_IN equivalent expression set group in response to changes resulting from the optimization;
  a third retrieval unit for successively retrieving instructions from the basic block;
  instruction optimization means for optimizing a retrieved instruction; and
  update means for updating the E_IN equivalent expression set group stored in the processing storage unit after the retrieved instruction is optimized.

11. The optimization apparatus of claim 10,
wherein the block internal optimization means further includes
  processing storage unit initialization means for setting the E_IN equivalent expression set group, most recently obtained by the first analysis means for the basic block, in the processing storage unit,
wherein the instruction optimization means includes:
  a first redundancy elimination unit for replacing an expression in the retrieved instruction with an expression which has an equivalence relation with the expression by referring to equivalent expression sets in the E_IN equivalent expression set group stored in the processing storage unit; and
  a second redundancy elimination unit for deleting, when the retrieved instruction is an assignment instruction whose expressions on both sides are included in one of the equivalent expression sets in the processing storage unit, the retrieved instruction from the program, and
wherein the update means includes:
  a first processing storage unit update unit for deleting, when the retrieved instruction is an assignment instruction whose left side member is a variable, expressions affected by processing of the assignment instruction from the equivalent expression sets in the processing storage unit;
  a second processing storage unit update unit for deleting, when the retrieved instruction is an assignment instruction whose left side member is an indirect calculation expression, expressions affected by variables which are potentially changed by processing of the assignment instruction from the equivalent expression sets in the processing storage unit;
  a third processing storage unit update unit for adding, when the retrieved instruction is an assignment instruction and the processing storage unit stores at least one equivalent expression set including an expression located on one side of the assignment instruction, an expression on another side of the assignment instruction to the equivalent expression sets, and for generating, when the processing storage unit stores no equivalent expression sets including an expression located on any side of the assignment instruction, an equivalent expression set composed of expressions on both sides of the assignment instruction and adding the generated equivalent expression set to the processing storage unit;
  a fourth processing storage unit update unit for deleting, when the retrieved instruction is a function call instruction, expressions affected by variables which are potentially changed by processing of the function call instruction from the equivalent expression sets stored in the processing storage unit; and
  an equivalence replacement optimization control unit for activating the processing storage unit initialization means, then activating the first redundancy elimination unit and the second redundancy elimination unit for each instruction, and then successively activating the first processing storage unit update unit, the second processing storage unit update unit, the third processing storage unit update unit, land the fourth processing storage unit update unit.

12. The optimization apparatus of claim 11,
wherein the block internal optimization means includes a third redundancy elimination unit
  for replacing, when the retrieved instruction is an assignment instruction whose expression on a right side is included in an equivalent expression set in the processing storage unit along with a constant, the expression with the constant, and
  for replacing, when the retrieved instruction is an assignment instruction whose expression on the right side is one of a binary calculation expression and a monadic calculation expression with each variable used in the expression being included in an equivalent expression set in the processing storage unit along with a constant, each variable used in the expression with a corresponding constant, calculating the expression, and replacing the expression with the calculation result, and wherein the equivalence replacement optimization control unit activates the processing storage unit initialization means, then activates the first redundancy elimination unit, the second redundancy elimination unit, and the third redundancy elimination unit for each instruction, and then successively activates the first processing storage unit update unit, the second processing storage unit update unit, the third processing storage unit update unit, and the fourth processing storage unit update unit.

13. The optimization apparatus of claim 12, wherein the block internal optimization means includes
a fourth redundancy elimination unit for replacing, when the retrieved instruction is a conditional branch instruction and expressions on both sides of a conditional expression written in the conditional branch instruction are included in equivalent expression sets in the processing storage unit, the conditional expression with "(1)" if it is validated that a condition given by the conditional expression is definitely met, and replacing the conditional expression with "(0)" if it is validated that the condition given by the conditional expression is definitely unmet, and wherein the equivalence replacement optimization control unit activates the processing storage unit initialization means, then activates the first redundancy elimination unit, the second redundancy elimination unit, the third redundancy elimination unit, and the fourth elimination unit for each instruction, and then successively activates the first processing storage unit update unit, the second processing storage unit update unit, the third processing storage unit update unit, and the fourth processing storage unit update unit.

14. A computer-readable storage medium storing an optimization program for use in a compiler that converts a program into a plurality of machine language instructions,
the program being composed of a plurality of basic blocks which are each made up of instructions, each instruction having two expressions respectively on a left side and a right side, the expressions being selected from the group consisting of three types of expressions that are (a) a variable, (b) a constant, and (c) a combination of at least one operator and at least two operands that are variables and/or constants, the compiler being equipped with a code generation apparatus for assigning variables included in expressions to registers or memories and generating the machine language instructions, the optimization apparatus comprising:
an analysis step for analyzing, for each basic block, equivalence relations among a plurality of expressions at an entry point of an analyzed basic block, and generating an E_IN equivalent expression set group that is composed of at least one set of equivalent expressions which have an equivalence relation at the entry point of the analyzed basic block, the equivalence relation meaning that one of the expressions can be replaced with a different one of the expressions without changing what the program computes; and an optimization step for optimizing all instructions in each basic block, using the E_IN equivalent expression set group for each basic block, wherein the optimization by the optimization step includes an operation of replacing an operator-operand combination expression in an instruction with an equivalent expression that is a variable or constant.

15. The computer-readable storage medium of claim 14, wherein the analysis step includes:
a first analysis step for analyzing, for each basic block, equivalence relations among a plurality of expressions at an exit point of an analyzed basic block, the equivalence relations being maintained until an entry point of a basic block that is a branch destination for the analyzed basic block;
a second analysis step for analyzing, for each basic block, which equivalence relations at an entry point of an analyzed basic block disappear due to processing of each instruction in the analyzed basic block, and for analyzing equivalence relations that are newly produced by the processing of each instruction in the analyzed basic block;
a qualification judgement step for judging, for each basic block, whether an E_OUT equivalent expression set group, composed of at least one set of equivalent expressions which are found to have an equivalence relation at an exit point of a basic block as a result of analysis by the second analysis step, qualifies for being used to optimize the basic block; and
a repeat step for having the first analysis step and the second analysis step repeat respective analyses, when the qualification judgement step judges that an E_OUT equivalent expression set group of any of the plurality of basic blocks does not qualify, and the optimization step includes
a block internal optimization step for optimizing, when the qualification judgement step judges that an E_OUT equivalent expression set group of each basic block qualifies, all instructions in each basic block using an E_IN equivalent expression set group composed of at least one get of equivalent expressions which have an equivalence relation at an entry point of each basic block, that is most recently obtained in the first analysis step and the second analysis step.

16. The computer-readable storage medium of claim 15, wherein the optimization program further comprises:
an E_GEN equivalent expression set group generation step for generating, for each basic block, an E_GEN equivalent expression set group composed of at least one set of equivalent expressions whose equivalence relation is newly established by processing of each instruction in a basic block;
an E_PRE expression group generation step for generating, for each basic block, an E_PRE expression group composed of expressions, among all expressions appearing in the program, that are unchanged by the processing of each instruction in the basic block; and
an initialization step for performing an equivalence union calculation on an E_GEN equivalent expression set group and an E_PRE expression group of each basic block other than an initial block, setting the calculation result as an initial E_OUT equivalent expression set group of each basic block other than the initial block, and setting an E_GEN equivalent expression set group of the initial block as an initial E_OUT equivalent expression set group of the initial block, wherein the first analysis step analyzes, for each basic block, which equivalent expression sets, among equivalent expression sets in initial E_OUT equivalent expression set groups, maintain equivalence relations at an entry point of a basic block, wherein the second analysis step analyzes, for each basic block, which equivalence relations maintained at the entry point of the basic block disappear due to processing of each instruction in the basic block, and analyzes which equivalence relations are newly produced by the processing of each instruction in the basic block, wherein the first analysis step includes
    a first calculation step for regenerating, for each basic block, after an E_OUT equivalent expression set group of each basic block is generated, an E_IN equivalent expression set group of a basic block by performing an equivalence intersection calculation on E_OUT equivalent expression set groups of basic blocks which have the basic block as a common branch destination, and wherein the second analysis step includes
    a second calculation step for regenerating, for each basic block, an E_OUT equivalent expression set group of the basic block by calculating "Formula 1" using the E_IN equivalent expression set group regenerated in the first calculation step, an E_GEN equivalent expression set group generated in the E_GEN equivalent expression set group generation step for the basic block, and an E_PRE expression group generated in the E_PRE expression group generation step for the basic block, wherein "Formula 1" is $$E\_OUT[B]=E\_GEN[B]4e(E\_IN[B]3eE\_PRE[B]),$$

B representing a basic block in the program,
3e representing an equivalence intersection operator, and
4e representing an equivalence union operator.

17. The computer-readable storage medium of claim 16,
wherein the qualification judgement step judges whether the E_OUT equivalent expression set group regenerated in the second calculation step qualifies for being used to optimize the basic block, and wherein, when the qualification judgement step judges that an E_OUT equivalent expression set group of any of the plurality of basic blocks does not qualify, the first calculation step newly generates, for each basic block, an E_IN equivalent expression set group of a basic block by performing an equivalence intersection calculation on E_OUT equivalent expression set groups of basic blocks which have the basic block as a common branch destination, and the second calculation step newly generates, for each basic block, an E_OUT equivalent expression set group of the basic block by calculating "Formula 1" using the E_IN equivalent expression set group newly generated by the first calculation step, the E_GEN equivalent expression set group generated in the E_GEN equivalent expression set group generation step for the basic block, and the E_PRE expression group generated in the E_PRE expression group generation step for the basic block.

18. The computer-readable storage medium of claim 17,
wherein a computer that reads the computer-readable storage medium includes a transient group storage unit for storing an E_OUT equivalent expression set group generated in the second calculation step as a transient group, and wherein the qualification judgement step includes:
    a comparison substep for comparing, when a new E_OUT equivalent expression set group is generated in the second calculation step, the new E_OUT equivalent expression set group with the transient group; and
    a judgement substep for judging that the transient group qualifies if the new E_OUT equivalent expression set group and the transient group match, and judging that the transient group does not qualify if the new E_OUT equivalent expression set group and the transient group are different.

19. The computer-readable storage medium of claim 16,
wherein a computer that reads the computer-readable storage medium includes an E_GEN processing storage unit for storing equivalent expression sets whose equivalence relations were generated by processing of instructions which precede a retrieved instruction in a basic block, and wherein the E_GEN equivalent expression set group generation step includes:
    a first retrieval substep for retrieving the instruction from the basic block to analyze equivalence relations;
    a first E_GEN processing storage unit update substep for deleting, when the retrieved instruction is an assignment instruction whose left side member is a variable, expressions affected by processing of the assignment instruction from the equivalent expression sets stored in the E_GEN processing storage unit;
    a second E_GEN processing storage unit update substep for deleting, when the retrieved instruction is an assignment instruction whose left side member is an indirect calculation expression, expressions affected by variables which are potentially changed by processing of the assignment instruction from the equivalent expression sets in the E_GEN processing storage unit;
    a third E_GEN processing storage unit update substep for adding, when the retrieved instruction is an assignment instruction and the E_GEN processing storage unit stores an equivalent expression set including an expression located on one side of the assignment instruction, an expression on another side of the assignment instruction to the equivalent expression set, and for generating, when the E_GEN processing storage unit stores no equivalent expression sets including an expression located on any side of the assignment instruction, an equivalent expression set on both sides of the assignment instruction and adding the generated equivalent expression set to the E_GEN processing storage unit; and
    a fourth E_GEN processing storage unit update substep for deleting, when the retrieved instruction is a function call instruction, expressions affected by variables which are potentially changed by processing of the function call instruction from the equivalent expression sets in the E_GEN processing storage unit.

20. The computer-readable storage medium of claim 16,
wherein a computer that reads the computer-readable storage medium includes an E_PRE processing storage unit for storing all expressions which appear in the program, and wherein the E_PRE expression group generation step includes:
- a second retrieval substep for retrieving an instruction from the basic block to analyze equivalence relations;
- a first E_PRE processing storage unit update substep for deleting, when the retrieved instruction is an assignment instruction whose left side member is a variable, expressions affected by processing of the assignment instruction from the E_PRE processing storage unit;
- a second E_PRE processing storage unit update substep for deleting, when the retrieved instruction is an assignment instruction whose left side member is an indirect calculation expression, expressions affected by variables which are potentially changed by processing of the assignment instruction from the E_PRE processing storage unit; and
- a third E_PRE processing storage unit update substep for deleting, when the retrieved instruction is a function call instruction, expressions affected by variables which are potentially changed by processing of the function call instruction from the E_PRE processing storage unit.

21. The computer-readable storage medium of claim 15, wherein a computer that reads the computer-readable storage medium includes a processing storage unit for storing, in an initial state, an E_IN equivalent expression set group most recently obtained in the first analysis step for a basic block, and for storing, after optimization of the basic block starts, an equivalent expression set group obtained by update of the E_IN equivalent expression set group in response to changes resulting from the optimization, and wherein the block internal optimization step includes:
- a third retrieval substep for successively retrieving instructions from the basic block;
- an instruction optimization step for optimizing a retrieved instruction; and
- an update step for updating the E_IN equivalent expression set group stored in the processing storage unit after the retrieved instruction is optimized.

22. The computer-readable storage medium of claim 21, wherein the block internal optimization step further includes
- a processing storage unit initialization step for setting the E_IN equivalent expression set group, most recently obtained in the first analysis step of the basic block, in the processing storage unit, wherein the instruction optimization step includes:
- a first redundancy elimination substep for replacing an expression in the retrieved instruction with an expression which has an equivalence relation with the expression by referring to equivalent expression sets in the E_IN equivalent expression set group stored in the processing storage unit; and
- a second redundancy elimination substep for deleting, when the retrieved instruction is an assignment instruction whose expressions on both sides are included in one of the equivalent expression sets in the processing storage unit, the retrieved instruction from the program, and wherein the update step includes:
- a first processing storage unit update substep for deleting, when the retrieved instruction is an assignment instruction whose left side member is a variable, expressions affected by processing of the assignment instruction from the equivalent expression sets in the processing storage unit;
- a second processing storage unit update substep for deleting, when the retrieved instruction is an assignment instruction whose left side member is an indirect calculation expression, expressions affected by variables which are potentially changed by processing of the assignment instruction from the equivalent expression sets in the processing storage unit;
- a third processing storage unit update substep for adding, when the retrieved instruction is an assignment instruction and the processing storage unit stores at least one equivalent expression set including an expression located on one side of the assignment instruction, an expression on another side of the assignment instruction to the equivalent expression sets, and for generating, when the processing storage unit stores no equivalent expression sets including an expression located on any side of the assignment, instruction, an equivalent expression set composed of expressions on both sides of the assignment instruction and adding the generated equivalent expression set to the processing storage unit;
- a fourth processing storage unit update substep for deleting, when the retrieved instruction is a function call instruction, expressions affected by variables which are potentially changed by processing of the function call instruction from the equivalent expression sets stored in the processing storage unit; and
- an equivalence replacement optimization control substep for activating the processing storage unit initialization step, then activating the first redundancy elimination substep and the second redundancy elimination substep for each instruction, and then successively activating the first processing storage unit update substep, the second processing storage unit update substep, the third processing storage unit update substep, and the fourth processing storage unit update substep.

23. The computer-readable storage medium of claim 22, wherein the block internal optimization step includes a third redundancy elimination substep
- for replacing, when the retrieved instruction is an assignment instruction whose expression on a right side is included in an equivalent expression set in the processing storage unit along with a constant, the expression with the constant, and
- for replacing, when the retrieved instruction is an assignment instruction whose expression on the right side is one of a binary calculation expression and a monadic calculation expression with each variable used in the expression being included in an equivalent expression set in the processing storage unit along with a constant, each variable used in the expression with a corresponding constant, calculating the expression, and replacing the expression with the calculation result, and wherein the equivalence replacement optimization control substep activates the processing storage unit initialization step, then activates the first redundancy elimination substep, the second redundancy elimination substep, and the third redundancy elimination substep for each instruction, and then successively activates the first processing storage unit update substep, the second processing storage unit update substep, the third processing storage unit update substep, and the fourth processing storage unit update substep.

24. The computer-readable storage medium of claim 23, wherein the block internal optimization step includes
- a fourth redundancy elimination substep for replacing, when the retrieved instruction is a conditional branch instruction and expressions on both sides of a conditional expression written in the conditional branch instruction are included in equivalent expression sets in the processing storage unit, the conditional expression with "(1)" if it is validated that a condition given by the conditional expression is definitely met, and replacing the conditional expression with "(0)" if it is validated that the condition given by the conditional expression is definitely unmet, and
- wherein the equivalence replacement optimization control substep activates the processing storage unit initialization step, then activates the first redundancy elimination substep, the second redundancy elimination substep, the third redundancy elimination substep, and the fourth redundancy elimination substep for each instruction, and then successively activates the first processing storage unit update substep, the second processing storage unit update substep, the third processing storage unit update substep, and the fourth processing storage unit update substep.

* * * * *